(12) United States Patent
Arsalan et al.

(10) Patent No.: US 11,998,988 B2
(45) Date of Patent: Jun. 4, 2024

(54) METHODS FOR THE PRODUCTION OF NANOCOMPOSITES FOR HIGH TEMPERATURE ELECTROCHEMICAL ENERGY STORAGE DEVICES

(71) Applicant: Saudi Arabian Oil Company, Dhahran (SA)

(72) Inventors: Muhammad Arsalan, Dhahran (SA); Edreese Alsharaeh, Riyadh (SA); Yasmin Mussa, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 308 days.

(21) Appl. No.: 16/923,189

(22) Filed: Jul. 8, 2020

(65) Prior Publication Data

US 2021/0008628 A1    Jan. 14, 2021

Related U.S. Application Data

(60) Provisional application No. 62/871,785, filed on Jul. 9, 2019.

(51) Int. Cl.
*B22F 9/04* (2006.01)
*B82Y 30/00* (2011.01)
(Continued)

(52) U.S. Cl.
CPC .............. *B22F 9/04* (2013.01); *C01B 21/064* (2013.01); *C01B 32/198* (2017.08); *C01G 51/04* (2013.01);
(Continued)

(58) Field of Classification Search
CPC .... B22F 9/04; B22F 2009/043; C01B 21/064; C01B 32/198; C01B 21/0648;
(Continued)

(56) References Cited

U.S. PATENT DOCUMENTS 8,557,916 B1   10/2013   Alsharaeh et al.
8,790,814 B2   7/2014    Wang et al.
(Continued)

FOREIGN PATENT DOCUMENTS

CN    104 649 700 A    5/2015
CN    106 398 179 A    2/2017
(Continued)

OTHER PUBLICATIONS

Liu et al., Synthesis of Composite Nanosheets of Graphene and Boron Nitride and Their Lubrication Application in Oil, 2017, Adv. Eng. Mater., 1700488, 1-7 (Year: 2017).*
(Continued)

*Primary Examiner* — Daniel S Gatewood
(74) *Attorney, Agent, or Firm* — Osha Bergman Watanabe & Burton LLP

(57) ABSTRACT

Presented here are nanocomposites and rechargeable batteries. In certain embodiments, nanocomposites a nanocomposite is resistant to thermal runaway, and useful as an electrode material in rechargeable batteries that are safe, reliable, and stable when operated at high temperature and high pressure. The present disclosure also provides methods of preparing rechargeable batteries. For example, rechargeable batteries that include nanocomposites of the present disclosure as an electrode material have, in some embodiments, an enhanced performance and stability over a broad temperature range from room temperature to high temperatures. These batteries fill an important need by providing a safe and reliable power source for devices operated at high temperatures and pressures such as downhole equipment used in the oil industry.

24 Claims, 43 Drawing Sheets

(51) Int. Cl.
  *B82Y 40/00* (2011.01)
  *C01B 21/064* (2006.01)
  *C01B 32/198* (2017.01)
  *C01G 51/04* (2006.01)
  *H01M 4/133* (2010.01)
  *H01M 4/136* (2010.01)
  *H01M 4/1393* (2010.01)
  *H01M 4/1397* (2010.01)
  *H01M 4/36* (2006.01)
  *H01M 4/62* (2006.01)
  *H01M 10/0525* (2010.01)

(52) U.S. Cl.
  CPC ............ *H01M 4/133* (2013.01); *H01M 4/136* (2013.01); *H01M 4/1393* (2013.01); *H01M 4/1397* (2013.01); *H01M 4/366* (2013.01); *H01M 4/625* (2013.01); *H01M 10/0525* (2013.01); *B22F 2009/043* (2013.01); *B82Y 30/00* (2013.01); *B82Y 40/00* (2013.01); *C01P 2004/64* (2013.01); *C01P 2004/80* (2013.01); *C01P 2006/40* (2013.01)

(58) Field of Classification Search
  CPC ...... C01B 32/194; C01G 51/04; H01M 4/133; H01M 4/136; H01M 4/1393; H01M 4/1397; H01M 4/366; H01M 4/625; H01M 10/0525; H01M 2004/021; H01M 2004/027; H01M 2004/028; H01M 4/04; H01M 4/139; H01M 4/38; H01M 4/52; H01M 4/5815; H01M 4/62; H01M 10/052; H01M 4/364; B82Y 30/00; B82Y 40/00; C01P 2004/64; C01P 2004/80; C01P 2006/40; H01G 11/32; H01G 11/46; H01G 11/36; C04B 2235/3267; C04B 35/01; C04B 2235/386; C04B 2235/425; C04B 2235/449; C04B 35/522; C04B 35/583; Y02E 60/10; Y02E 60/13; Y02T 10/70
  See application file for complete search history.

(56) References Cited

U.S. PATENT DOCUMENTS

| | | | |
|---|---|---|---|
| 9,029,228 | B2 | 5/2015 | Seacrist et al. |
| 9,203,084 | B2 | 12/2015 | Wang et al. |
| 9,362,549 | B2 | 6/2016 | Rojeski et al. |
| 9,368,831 | B2 | 6/2016 | He et al. |
| 9,705,136 | B2 | 7/2017 | Rojeski |
| 9,718,967 | B2 | 8/2017 | Malshe |
| 9,738,057 | B2 | 8/2017 | Shin et al. |
| 9,780,379 | B2 | 10/2017 | Zhamu et al. |
| 9,899,672 | B2 | 2/2018 | Zhamu et al. |
| 10,008,723 | B1 | 6/2018 | Zhamu et al. |
| 10,008,747 | B1 | 6/2018 | Zhamu et al. |
| 10,424,782 | B2 | 9/2019 | Arsalan et al. |
| 11,239,466 | B2 | 2/2022 | Arsalan et al. |
| 2010/0035093 | A1 | 2/2010 | Ruoff et al. |
| 2010/0218801 | A1 | 9/2010 | Sung et al. |
| 2011/0052998 | A1 | 3/2011 | Liang et al. |
| 2011/0086206 | A1 | 4/2011 | Scheffer et al. |
| 2011/0287316 | A1 | 11/2011 | Lu et al. |
| 2012/0142832 | A1 | 6/2012 | Varma et al. |
| 2013/0164635 | A1 | 6/2013 | Schmidt et al. |
| 2013/0180912 | A1 | 7/2013 | Li |
| 2013/0240830 | A1 | 9/2013 | Seacrist et al. |
| 2014/0106223 | A1 | 4/2014 | Xu et al. |
| 2016/0218353 | A1 | 7/2016 | Kim et al. |
| 2016/0344035 | A1 | 11/2016 | Zhamu et al. |
| 2017/0098856 | A1 | 4/2017 | Zhamu et al. |
| 2017/0141387 | A1 | 5/2017 | Hayner et al. |
| 2017/0149051 | A1 | 5/2017 | Fujita et al. |
| 2017/0179475 | A1 | 6/2017 | Lu et al. |
| 2017/0294646 | A1 | 10/2017 | Zhang et al. |
| 2018/0248173 | A1* | 8/2018 | Pan ................. H01M 4/405 |
| 2018/0248194 | A1 | 8/2018 | Cheng et al. |
| 2018/0286599 | A1 | 10/2018 | Lin et al. |
| 2019/0157665 | A1 | 5/2019 | Pope et al. |
| 2019/0214633 | A1 | 7/2019 | Arsalan et al. |
| 2019/0214634 | A1 | 7/2019 | Arsalan et al. |
| 2019/0214647 | A1 | 7/2019 | Arsalan et al. |
| 2021/0013492 | A1 | 1/2021 | Arsalan et al. |

FOREIGN PATENT DOCUMENTS

| | | |
|---|---|---|
| CN | 108 034 256 A | 5/2018 |
| CN | 109 182 856 A | 1/2019 |
| CN | 109762518 A | 5/2019 |
| EP | 2 578 539 A1 | 4/2013 |
| WO | WO-2017/033213 A1 | 3/2017 |
| WO | WO-2019/138271 A1 | 7/2019 |
| WO | WO-2019/138272 A1 | 7/2019 |
| WO | WO-2021/005535 A1 | 1/2021 |
| WO | WO-2021/005538 A1 | 1/2021 |

OTHER PUBLICATIONS

Byun et al., Ordered, Scalable Heterostructure Comprising Boron Nitride and Graphene for High-Performance Flexible Supercapacitors, 2016, Chem. Mater., 28, 7750-7756 (Year: 2016).*
Li et al., Reduced Graphene Oxide/Boron Nitride Composite Film as a Novel Binder-Free Anode for Lithium Ion Batteries with Enhanced Performances, 2015, Electrochim. Acta., 166, 197-205 (Year: 2015).*
International Search Report for PCT/IB2020/056431, 5 pages (dated Sep. 28, 2020).
International Search Report for PCT/IB2020/056436, 5 pages (dated Oct. 1, 2020).
Written Opinion for PCT/IB2020/056431, 11 pages (dated Sep. 28, 2020).
Written Opinion for PCT/IB2020/056436, 11 pages (dated Oct. 1, 2020).
Xu, J. et al., Sulfur-Graphene Nanostructured Cathodes via Ball-Milling for High-Performance Lithium-Sulfer Batteries, ACS Nano, 8(10): 10920-10930 (2014).
Liu, X. et al., Shape-controlled synthesis and properties of uniform spinel cobalt oxide nanocubes, Nanotech., 16, 3035-3040 (2005).
Shearer, C.J. et al., Accurate thickness measurement of graphene, Nanotech., 27 (12), 125704 (2016).
Aldalbahi, A. et al. Variations in Crystalline Structures and Electrical Properties of Single Crystalline Boron Nitride Nanosheets, Sci. Rep., 5: (16703): 1-9 (2015).
Alsharaeh, E.H. and Othman, A.A., Microwave Irradiation Synthesis and Characterization of RGO—AgNPs/Polystyrene Nanocomposites, Polymer Composites, 1-6 (2014).
Alsharaeh, E.H. et al., Evaluation of Nanomechanical Properties of (Styrene-Methyl Methacrylate) Copolymer Composites Containing Graphene Sheets, Ind. Eng. Chem. Res., 52: 17871-17881 (2013).
Alsharaeh, E.H. et al., Microwave Irradiation Effect on the Dispersion and Thermal: Stability of RGO Nanosheets within a Polystyrene Matrix, Materials, 7: 5212-5224 (2014).
Alsharaeh, E.H. et al., Novel synthesis of holey reduced graphene oxide (HRGO) by microwave irradiation method for anode in lithium-ion batteries, 6(29854): 1-13 (2016).
Byun, S. et al., Ordered, scalable heterostructure comprising boron nitride and graphene for high-performance flexible supercapacitors, Chemistry of Materials, 28:7750-7756 (2016).
Chen, T. et al., Self-Templated Formation of Interlaced Carbon Nanotubes Threaded Hollow Co3S4 Nanoboxes for High-Rate and Heat-Resistant Lithium-Sulfur Batteries, J. Am. Chem. Soc., 139:12710-12715 (2017).
Chiam, S. L. et al., Electrochemical Performance of Supercapacitor with Stacked Copper Foils Coated with Graphene Nanoplatelets. Sci. Rep. 8, 3093 (2018).

(56) References Cited

OTHER PUBLICATIONS

Conder, J. et al., Direct observation of lithium polysulfides in lithium-sulfur batteries using operando X-ray diffraction, Nat. Energy, 2: 201769 1-7 (2017).
Dean, C.R. et al., Boron nitride substrates for high quality graphene electronics, Nature Nanotechnology, 5: 722-726 (2010). Supplementary Information, 5 pages (2010).
Decker, R. et al., Local Electronic Properties of Graphene on a BN Substrate via Scanning Tunneling Microscopy, Nano Lett., 11: 2291-2295 (2011).
Deng, D. R. et al., Enhanced Adsorptions to Polysulfides on Graphene-Supported BN Nanosheets with Excellent Li—S Battery Performance in a Wide Temperature Range, ACS Nano, 12(11):11120-11129 (2018).
Fan, Y. et al., Functionalized Boron Nitride Nanosheets/Graphene Interlayer for Fast and Long-Life Lithium-Sulfur Batteries, Advanced Energy Materials, 7:1602380, 6 pages (2017).
Fu, L. et al., Microwave Irradiation-Assisted Exfoliation of Boron Nitride Nanosheets: A Platform for Loading High Density of Nanoparticles, ChemistrySelect, 1:1799-1803 (2016).
Gao, T. et al., Boron nitride/reduced graphene oxide nanocomposites as supercapacitors electrodes, Materials Letters, 159:54-57 (2015).
Golla, D. et al., Ultrafast relaxation of hot phonons in graphene-hBN heterostructures, APL Mater, 5: 056101 1-6 (2017).
Gyenes, B. et al., Understanding Anomalous Behavior in Coulombic Efficiency Measurements on Li-Ion Batteries, Journal of The Electrochemical Society, 162(3): A278-A283 (2015).
International Search Report for PCT/IB2018/056449, 5 pages (dated Nov. 23, 2018).
International Search Report for PCT/IB2018/056450, 5 pages (dated Dec. 11, 2018).
Ishigami, M. et al., Atomic Structure of Graphene on SiO2, Nano Letters, 7(6): 1643-1648 (2007).
Jing et al., Graphene, inorganic graphene analogs and their composites for lithium ion batteries, J. Mater. Chem. A., 2:12104-12122 (2014).
Kang, Y, et al., Hybrids of reduced graphene oxide and hexagonal boron nitride: lightweight absorbers with tunable and highly efficient microwave attenuation properties, ACS applied materials & interfaces, 8:32468-32476 (2016).
Kayyar, A. Construction and Testing of Coin Cells of Lithium Ion Batteries, Journal of Visualized Experiments, 66(e4104): 1-5 (2012).
Kim, I. et al., Microwave-hydrothermal synthesis of boron/nitrogen co-doped graphene as an efficient metal-free electrocatalyst for oxygen reduction reaction, International Journal of Hydrogen Energy, 41:22026-22033 (2016).
Li, H. et al., Reduced Graphene Oxide/Boron Nitride Composite Film as a Novel Binder-Free Anode for Lithium Ion Batteries with Enhanced Performances, Electrochimica Acta, 166: 197-205 (2015).
Liang, Y. et al., Organic Electrode Materials for Rechargeable Lithium Batteries, Adv. Energy Mater., 2: 742-769 (2012).
Lin, D. et al., Reviving the lithium metal anode for high-energy batteries, Nature Nanotechnology, 12: 194-206 (2017).
Lin, Y. and Connell, J. W. Advances in 2D boron nitride nanostructures: nanosheets, nanoribbons, nanomeshes, and hybrids with graphene, Nanoscale, 4:6908-6939 (2012).
Liu, Y. et al., Synthesis of Composite Nanosheets of Graphene and Boron Nitride and Their Lubrication Application in Oil, Advanced Engineering Materials, 1700488 1-7 (2017).
Monajjem, Majid, Graphene/(h—BN)n/X-doped Graphene as Anode Material in Lithium Ion Batteries (X=Li, Be, B and N), Macedonian Journal of Chemistry and Chemical Engineering, 36(1):101-118 (2017).
Nakahara, K. et al., Rechargeable batteries with organic radical cathodes, Chemical Physics Letters, 359: 351-354 (2002).
Nesvadba, P. et al., Synthesis of A Novel Spirobisnitroxide Polymer and its Evaluation in an Organic Radical Battery, Chem. Mater., 22:783-788 783 (2010).

Pak, A. J. and Hwang, G. S., Theoretical Analysis of Thermal Transport in Graphene Supported on Hexagonal Boron Nitride: The Importance of Strong Adhesion Due to Bond Polarization, Phys. Rev., Appl. 6:034015 (2016).
Pan, M. et al., Modification of the electronic properties of hexagonal boron-nitride in BN/graphene vertical heterostructures, 2D Mater., 3:045002 (2016).
Pang, Q. et al., A Comprehensive Approach toward Stable Lithium-Sulfur Batteries with High Volumetric Energy Density, Adv. Energy Mater, 7: 1-9 (2017).
Park, M. et al., A review of conduction phenomena in Li-ion batteries, J. Power Sources, 1-26 (2010).
Patil, I. et al., Three dimensional nanocomposite of reduced graphene oxide and hexagonal boron nitride as an efficient metal-free catalyst for oxygen electroreduction. Journal of Materials Chemistry A, 4:4506-4515 (2016).
Rao, C.N.R. et al., Graphene Analogues of Inorganic Layered Materials, Angewandte Chemie International Edition, 52(50): 13162-13185 (2013).
Ren, G. et al., Bio-inspired CO3O4-polylpyrrole-graphene complex as efficient oxygen reduction catalyst by one-step ball-milling, Nano Res., 1-8 (2015).
Saha, S. et al., Band gap engineering of boron nitride by graphene and its application as positive electrode material in asymmetric supercapacitor device, ACS applied materials & interfaces, 7:14211-14222 (2015).
Saha, S. et al., Investigation of band structure and electrochemical properties of h—BN/rGO composites for asymmetric supercapacitor applications, Materials Chemistry and Physics, 190: 53-165 (2017).
Saha, S. et al., Modified electrochemical charge storage properties of h—BN/rGO superlattice through the transition from n to p type semiconductor by fluorine doping, Chemical Engineering Journal, 339:334-345 (2018).
Sahoo, R., Pal, A. & Pal, T. 2D materials for renewable energy storage devices: Outlook and challenges. Chem. Commun. 52, 13528-13542 (2016).
Suga, T. and Nishide, H., Redox-Active Radical Polymers for a Totally Organic Rechargeable Battery, Chapter 3, Polymers for Energy Storage and Delivery: Polyelectrolytes for Batteries and Fuel Cells, Page, K., et al., American Chemical Society, 9 pages (2012).
Suga, T. et al., p- and n-Type Bipolar Redox-Active Radical Polymer: Toward Totally Organic Polymer-Based Rechargeable Devices with Variable Configuration, Adv. Mater., 23:751-754 (2011).
Sun, X. et al., Developing Polymer Composite Materials: Carbon Nanotubes or Graphene?, Adv. Mater., 25: 5153-5176 (2013).
Wang, L. et al., Convenient synthesis and applications of gram scale boron nitride nanosheets, Catal. Sci. Technol., 1:1119-1123 (2011).
Wang, Y. et al., Boron nitride nanosheets: large-scale exfoliation in methanesulfonic acid and their composites with polybenzimidazole, J. Mater. Chem, 21:11371-11377 (2011).
Written Opinion for PCT/IB2018/056449, 10 pages (dated Nov. 23, 2018).
Written Opinion for PCT/IB2018/056450, 11 pages (dated Dec. 11, 2018).
Xue, J. et al., STM Spectroscopy of ultra-flat graphene on hexagonal boron nitride, Nature Materials, 10: 282-285 (2011).
Xue, Y. et al., Excellent electrical conductivity of the exfoliated and fluorinated hexagonal boron nitride nanosheets, Nanoscale Research Letters, 8(49): 1-7 (2013).
Yan, K. et al., Ultrathin Two-Dimensional Atomic Crystals as Stable Interfacial Layer for Improvement of Lithium Metal Anode, Nano Lett., 1-7 (2014).
Yang, S. et al., Mechanical ball-milling preparation of mass sandwich-like cobalt-graphene nanocomposites with high electrochemical hydrogen storage ability, Journal of Materials Chemistry A, 1:6731-6735 (2013).
Yang, Y. et al., Graphene-based materials with tailored nanostructures for energy conversion and storage, Materials Science and Engineering R, 102: 1-72 (2016).

(56) References Cited

OTHER PUBLICATIONS

Zhang, Z. et al., Hexagonal boron nitride: a promising substrate for graphene with high heat dissipation, Nanotechnology, 28:225704 (2017).

Zhu, J. et al., Facile synthesis of metal oxide/reduced graphene oxide hybrids with high lithium storage capacity and stable cyclability, Nanoscale, 3:1084-1089 (2011).

Song et al., "Advanced Sulfur Cathode Enabled by Highly Crumpled Nitrogen-Doped Graphene Sheets for High-Energy-Density Lithium-Sulfur Batteries," Nano Lett., 16:864-870 (2016).

Alsharaeh, E. H. and Othman, A. A., Facile Method for InSItu Preparation of STY-MMA Copolymer Containing Graphene Sheets Using MWI, Prepr. Pap-Am. Chem. Soc. Div. Pet. Chem., 57(1):142-147 (2012).

\* cited by examiner

METHODS FOR THE PRODUCTION OF NANOCOMPOSITES FOR HIGH TEMPERATURE ELECTROCHEMICAL ENERGY STORAGE DEVICES

CROSS REFERENCE TO RELATED APPLICATIONS

This application claims priority to and the benefit of U.S. Provisional Patent Application Ser. No. 62/871,785, filed on Jul. 9, 2019, entitled "METHODS FOR THE PRODUCTION OF METAL OXIDE/GRAPHENE/HEXAGONAL BORON NITRIDE NANOCOMPOSITES FOR HIGH TEMPERATURE ELECTROCHEMICAL ENERGY STORAGE DEVICES," the disclosure of which is incorporated herein by reference in its entirety.

BACKGROUND

Rechargeable batteries are used to power a broad range of consumer devices such as electric vehicles and portable electronic devices. Rechargeable batteries are, however, susceptible to failure and can be unsafe under "abuse conditions" such as when a rechargeable battery is overcharged, over-discharged, or operated at high temperature and high pressure. For example, when operated at high temperature, a rechargeable battery can undergo thermal runaway. During thermal runaway, high temperatures trigger a chain of exothermic reactions in a battery, causing the battery's temperature to increase rapidly. Thermal runaway can cause battery failure, damage to devices, and harm to users. During thermal runaway, rechargeable batteries such as lithium-ion and lithium-sulfur batteries can be prone to fire and explosion because the electrode materials (for example, anode and cathode materials) can be highly reactive and unstable. Even when thermal runaway does not occur, electrode materials used in rechargeable batteries can suffer from performance decay when operated at high temperatures. For example, lithium-based and silicon-based anode materials can suffer from a loss of capacity when operated at high temperatures.

SUMMARY

There is a need for improved electrode materials which are resistant to thermal runaway and are safe, reliable, and stable when operated at conditions of high temperature and high pressure.

Presented here are nanocomposites and rechargeable batteries, and methods of preparing and using the same. In certain embodiments, a nanocomposite is resistant to thermal runaway, and useful as an electrode material in rechargeable batteries that are safe, reliable, and stable when operated at high temperature and high pressure. In some embodiments, a nanocomposite includes nanoparticles (for example, nanoparticles of a metal or metal alloy, silicon nanoparticles, silicon oxide nanoparticles, and the like), graphene, and boron nitride, which, without being bound to theory, act in synergy to provide an improved thermal stability, an increased surface area, and enhanced electrochemical properties to the nanocomposites. In some such embodiments, nanoparticles are or include metal oxide nanoparticles, metal sulfide nanoparticles, metal nitride nanoparticles, nanoparticles of a metal or metal alloy, silicon nanoparticles, silicon oxide nanoparticles, or combinations thereof. In some embodiments, a nanocomposite includes transition metal oxide nanoparticles, graphene, and boron nitride, which, without being bound to theory, act in synergy to provide an improved thermal stability, an increased surface area, and enhanced electrochemical properties to the nanocomposites. In some embodiments, a nanocomposite includes metal sulfide nanoparticles, graphene, and boron nitride. In some embodiments, a nanocomposite includes metal nitride nanoparticles, graphene, and boron nitride. In some embodiments, a nanocomposite includes silicon nanoparticles, graphene, and boron nitride. In some embodiments, a nanocomposite includes silicon oxide nanoparticles, graphene, and boron nitride. In some embodiments, a nanocomposite includes nanoparticles of a metal or metal alloy, graphene, and boron nitride. For example, in some embodiments, rechargeable batteries that include nanocomposites as an electrode material, as described in the present disclosure, exhibit enhanced performance and stability over a broad temperature range, including, for example, from room temperature to high temperatures (for example, from 25° C. to and including 150° C. or greater). Rechargeable batteries of the present disclosure fill an important need by providing a safe and reliable power source for devices operated at high temperatures and pressures. In some embodiments, rechargeable batteries described in the present disclosure are useful as part of the downhole equipment used in the oil industry.

The present disclosure encompasses the recognition that including a thermally stable two-dimensional (2D) material (for example, hexagonal boron nitride) in a nanocomposite provides a nanocomposite having improved thermal stability and electrochemical performance when used as an anode material. Thus, in some embodiments, a nanocomposite is used to simultaneously prevent thermal runaway events and enhance a battery's overall electrochemical performance. In some embodiments, 2D materials of nanocomposites of the present disclosure include a 2D carbon material (for example, graphene, graphene oxide, reduced graphene oxide, and the like), a 2D nitride (for example, hexagonal boron nitride and the like), a 2D metal chalcogenide (for example, $MoS_2$, $SnS_2$, $TiS_2$, $WS_2$, $MoSe_2$, or $WSe_2$), a 2D oxide (for example, $TiO_2$, $ZnO$, or $MnO_2$), or a 2D hybrid material (for example, $MoS_2$/graphene or $MoSe_2/MnO_2$).

Without wishing to be bound to any particular theory, it is thought that, in certain embodiments, a thermally stable 2D material (for example, hexagonal boron nitride) acts in synergy with a second 2D material (for example, graphene) and nanoparticles (for example, nanoparticles of a metal or metal alloy, silicon nanoparticles, silicon oxide nanoparticles, and the like) in a nanocomposite to enhance (i) thermal stability, (ii) mechanical properties (for example, strength), (iii) physical properties (for example, specific surface area), (iv) and electrochemical properties (for example, specific capacity, coulombic efficiency, cycling performance, and the like) of a corresponding electrode material. For example, in some embodiments, a first 2D material and a second 2D material are less susceptible to restacking and loss of active surface area during operation over a broad temperature range or at high pressure, resulting in an increased operating life and improved tolerance to elevated temperatures and high pressure. Moreover, without wishing to be bound to any particular theory, it is thought that a second 2D material acts as a "substrate" for a first 2D material and effectively increases its carrier mobility and thus improves its electrochemical properties as an electrode material over a broad range of temperature and under conditions of high pressure.

In certain embodiments, nanocomposites described in the present disclosure perform better, are more stable, and cost less than conventional electrode materials. For example, nanocomposites described in the present disclosure are stable at high temperatures (of about 150° C. or greater) and have consistent electrochemical properties even after 1,000 or more charge-discharge cycles at about 150° C. For example, in some embodiments, nanocomposites described in the present disclosure do not suffer from the characteristic capacity decay of silicon-based anodes after a few charge-discharge cycles at high temperature. In certain embodiments, methods of preparing nanocomposites described in the present disclosure are based on ball-milling and calcination and thus are less costly than existing methods to prepare conventional anode materials.

In certain embodiments, rechargeable batteries (for example, including batteries that include lithium) described in the present disclosure are safer than conventional batteries when operated at a high temperature. For example, in some embodiments, dendritic lithium, which is a major source of thermal runaway events in conventional anode materials, does not form in nanocomposites described in the present disclosure (in other words, in some embodiments, batteries of the present disclosure do not include dendritic lithium). For example, in some embodiments, at high temperatures, short circuit(s) in batteries of the present disclosure occur less frequently, or in some embodiments, not at all. In some embodiments, batteries of the present disclosure do not undergo thermal runaway at temperatures of about 150° C. or greater. Accordingly, nanocomposites and rechargeable batteries described in the present disclosure can be used in safe energy-storage devices and in devices operated at high temperatures and pressure. For example, in some embodiments, rechargeable batteries described in the present disclosure can be used in the oil industry to power downhole equipment (for example, equipment used to monitor conditions in oil wells and other oil-related applications) where high temperatures and pressure are encountered.

In certain aspects, the present disclosure is directed to methods of preparing a nanoparticle/graphene/boron nitride (BN) nanocomposite (for example, a nanocomposite that includes nanoparticles (as defined generally herein), graphene, and boron nitride (BN)), which includes steps of: ball-milling a mixture including a metal salt, graphene, and boron nitride; and calcinating the mixture. In certain aspects, the present disclosure is directed to methods of preparing a metal oxide/graphene/boron nitride (BN) nanocomposite, which includes steps of: ball-milling a mixture including a metal salt, graphene, and boron nitride; and calcinating the mixture. In certain aspects, the present disclosure is directed to methods of preparing a metal sulfide/graphene/boron nitride (BN) nanocomposite, which includes steps of: ball-milling a mixture including a metal salt, graphene, and boron nitride; and calcinating the mixture. In certain aspects, the present disclosure is directed to methods of preparing a metal nitride/graphene/boron nitride (BN) nanocomposite, which includes steps of: ball-milling a mixture including a metal salt, graphene, and boron nitride; and calcinating the mixture. In certain aspects, the present disclosure is directed to methods of preparing a metal/graphene/boron nitride (BN) nanocomposite, which includes steps of: ball-milling a mixture including a metal salt, graphene, and boron nitride; and calcinating the mixture. In certain aspects, the present disclosure is directed to methods of preparing a silicon/graphene/boron nitride (BN) nanocomposite, which includes steps of: ball-milling a mixture including a metal salt, graphene, and boron nitride; and calcinating the mixture. In certain aspects, the present disclosure is directed to methods of preparing a silicon oxide/graphene/boron nitride (BN) nanocomposite, which includes steps of: ball-milling a mixture including a metal salt, graphene, and boron nitride; and calcinating the mixture.

In certain embodiments, a metal salt is or includes a metal selected from the group consisting of cobalt, iron, manganese, molybdenum, titanium, tin, tungsten, vanadium, and zinc.

In certain embodiments, a metal salt is a cobalt salt. In some such embodiments, a cobalt salt is selected from the group consisting of cobalt (II) halide, cobalt (II) acetate, cobalt (II) hydroxide, cobalt (II) sulfate, cobalt (II) nitrate, and hydrates of the same. For example, in some embodiments, a metal salt is cobalt (II) acetate or a hydrate of the same.

In certain embodiments, a method is or includes ball-milling the mixture for at least 20 minutes (for example, 20 or more minutes). For example, in certain embodiments, a method includes ball-milling the mixture for 30 to 90 minutes.

In certain embodiments, a method includes ball-milling the mixture at a speed of 1000 to 2500 rpm.

In certain embodiments, a step of calcinating a mixture includes heating the mixture in an oven, where temperature of the oven is increased to a temperature in the range of 325 to 375° C. and subsequently held at that temperature for at least 1 hour. In certain embodiments, temperature of the oven is increased to a temperature in the range of 345 to 355° C. In certain embodiments, temperature of the oven is increased to a temperature in the range of 345 to 355° C. at a rate of 3 to 15° C./min and subsequently held at that temperature for 1 to 10 hours.

In certain embodiments, the present disclosure is related to a metal oxide/graphene/boron nitride (BN) nanocomposite prepared by a method described in the present disclosure, where a nanocomposite is made up of metal oxide nanoparticles, graphene, and boron nitride. It is further contemplated that the present disclosure can be adapted to prepare a metal sulfide/graphene/boron nitride nanocomposite, a metal nitride/graphene/boron nitride nanocomposite, metal/graphene/boron nitride nanocomposite, metal alloy/graphene/boron nitride nanocomposite, silicon oxide/graphene/boron nitride nanocomposite, silicon/graphene/boron nitride nanocomposite, or combinations thereof. Such metal sulfide/graphene/boron nitride, metal nitride/graphene/boron nitride, metal/graphene/boron nitride, metal alloy/graphene/boron nitride, silicon/graphene/boron nitride, and silicon oxide/graphene/boron nitride nanocomposites are encompassed within the scope of present disclosure.

In certain embodiments, metal oxide nanoparticles of a nanocomposite are selected from the group consisting of $Co_3O_4$, $TiO_2$, $SnO_2$, $ZnO$, $Fe_3O_4$, $Fe_2O_3$, and combinations of the same. In certain embodiments, metal sulfide nanoparticles of a nanocomposite are selected from the group consisting of $MoS_2$, $MnS_2$, $CoS$, $CoS_2$, $Co_3S_4$, $NiS$, $CuS$, $SnS_2$, $ZnS$, and combinations of the same. In certain embodiments, metal nitride nanoparticles of a nanocomposite are selected from the group consisting of $TiN$, $Fe_3N$, $CoN$, $CrN$, $W_2N$, $VN$, $ZrN$, and combinations of the same. In certain embodiments, silicon oxide nanoparticles of a nanocomposite include $SiO_2$.

In certain embodiments, nanoparticles make up 0.1% to 99.9% of a nanocomposite by weight. In certain embodiments, nanoparticles make up 0.1% to 50% of a nanocomposite by weight. In certain embodiments, nanoparticles make up 0.1% to 30% of a nanocomposite by weight. In certain embodiments, nanoparticles make up 0.1% to 25% of a nanocomposite by weight. In certain embodiments, nanoparticles make up 0.1% to 10% of a nanocomposite by weight. In certain embodiments, nanoparticles make up 1% to 10% of a nanocomposite by weight. In certain embodiments, nanoparticles make up 50% to 99.8% of a nanocomposite by weight. For example, in certain embodiments, nanoparticles make up 50% to 70% of a nanocomposite by weight. For example, in certain embodiments, nanoparticles make up 55% to 65% of a nanocomposite by weight. For example, in certain embodiments, nanoparticles make up 75% to 95% of a nanocomposite by weight.

In certain embodiments, metal oxide nanoparticles are $Co_3O_4$ nanoparticles. In certain embodiments, $Co_3O_4$ nanoparticles are in a cubic-spinel form. In certain embodiments, $Co_3O_4$ nanoparticles make up 0.1% to 99.9% of a nanocomposite by weight. In certain embodiments, $Co_3O_4$ nanoparticles make up 0.1% to 50% of a nanocomposite by weight. In certain embodiments, $Co_3O_4$ nanoparticles make up 0.1% to 30% of a nanocomposite by weight. In certain embodiments, $Co_3O_4$ nanoparticles make up 0.1% to 25% of a nanocomposite by weight. In certain embodiments, $Co_3O_4$ nanoparticles make up 0.1% to 10% of a nanocomposite by weight. In certain embodiments, $Co_3O_4$ nanoparticles make up 1% to 10% of a nanocomposite by weight. In certain embodiments, $Co_3O_4$ nanoparticles make up 50% to 99.8% of a nanocomposite by weight. For example, in certain embodiments, $Co_3O_4$ nanoparticles make up 50% to 70% of a nanocomposite by weight. For example, in certain embodiments, $Co_3O_4$ nanoparticles make up 55% to 65% of a nanocomposite by weight. For example, in certain embodiments, $Co_3O_4$ nanoparticles make up 75% to 95% of a nanocomposite by weight.

In certain embodiments, graphene makes up 0.1% to 99.9% of a nanocomposite by weight. In certain embodiments, graphene makes up 0.1% to 50% of a nanocomposite by weight. In certain embodiments, graphene makes up 0.1% to 30% of a nanocomposite by weight. In certain embodiments, graphene makes up 0.1% to 25% of a nanocomposite by weight. In certain embodiments, graphene makes up 39.9% or less of a nanocomposite by weight. For example, in certain embodiments, graphene makes up 5% to 15% of a nanocomposite by weight. In certain embodiments, graphene makes up 5% to 70% of a nanocomposite by weight. In certain embodiments, graphene makes up 10% to 65% of a nanocomposite by weight. In certain embodiments, graphene makes up 10% to 60% of a nanocomposite by weight.

In certain embodiments, boron nitride in a nanocomposite is hexagonal boron nitride (h-BN). In certain embodiments, hexagonal boron nitride makes up 0.1% to 99.9% of a nanocomposite by weight. In certain embodiments, hexagonal boron nitride makes up 0.1% to 50% of a nanocomposite by weight. In certain embodiments, hexagonal boron nitride makes up 0.1% to 30% of a nanocomposite by weight. In certain embodiments, hexagonal boron nitride makes up 0.1% to 25% of a nanocomposite by weight. In certain embodiments, hexagonal boron nitride makes up 39.9% or less of a nanocomposite by weight. In certain embodiments, hexagonal boron nitride makes up 25% to 35% of a nanocomposite by weight. In certain embodiments, hexagonal boron nitride makes up 5% to 85% of a nanocomposite by weight. In certain embodiments, hexagonal boron nitride makes up 10% to 75% of a nanocomposite by weight. In certain embodiments, hexagonal boron nitride makes up 15% to 60% of a nanocomposite by weight.

In certain aspects, the present disclosure provides a method of preparing a nanoparticle/graphene/BN/sulfur (S) nanocomposite including steps of: combining a nanoparticle/graphene/BN nanocomposite with sulfur to provide a mixture; and ball-milling the mixture. In certain embodiments, nanoparticles include transition metal oxide nanoparticles, metal sulfide nanoparticles, metal nitride nanoparticles, nanoparticles of a metal or metal alloy, silicon nanoparticles, silicon oxide nanoparticles, or combinations thereof. In certain aspects, the present disclosure provides a method of preparing a metal oxide/graphene/BN/sulfur (S) nanocomposite including steps of: combining a metal oxide/graphene/BN nanocomposite with sulfur to provide a mixture; and ball-milling the mixture. In certain aspects, the present disclosure provides a method of preparing a metal sulfide/graphene/BN/sulfur (S) nanocomposite including steps of: combining a metal sulfide/graphene/BN nanocomposite with sulfur to provide a mixture; and ball-milling the mixture. In certain aspects, the present disclosure provides a method of preparing a metal/graphene/BN/sulfur (S) nanocomposite including steps of: combining a metal/graphene/BN nanocomposite with sulfur to provide a mixture; and ball-milling the mixture. In certain aspects, the present disclosure provides a method of preparing a metal nitride/graphene/BN/sulfur (S) nanocomposite including steps of: combining a metal nitride/graphene/BN nanocomposite with sulfur to provide a mixture; and ball-milling the mixture. In certain aspects, the present disclosure provides a method of preparing a silicon/graphene/BN/sulfur (S) nanocomposite including steps of: combining a silicon/graphene/BN nanocomposite with sulfur to provide a mixture; and ball-milling the mixture. In certain aspects, the present disclosure provides a method of preparing a silicon oxide/graphene/BN/sulfur (S) nanocomposite including steps of: combining a silicon oxide/graphene/BN nanocomposite with sulfur to provide a mixture; and ball-milling the mixture. In certain embodiments, a step of ball-milling is performed for at least 20 minutes. For example, in certain embodiments, a step of ball-milling is performed for 30 to 60 minutes.

In certain embodiments, the present disclosure provides a metal oxide/graphene/BN/sulfur (S) nanocomposite prepared by any method described in the present disclosure. In certain embodiments, the present disclosure provides a metal/graphene/BN/sulfur (S) nanocomposite prepared by any method described in the present disclosure. In certain embodiments, the present disclosure provides a metal sulfide/graphene/BN/sulfur (S) nanocomposite prepared by any method described in the present disclosure. In certain embodiments, the present disclosure provides a metal nitride/graphene/BN/sulfur (S) nanocomposite prepared by any method described in the present disclosure. In certain embodiments, the present disclosure provides a silicon/graphene/BN/sulfur (S) nanocomposite prepared by any method described in the present disclosure. In certain embodiments, the present disclosure provides a silicon oxide/graphene/BN/sulfur (S) nanocomposite prepared by any method described in the present disclosure.

In certain embodiments, a nanocomposite is made up of between 40% and 90% sulfur by weight. For example, in certain embodiments, a nanocomposite is made up of 55% to 65% sulfur by weight. For example, in certain embodiments, a nanocomposite is made up of 65% to 75% sulfur by weight. For example, in certain embodiments, a nanocomposite is made up of 75% to 85% sulfur by weight.

In certain aspects, the present disclosure is related to a method of preparing an electrode including: mixing a nanocomposite, such as described in the present disclosure, with one or more conductive agent(s), a binding agent, and an optional additive in a solvent to obtain a slurry; coating a foil substrate with the slurry to form a film; and drying the film under vacuum. For example, in certain embodiments, a step of mixing includes mixing a nanocomposite with one or more conductive agent(s), a binding agent and an additive in a solvent to obtain a slurry, where the additive is oxalic acid. For example, in certain embodiments, a conductive agent is carbon black. For example, in certain embodiments, a binding agent is polyvinylidene fluoride. For example, in certain embodiments, a binding agent is a polyvinylidene fluoride resin. For example, in certain embodiments, a solvent is an equal volumes mixture of dimethyl sulfoxide and ethanol. For example, in certain embodiments, a solvent is N-methyl-2-pyrrolidone (NMP). In certain embodiments, a film is dried at 60 to 110° C. In certain embodiments, the present disclosure is directed to an electrode prepared by a method described in the present disclosure.

In certain embodiments, a nanocomposite makes up at least 70% of a dried film by weight. For example, in certain embodiments, a nanocomposite makes up 75% to 85% of a dried film by weight. For example, in certain embodiments, a nanocomposite makes up 90% to 95% of a dried film by weight.

In certain aspects, the present disclosure is related to a method of preparing an electrode including: dispersing one or more conductive agent(s) in a solvent to prepare a first solution; preparing a second solution of a binding agent with an optional additive in a solvent; dispersing a nanocomposite in a solvent to prepare a third solution; mixing the first, second, and third solutions to obtain a slurry; coating a foil substrate with the slurry to form a film; and drying the film under vacuum.

In certain embodiments, a nanocomposite is dried at 90 to 140° C. prior to being dispersed in solvent.

In certain embodiments, a binding agent is carbon black. In certain embodiments, a binding agent is a polyvinylidene resin. In certain embodiments, a binding agent is polyvinylidene fluoride. In certain embodiments, a binding agent is polyvinylidene fluoride resin.

In certain embodiments, a solvent is N-methyl-2-pyrrolidone (NMP).

In certain embodiments, a mixing step is performed using a FlackTek Speed Mixer™, followed by further mixing in a Primix mixer.

In certain embodiments, the present disclosure is related to an electrode prepared by methods described in the present disclosure.

In certain embodiments, a nanocomposite makes up at least 70% of a dried film by weight.

In certain embodiments, a nanocomposite makes up at least 90% of a dried film by weight.

In certain aspects, the present disclosure is related to a method of preparing an electrode including: mixing a nanocomposite, (for example, a metal oxide/graphene/BN/S nanocomposite as described in the present disclosure), with a conductive agent and a binding agent in a solvent to form a slurry; coating a foil substrate with the slurry to form a film; and drying the film under vacuum.

In certain embodiments, a conductive agent is carbon black.

In certain embodiments, a binding agent is polyvinylidene resin. In certain embodiments, a binding agent is polyvinylidene fluoride. In certain embodiments, a binding agent is polyvinylidene fluoride resin.

In certain embodiments, a film is dried at 65 to 95° C.

In certain embodiments, the present disclosure is related to an electrode prepared by a method described in the present disclosure.

In certain embodiments, a nanocomposite makes up at least 80% of a dried film by weight.

In certain embodiments, the disclosure is related to a lithium-ion battery including an anode, a cathode, an electrolyte, and a separator between the anode and the cathode, where the anode includes a nanocomposite described herein.

In certain embodiments, a lithium-ion battery has a specific capacity in the range of 30 milliampere hour/gram (mAh/g) to 100 mAh/g at 25° C. and a specific capacity in the range of 100 to 500 mAh/g at 150° C.

In certain embodiments, a lithium-ion battery has a coulombic efficiency of at least 90% after 100 charge-discharge cycles at about 150° C.

In certain embodiments, the present disclosure is related to a lithium-sulfur battery including a cathode, an anode, an electrolyte, and a separator between the anode and the cathode, where the cathode includes a metal oxide/graphene/BN/S nanocomposite.

In certain embodiments, the present disclosure is related to a lithium-sulfur battery, where after 10 charge-discharge cycles at 25° C., at least 60% capacity is retained. In certain embodiments, 65% to 75% capacity is retained after 10 charge-discharge cycles of a lithium-sulfur battery at 25° C. In some such embodiments, after an additional 40 charge-discharge cycles, capacity loss is less than 35% relative to the capacity at the end of the $10^{th}$ cycle.

BRIEF DESCRIPTION OF THE DRAWING

The drawing is presented in the present disclosure for illustration purposes, without the intention of limiting the scope of the subject matter described in the present disclosure.

The foregoing and other objects, aspects, features, and advantages of the present disclosure will become more apparent and better understood by referring to the following description taken in conjunction with the accompanying drawing, in which.

Figure 14:
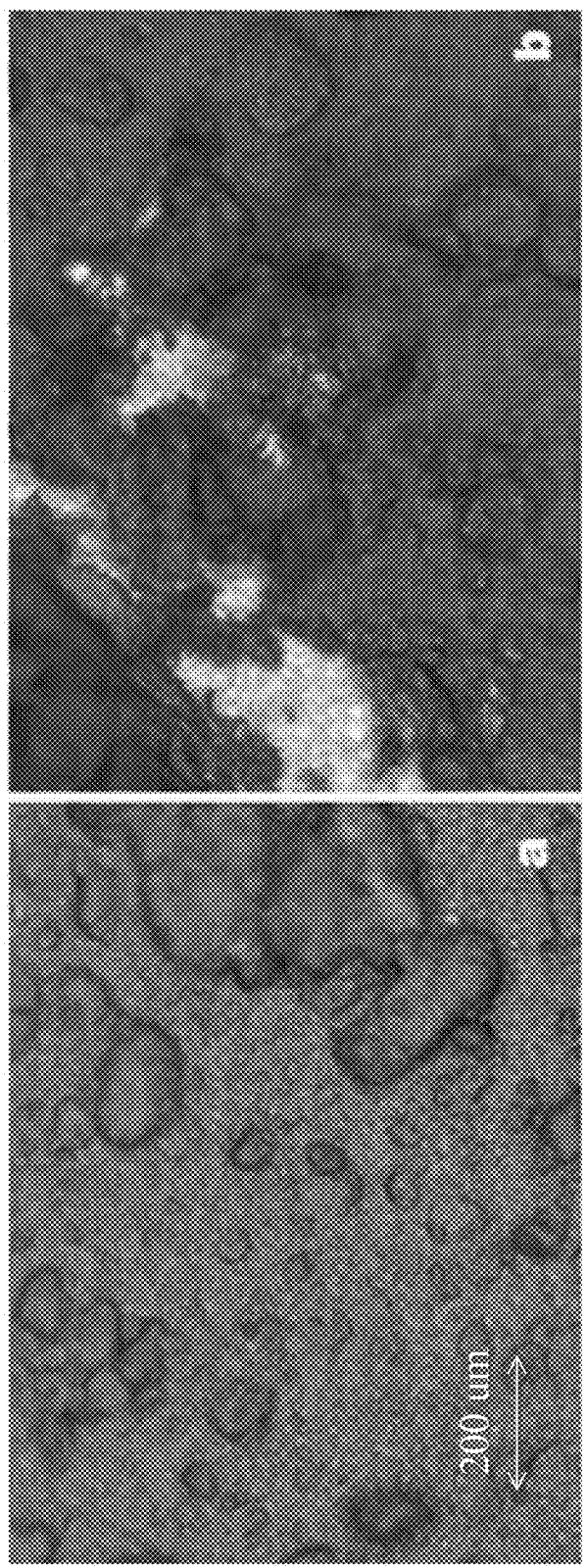
Figure 15:
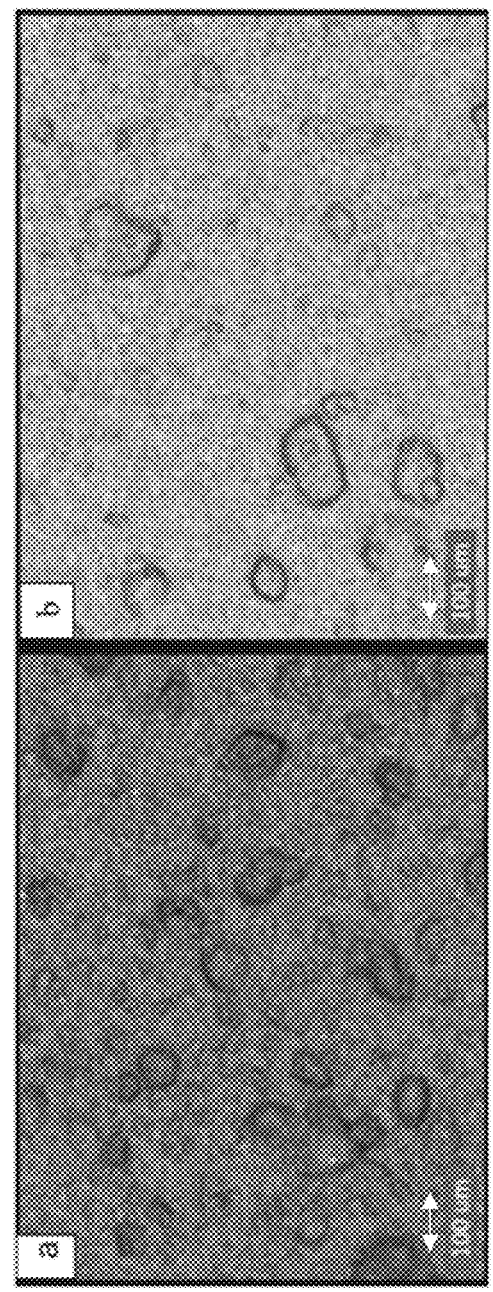
Figure 16:
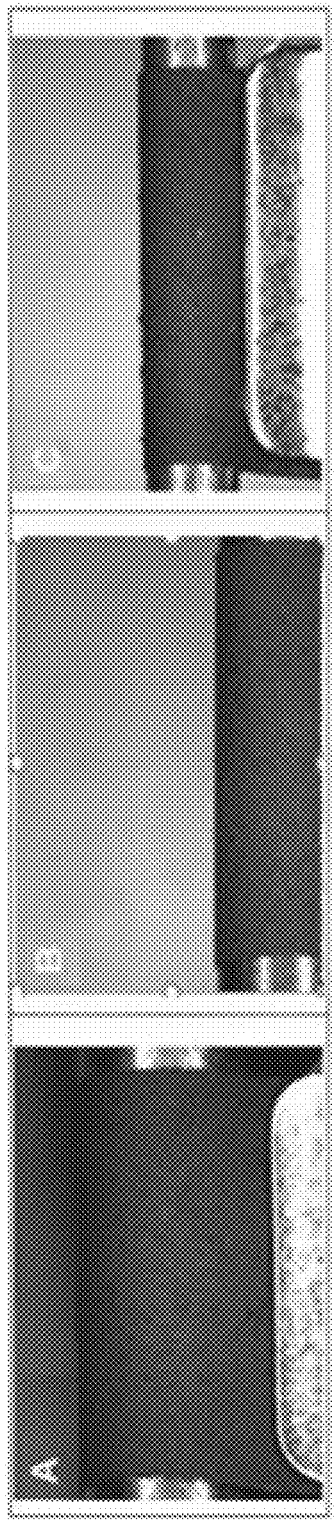
Figure 17:
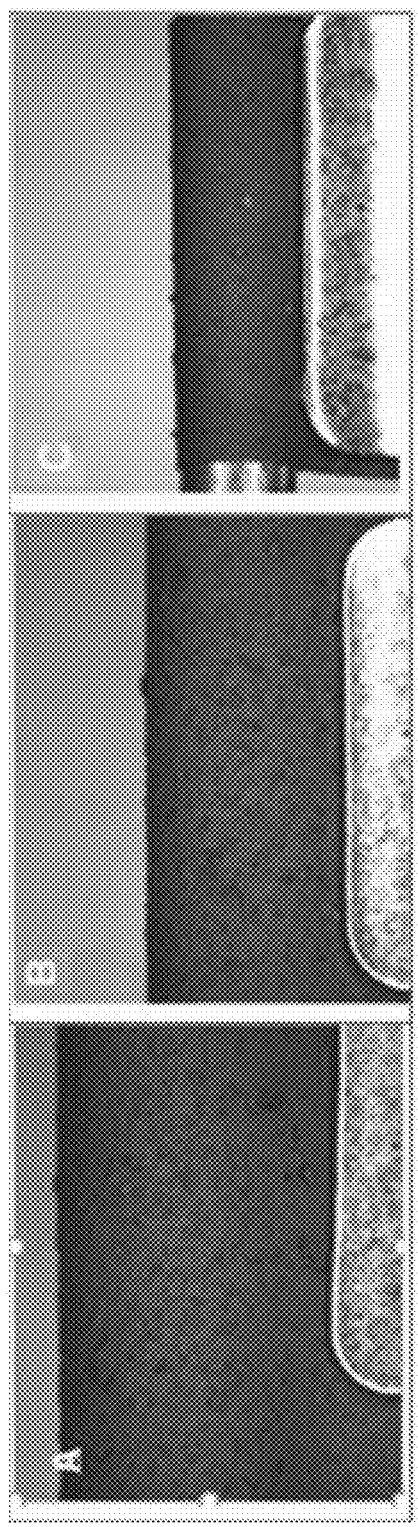
Figure 18:
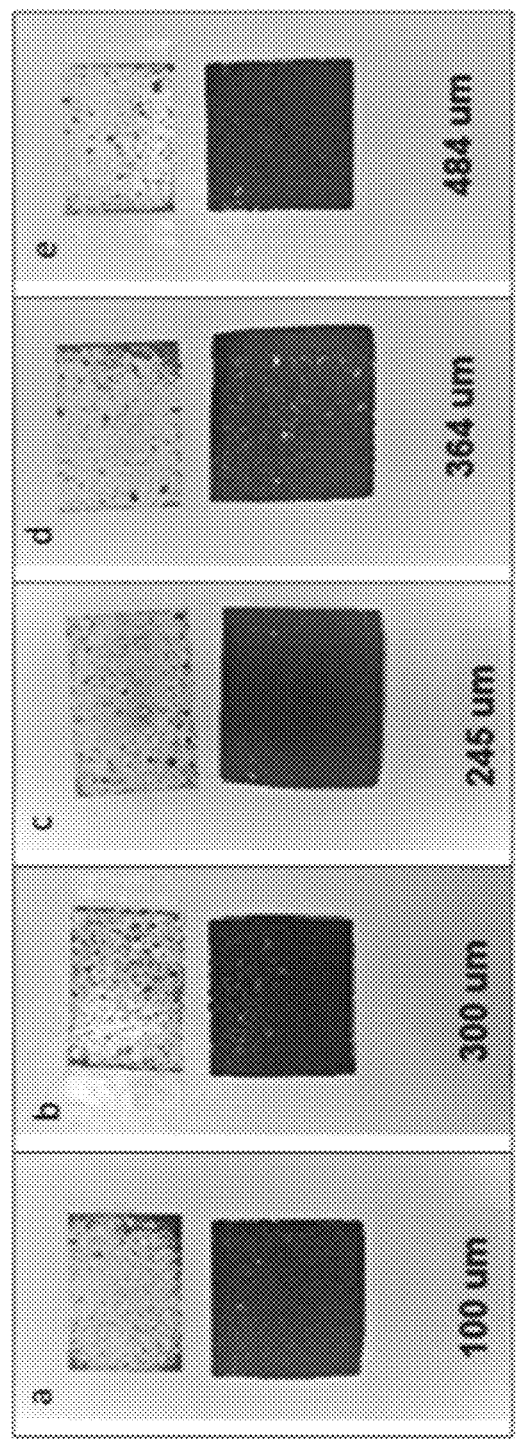
Figure 19:
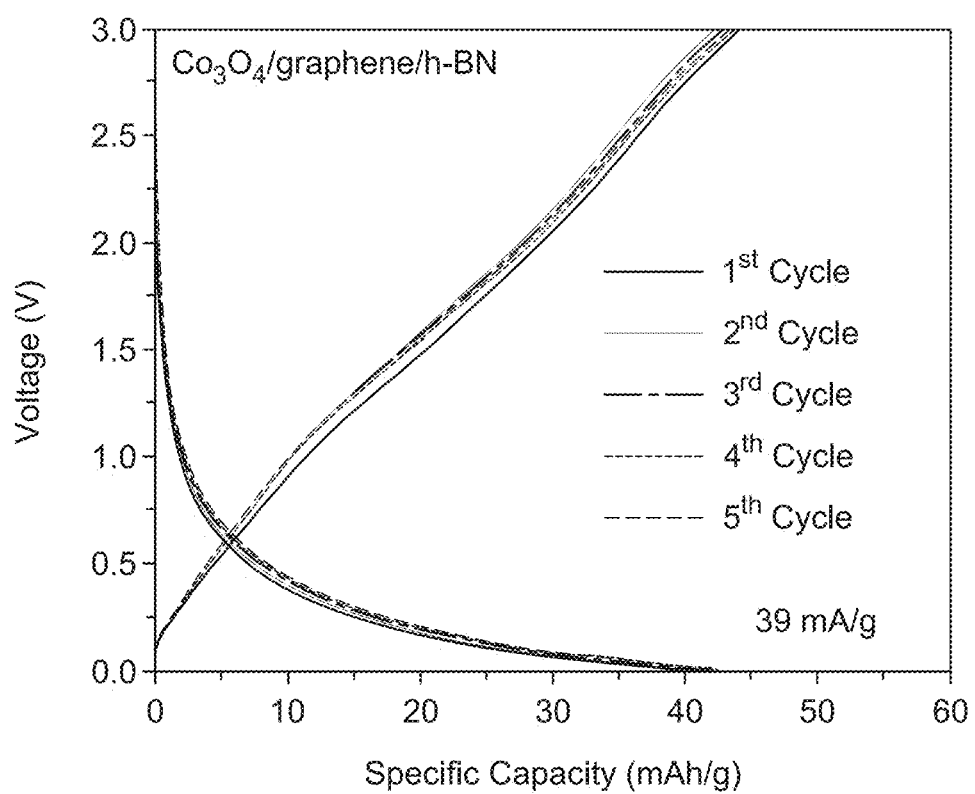
Figure 20:
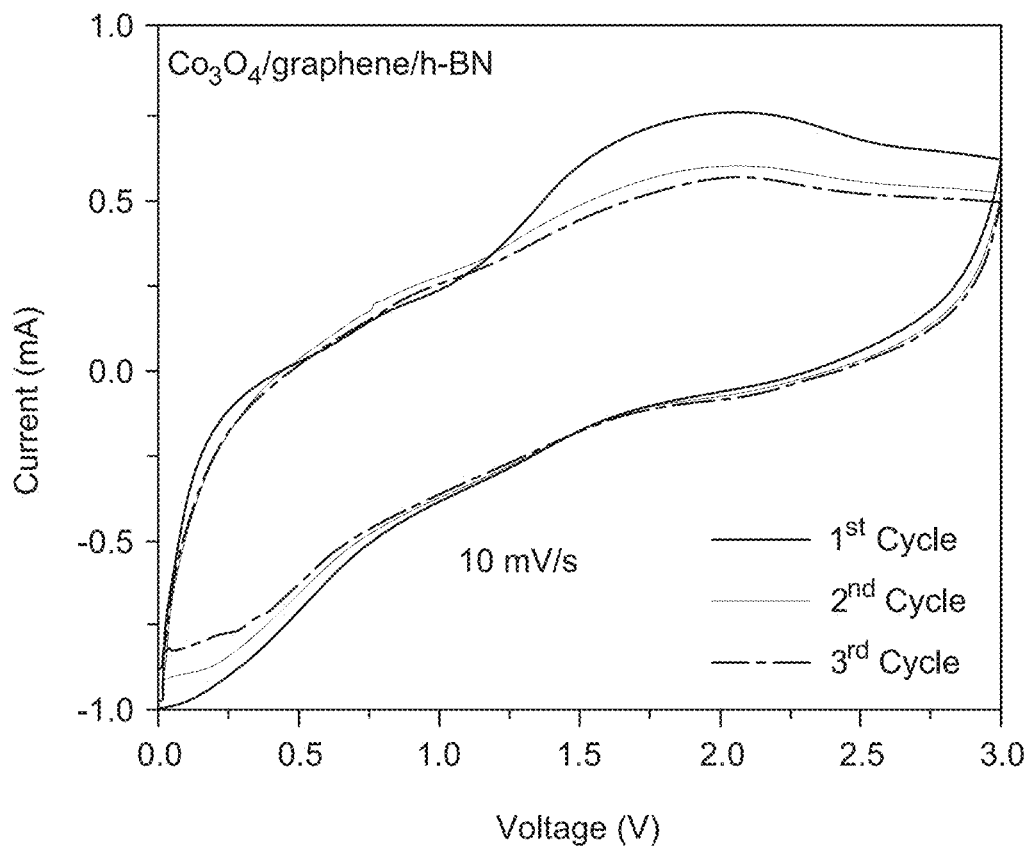
Figure 21:
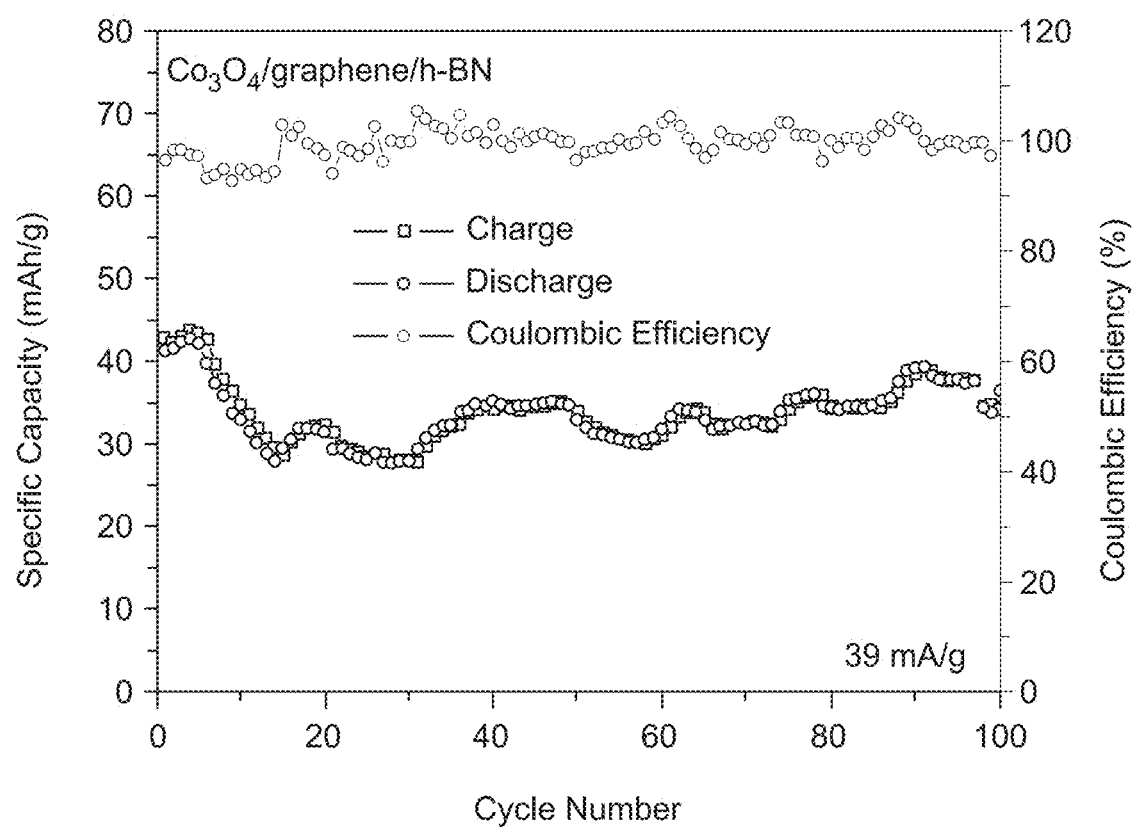
Figure 22:
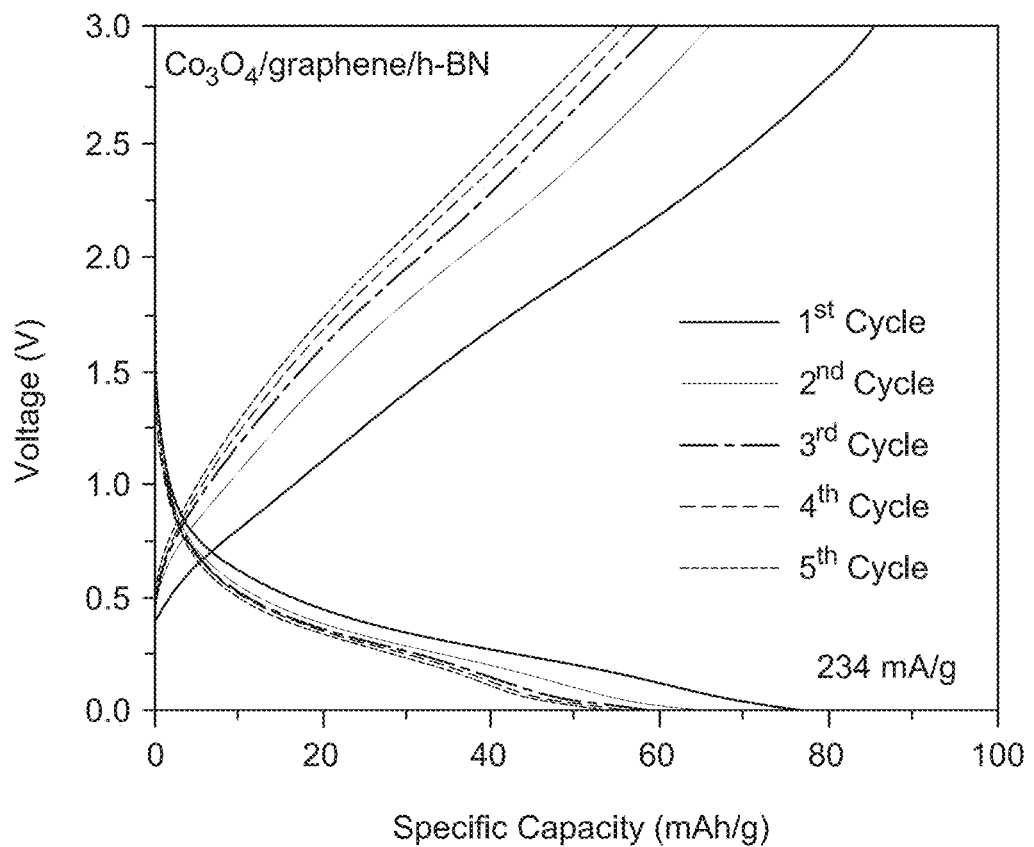
Figure 23:
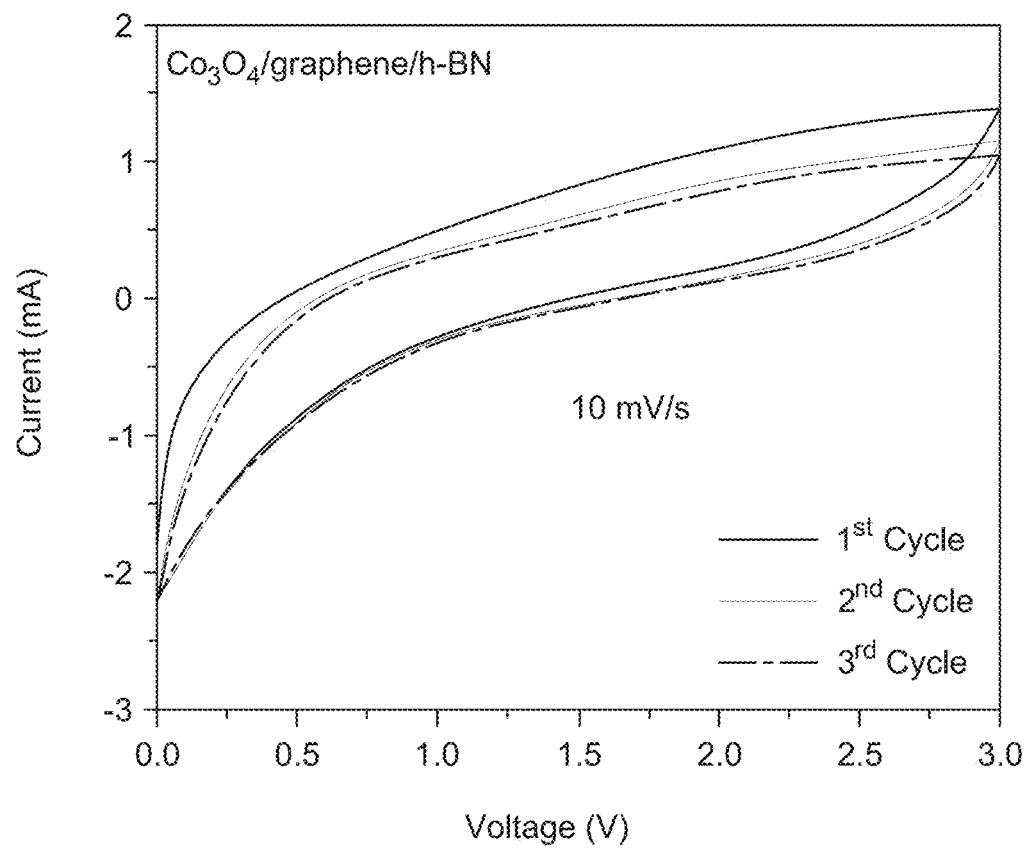
Figure 24:
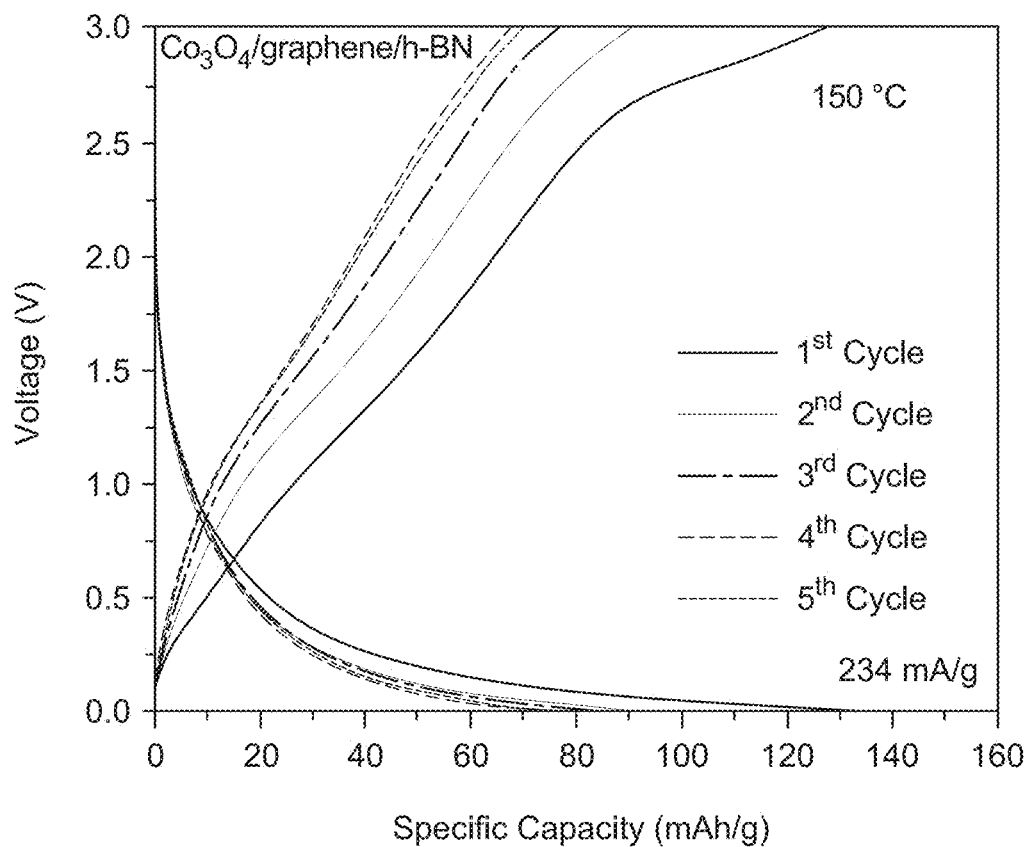
Figure 25:
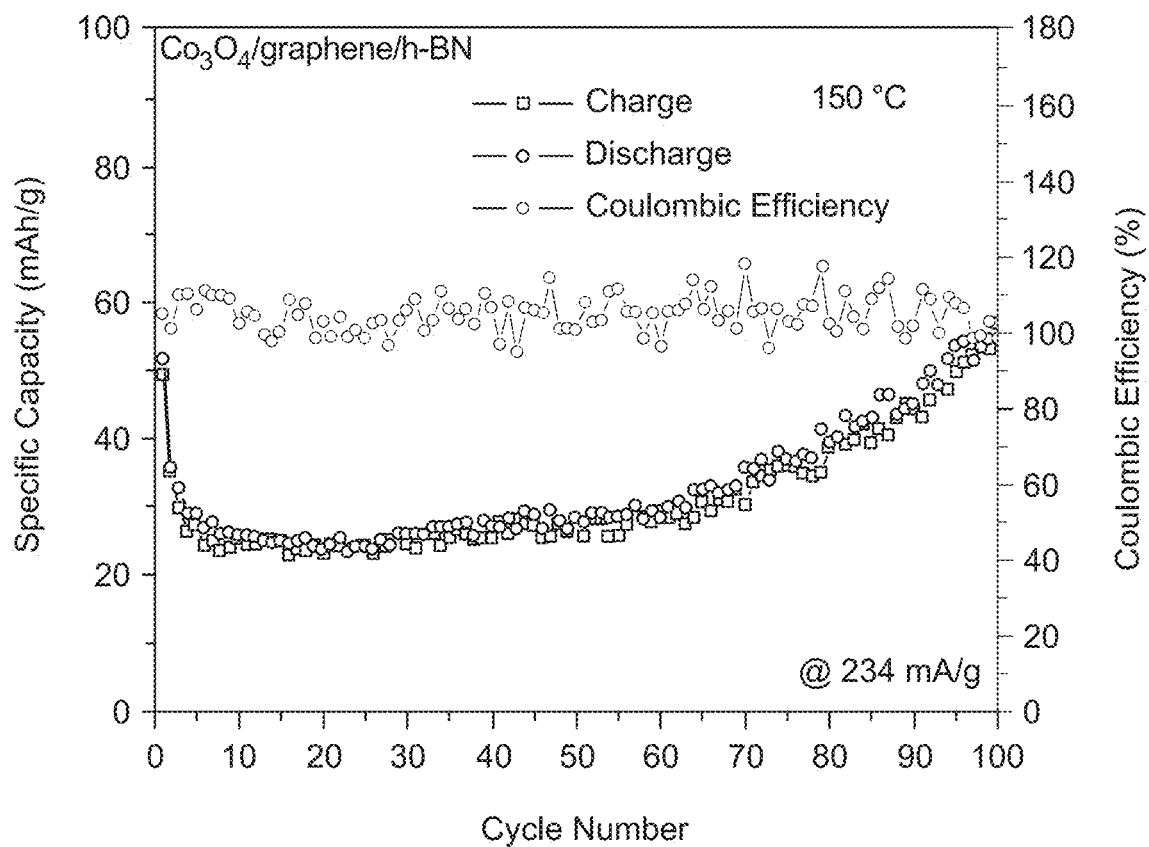
Figure 26:
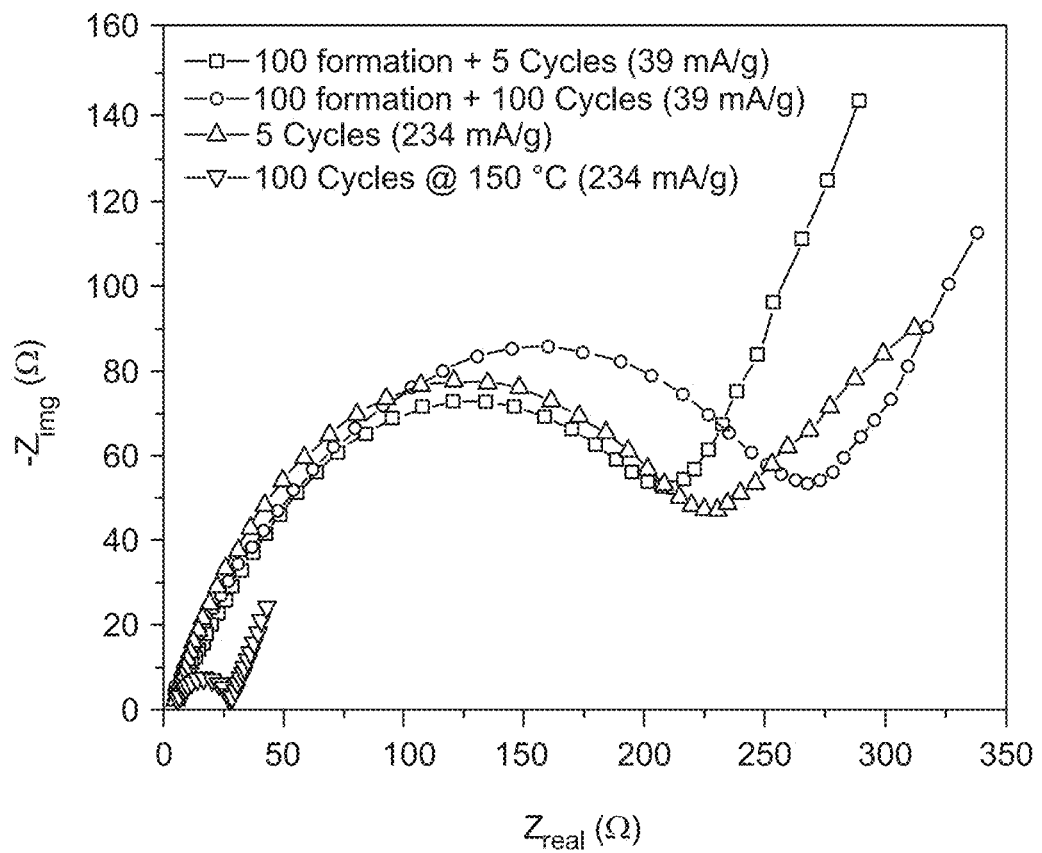
Figure 27:
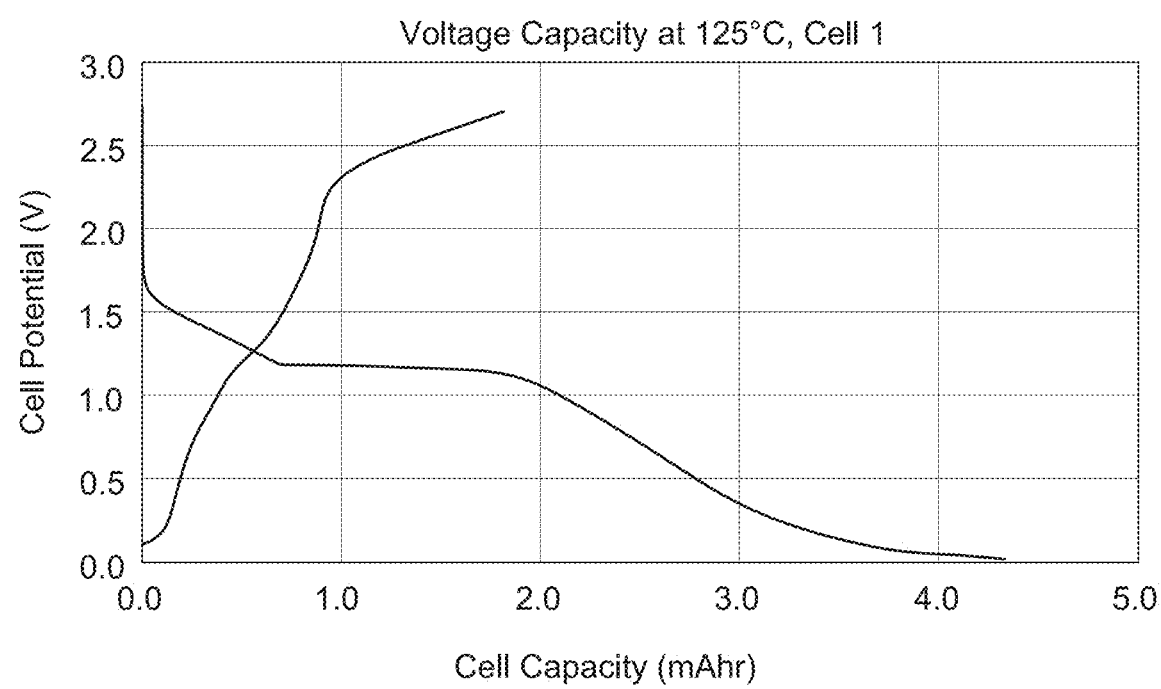
Figure 28:
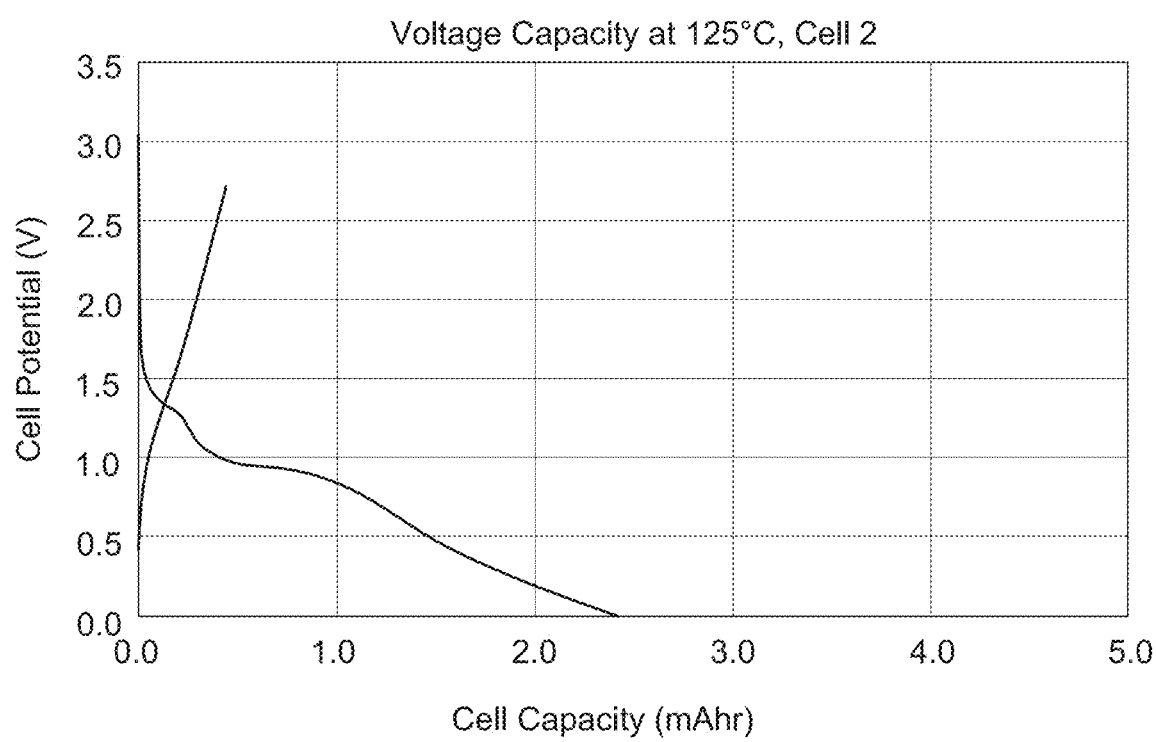
Figure 29:
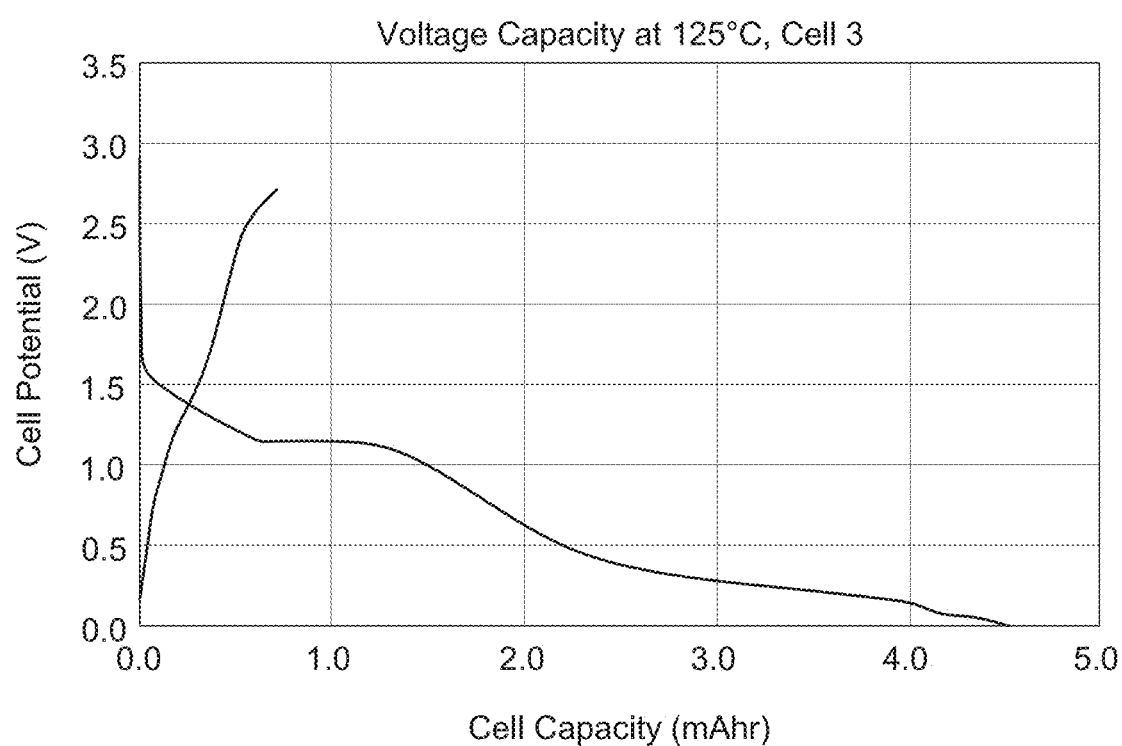
Figure 30:
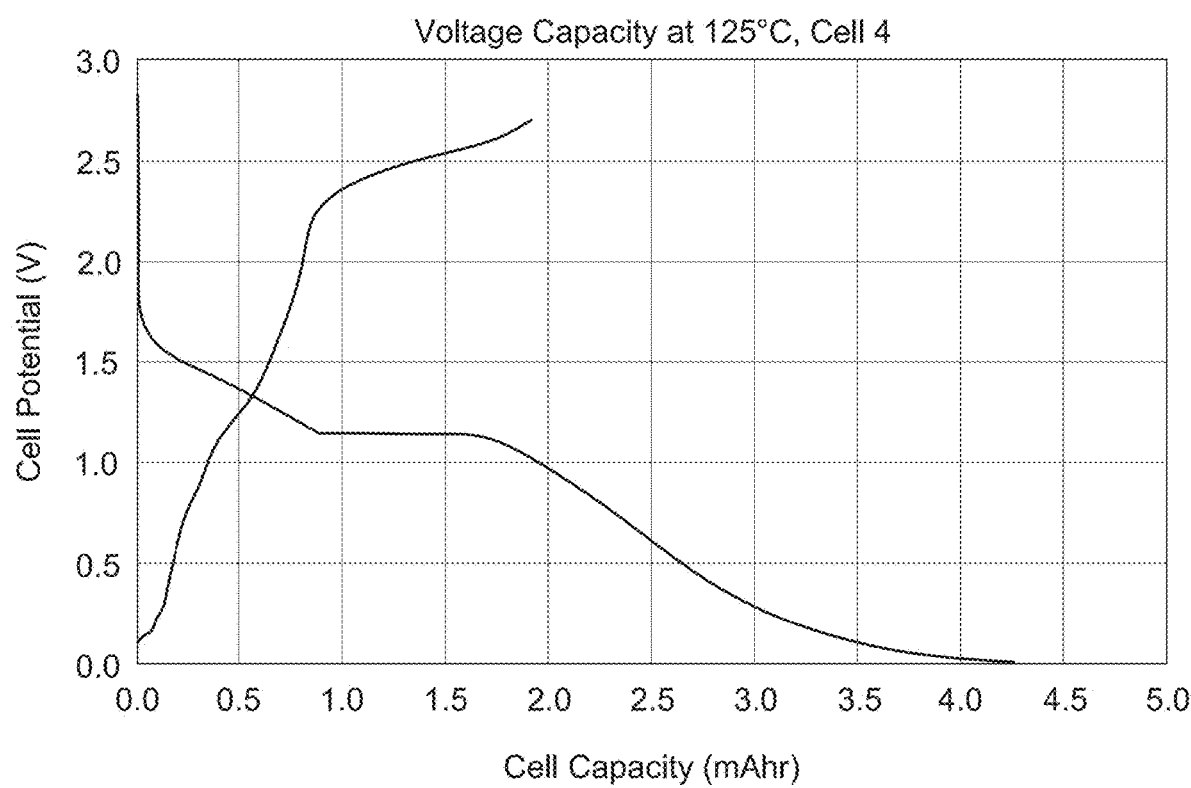
Figure 31:
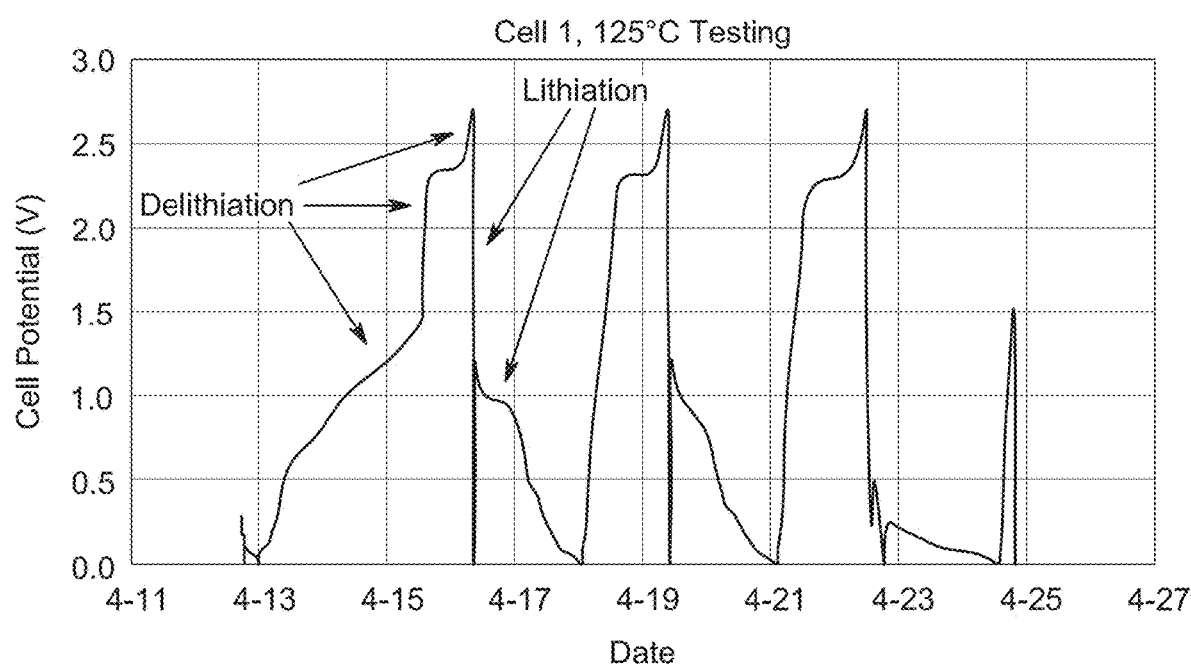
Figure 32:
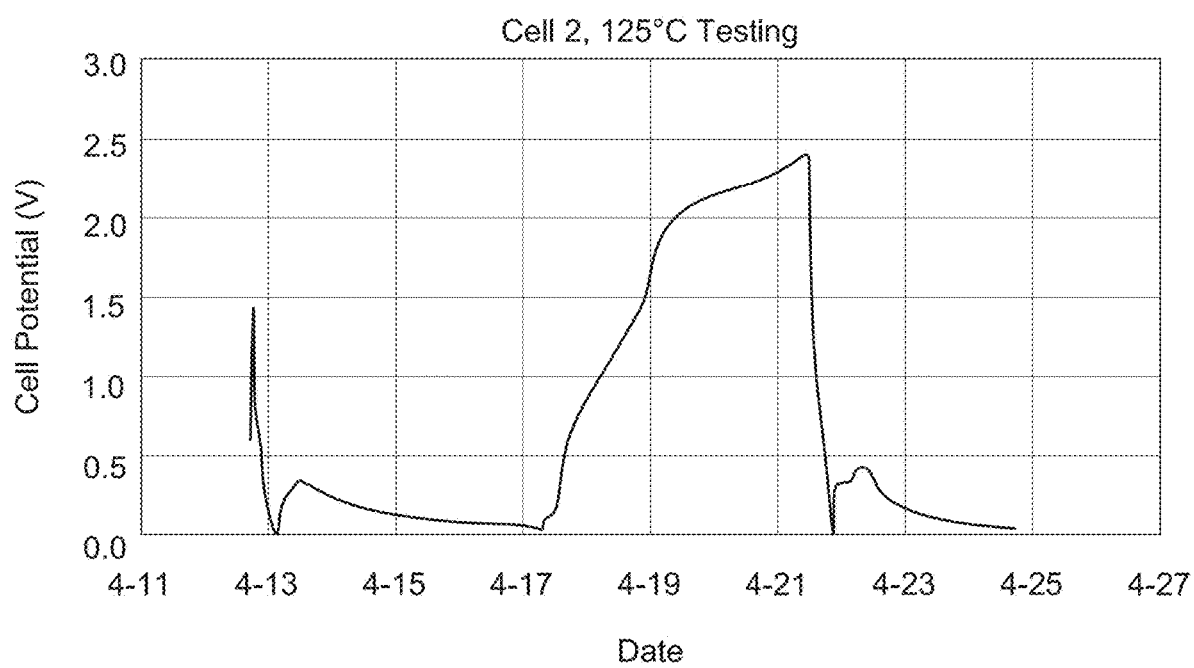
Figure 33:
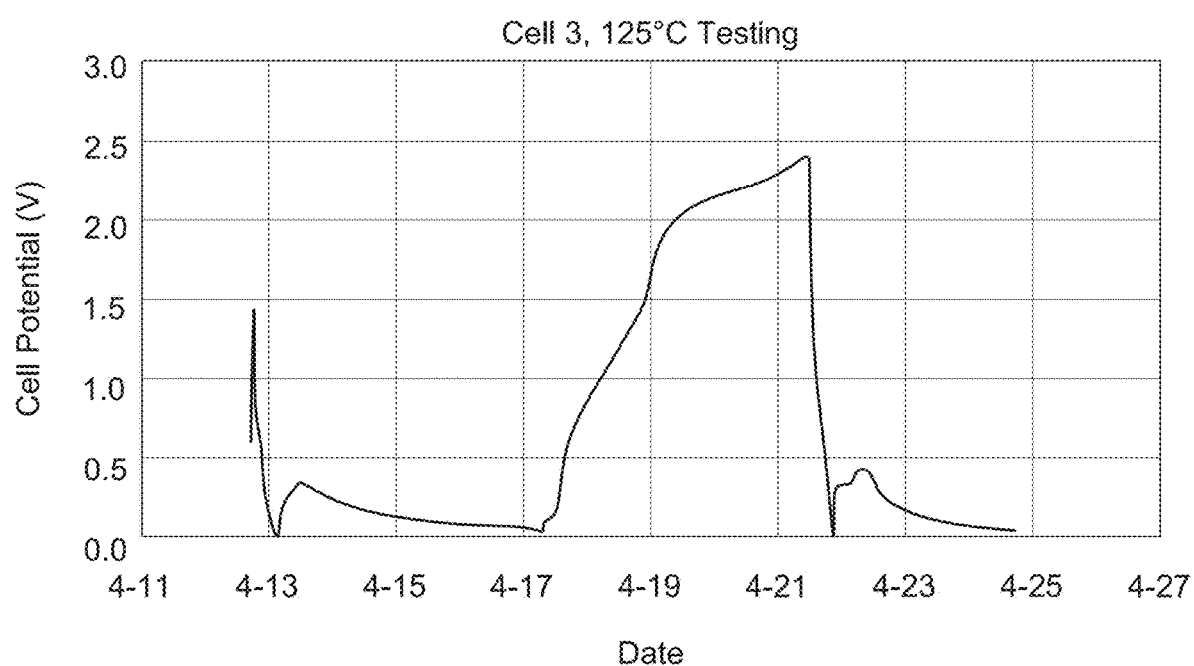
Figure 34:
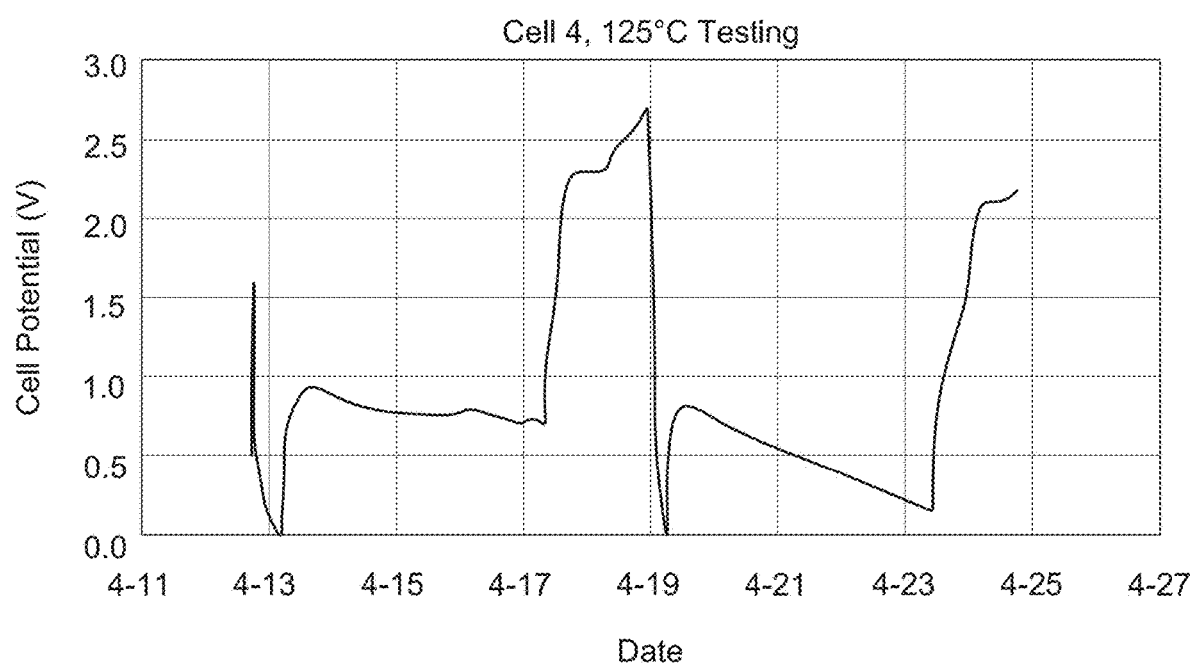
Figure 35:
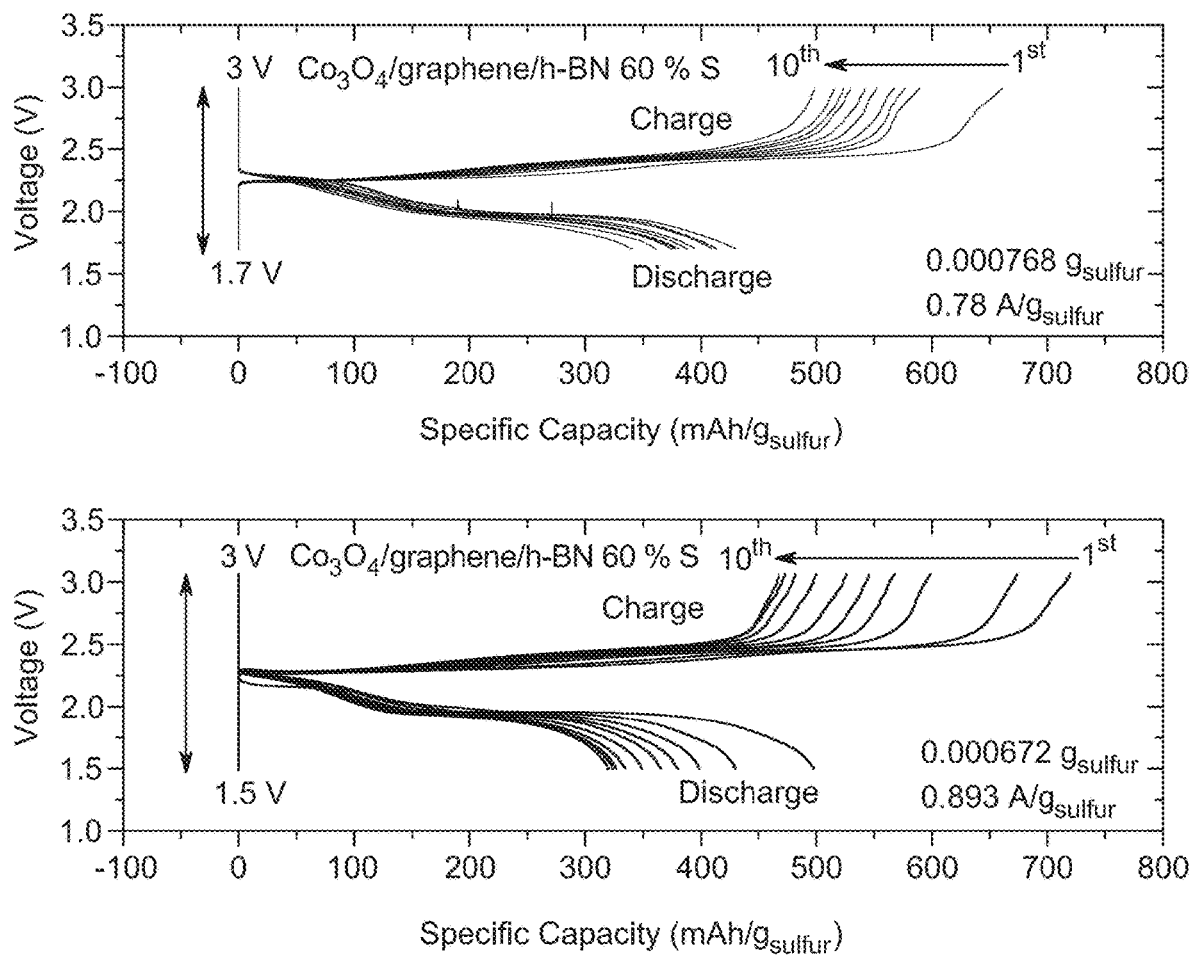
Figure 36:
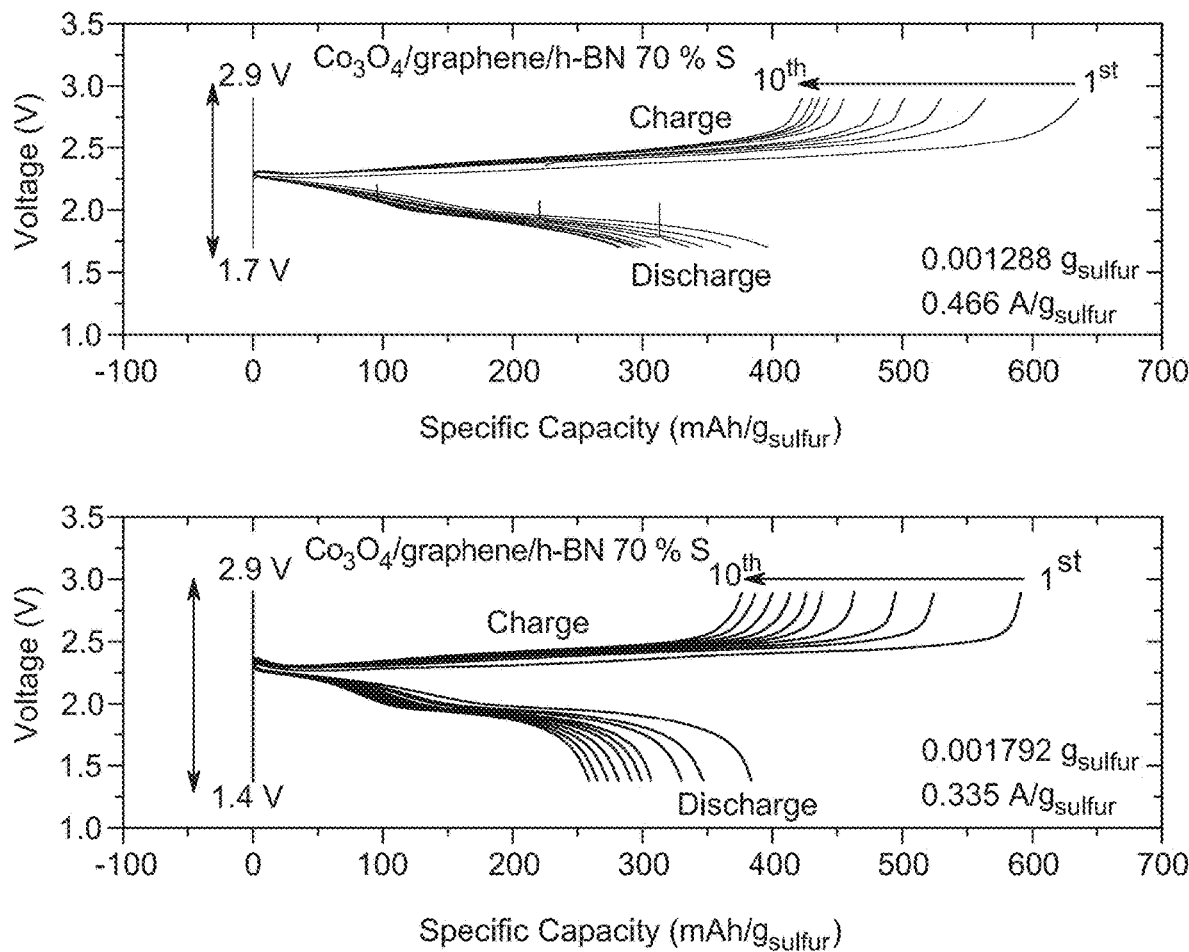
Figure 37:
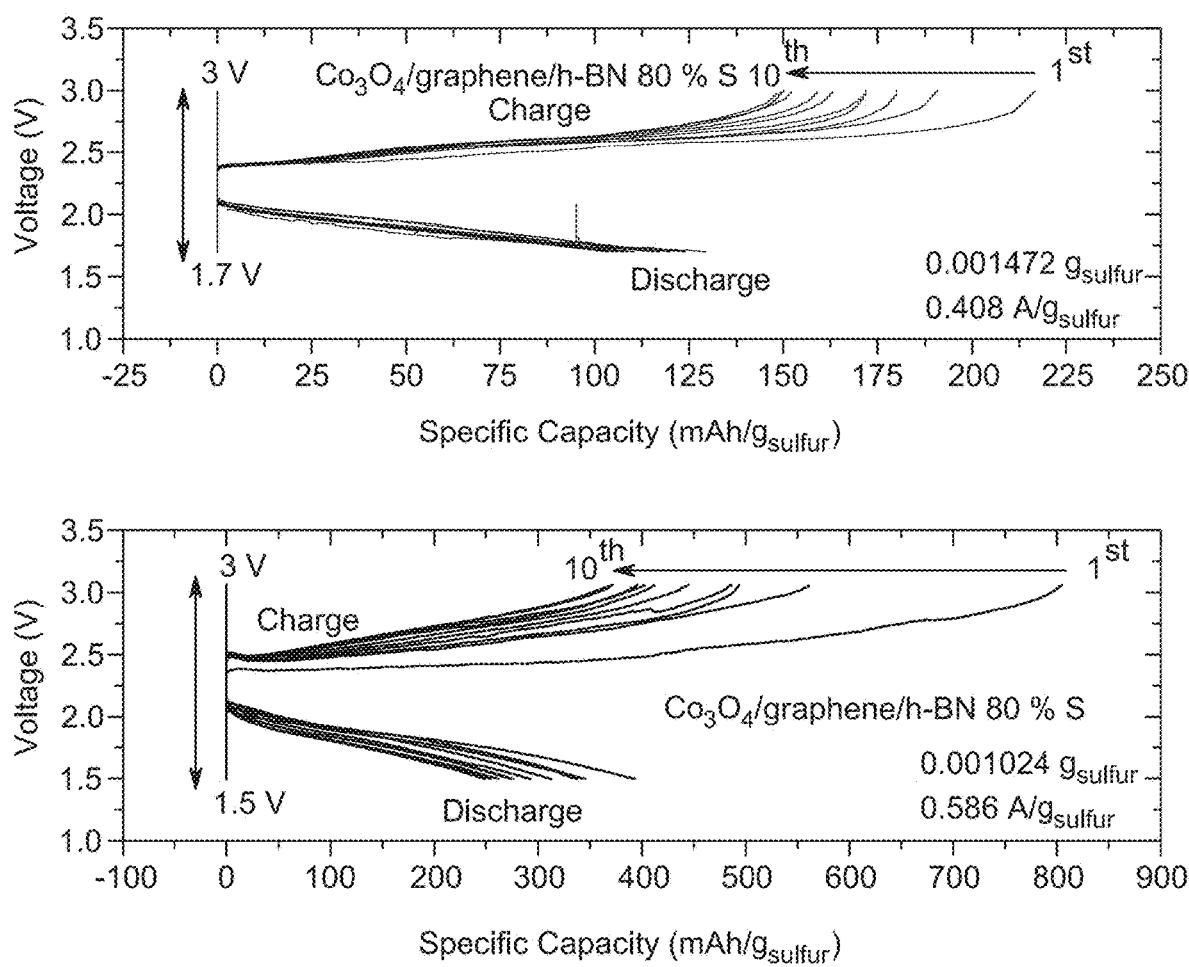
Figure 38:
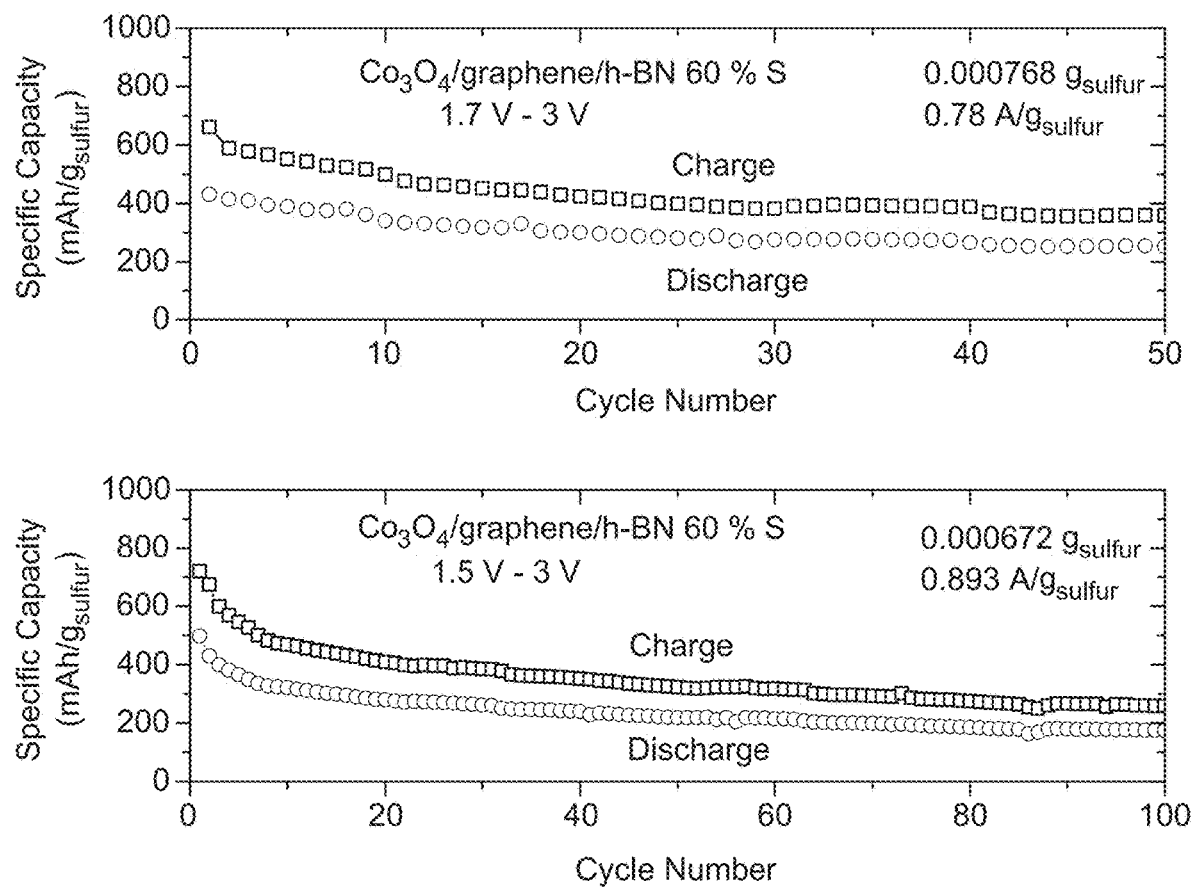
Figure 39:
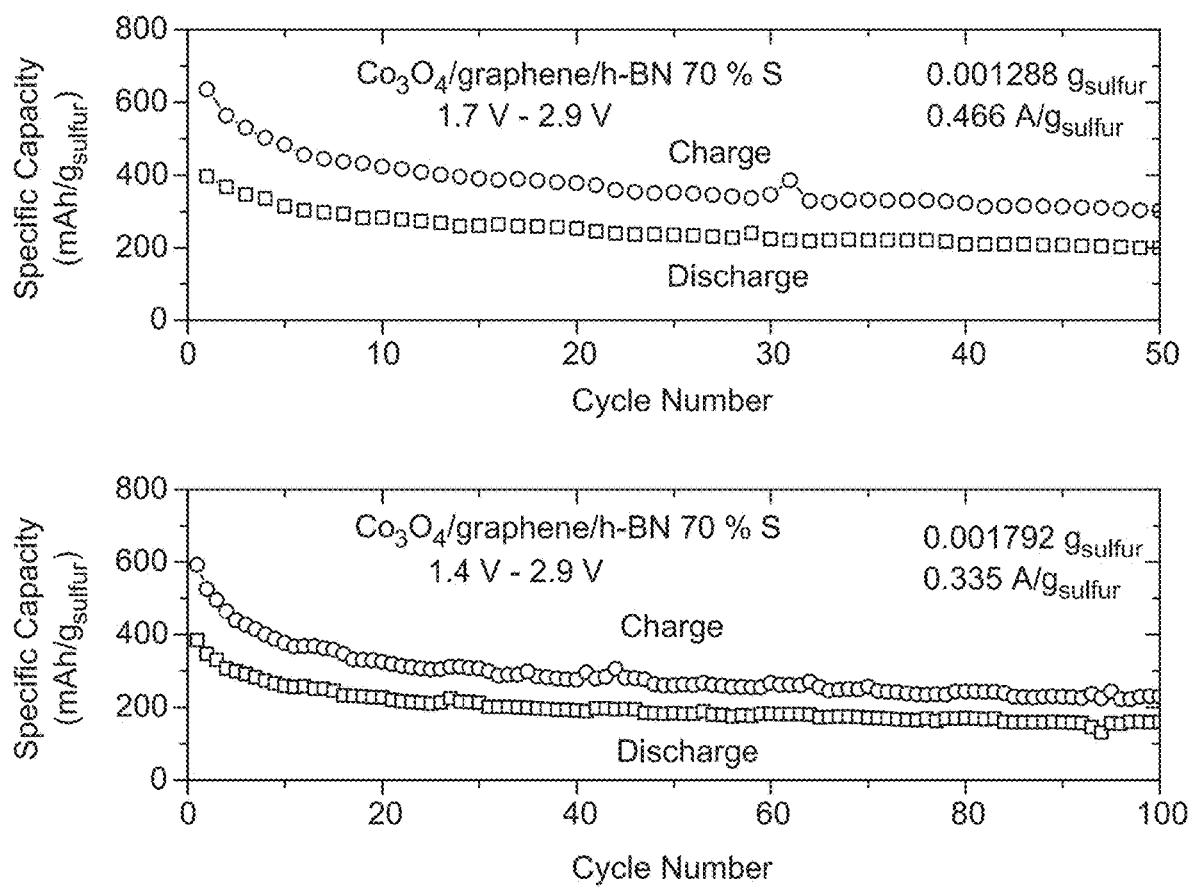
Figure 40:
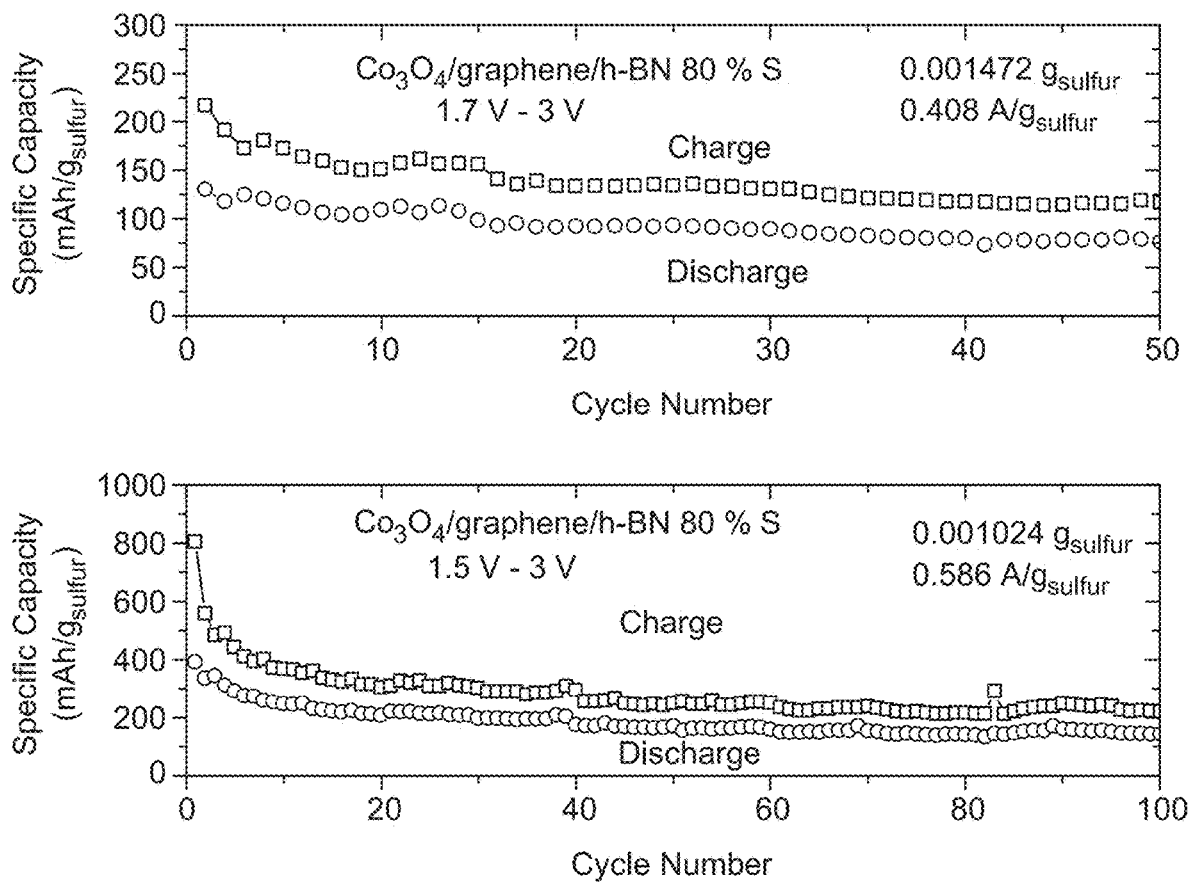
Figure 41:
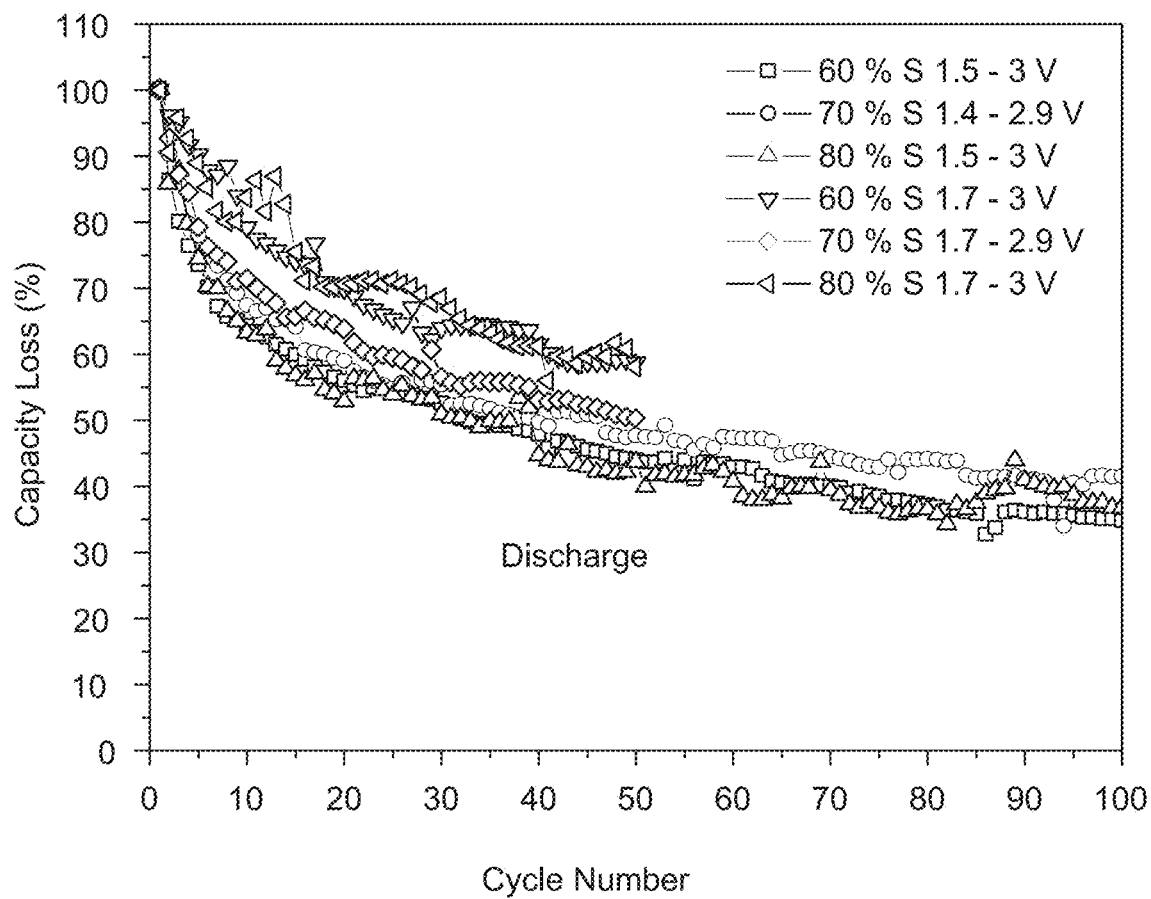
Figure 42:
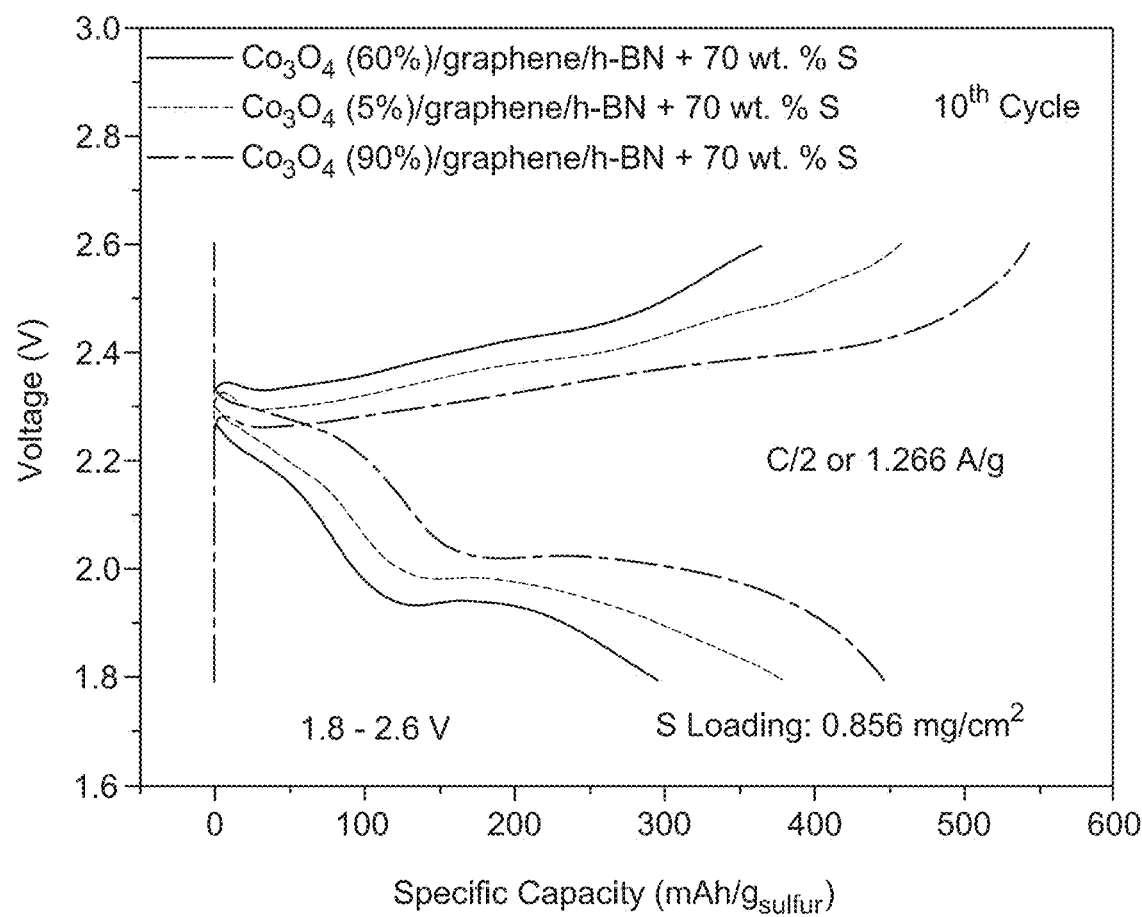
Figure 43:
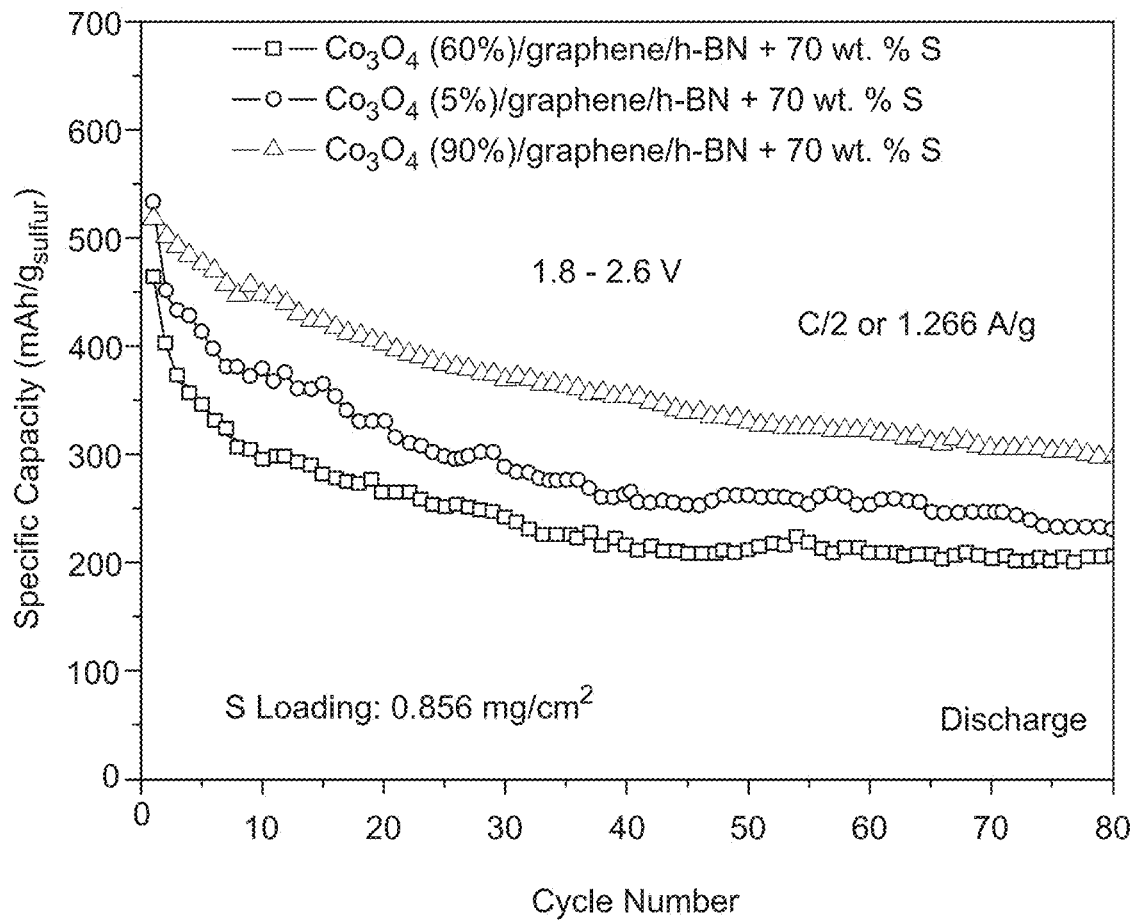

Panel A of FIG. 14 is an optical image of an electrode surface coated with the active material after initial coating, according to an illustrative embodiment;

Panel B of FIG. 14 is an optical image of the electrode surface coating of FIG. 14A after crushing of agglomerated particles on the surface, according to an illustrative embodiment;

Panel A of FIG. 15 is an optical image of an electrode surface coated with the Electrode 420 Formulation, according to an illustrative embodiment;

Panel B of FIG. 15 is an optical image of an electrode surface coated with the Electrode 420 Formulation subjected to additional mixing with a Primix mixer, according to an illustrative embodiment;

Panel A of FIG. 16 is an optical microscope photograph of the bend radius testing of a $Co_3O_4$/graphene/h-BN anode material with a loading of 2.77 mg/cm² and Doctor Blade gap of 100 μm for a diameter of ¼ inch, according to an illustrative embodiment;

Panel B of FIG. 16 is an optical microscope photograph of the bend radius testing of a $Co_3O_4$/graphene/h-BN anode material with a loading of 2.77 mg/cm² and Doctor Blade gap of 100 μm for a diameter of 3/16 inch, according to an illustrative embodiment;

Panel C of FIG. 16 is an optical microscope photograph of the bend radius testing of a $Co_3O_4$/graphene/h-BN anode material with a loading of 2.77 mg/cm² and Doctor Blade gap of 100 μm for a diameter of ⅛ inch, according to an illustrative embodiment;

Panel A of FIG. 17 is an optical microscope photograph of the bend radius testing of a $Co_3O_4$/graphene/h-BN anode material with a loading of 6.84 mg/cm² and Doctor Blade gap of 300 μm for a diameter of ¼ inch, according to an illustrative embodiment;

Panel B of FIG. 17 is an optical microscope photograph of the bend radius testing of a $Co_3O_4$/graphene/h-BN anode material with a loading of 6.84 mg/cm² and Doctor Blade gap of 300 μm for a diameter of 3/16 inch, according to an illustrative embodiment;

Panel C of FIG. 17 is an optical microscope photograph of the bend radius testing of a $Co_3O_4$/graphene/h-BN anode material with a loading of 6.84 mg/cm² and Doctor Blade gap of 300 μm for a diameter of ⅛ inch, according to an illustrative embodiment;

Panel A of FIG. 18 is a digital photograph of a $Co_3O_4$/graphene/h-BN anode material after adhesion testing with a 100 μm Doctor Blade gap and the Scotch tape used in the test, according to an illustrative embodiment;

Panel B of FIG. 18 is a digital photograph of a $Co_3O_4$/graphene/h-BN anode material after adhesion testing with a 300 μm Doctor Blade gap and the Scotch tape used in the test, according to an illustrative embodiment;

Panel C of FIG. 18 is a digital photograph of a $Co_3O_4$/graphene/h-BN anode material after adhesion testing with a 245 μm Doctor Blade gap and the Scotch tape used in the test, according to an illustrative embodiment;

Panel D of FIG. 18 is a digital photograph of a $Co_3O_4$/graphene/h-BN anode material after adhesion testing with a 364 μm Doctor Blade gap and the Scotch tape used in the test, according to an illustrative embodiment;

Panel E of FIG. 18 is a digital photograph of a $Co_3O_4$/graphene/h-BN anode material after adhesion testing with a 484 μm Doctor Blade gap and the Scotch tape used in the test, according to an illustrative embodiment;

FIG. 19 is a plot of the charge-discharge cycles of a $Co_3O_4$/graphene/h-BN anode material at a current density of 39 milliampere/gram (mA/g), according to an illustrative embodiment;

FIG. 20 is a plot of the cyclic voltammogram of a $Co_3O_4$/graphene/h-BN anode material after five charge-discharge cycles at a current density of 39 mA/g, according to an illustrative embodiment;

FIG. 21 is a plot of the specific capacity and coulombic efficiency of a $Co_3O_4$/graphene/h-BN anode material over 100 charge-discharge cycles, according to an illustrative embodiment;

FIG. 22 is a plot of the charge-discharge cycles of a $Co_3O_4$/graphene/h-BN anode material at a current density of 234 mA/g, according to an illustrative embodiment;

FIG. 23 a plot of the cyclic voltammogram of a $Co_3O_4$/graphene/h-BN anode material after five charge-discharge cycles at a current density of 234 mA/g, according to an illustrative embodiment;

FIG. 24 is a plot of the charge-discharge cycles of a $Co_3O_4$/graphene/h-BN anode material at a current density of 234 mA/g and a temperature of 150° C., according to an illustrative embodiment;

FIG. 25 is a plot of the specific capacity and coulombic efficiency of a $Co_3O_4$/graphene/h-BN anode material over 100 charge-discharge cycles at a temperature of 150° C., according to an illustrative embodiment;

FIG. 26 is a graph depicting the Nyquist plots of $Co_3O_4$/graphene/h-BN anode materials after 5 and 100 charge-discharge cycles at current density of 39 mA/g, after 5 cycles at a current density of 234 mA/g, and after 100 cycles at current density of 234 mA/g and a temperature of 150° C., according to an illustrative embodiment;

FIG. 27 is a plot of the solid-electrolyte interface (SEI) formation and delithiation performance over the first cycle of a $Co_3O_4$/graphene/h-BN anode material, according to an illustrative embodiment;

FIG. 28 is a plot of the SEI formation and delithiation performance over the first cycle of a second $Co_3O_4$/graphene/h-BN anode material, according to an illustrative embodiment;

FIG. 29 is a plot of the SEI formation and delithiation performance over the first cycle of a third $Co_3O_4$/graphene/h-BN anode material, according to an illustrative embodiment;

FIG. 30 is a plot of the SEI formation and delithiation performance over the first cycle of a fourth $Co_3O_4$/graphene/h-BN anode material, according to an illustrative embodiment;

FIG. 31 is a plot of the first three dilithiation-lithiation cycles after full lithiation of a $Co_3O_4$/graphene/h-BN anode material at 125° C., according to an illustrative embodiment;

FIG. 32 is a plot of the first three dilithiation-lithiation cycles after full lithiation of a second $Co_3O_4$/graphene/h-BN anode material at 125° C., according to an illustrative embodiment;

FIG. 33 is a plot of the first three dilithiation-lithiation cycles after full lithiation of a third $Co_3O_4$/graphene/h-BN anode material at 125° C., according to an illustrative embodiment;

FIG. 34 is a plot of the first three dilithiation-lithiation cycles after full lithiation of a fourth $Co_3O_4$/graphene/h-BN anode material at 125° C., according to an illustrative embodiment;

FIG. 35 is a plot of the first 10 charge-discharge cycles of a $Co_3O_4$/graphene/h-BN/60% S cathode material, according to an illustrative embodiment;

FIG. 36 is a plot of the first 10 charge-discharge cycles of a $Co_3O_4$/graphene/h-BN/70% S cathode material, according to an illustrative embodiment;

FIG. 37 is a plot of the first 10 charge-discharge cycles of a $Co_3O_4$/graphene/h-BN/80% S cathode material, according to an illustrative embodiment;

FIG. 38 is a plot of the specific capacity of a $Co_3O_4$/graphene/h-BN/60% S cathode material over the first 50 and 100 charge-discharge cycles, according to an illustrative embodiment;

FIG. 39 is a plot of the specific capacity of a $Co_3O_4$/graphene/h-BN/70% S cathode material over the first 50 and 100 charge-discharge cycles, according to an illustrative embodiment;

FIG. 40 is a plot of the specific capacity of a $Co_3O_4$/graphene/h-BN/80% S cathode material over the first 50 and 100 charge-discharge cycles, according to an illustrative embodiment;

FIG. 41 is a plot of the capacity loss for several $Co_3O_4$/graphene/h-BN/S cathode materials over 100 charge-discharge cycles, according to an illustrative embodiment;

FIG. 42 is a plot of the tenth charge-discharge cycle for several $Co_3O_4$/graphene/h-BN/S cathode materials including various weight percentages of $Co_3O_4$, according to an illustrative embodiment; and FIG. 43 is a plot of the capacity loss for several $Co_3O_4$/graphene/h-BN/S cathode materials, including varying weight percentages of $Co_3O_4$, over 80 charge-discharge cycles, according to an illustrative embodiment.

DEFINITIONS

Throughout the specification, several terms are employed that are defined in the following paragraphs. Other definitions may also be found within the body of the specification.

About, Approximately: As used in the present disclosure, the terms "about" and "approximately," in reference to a number, are used to include numbers that fall within a range of 20%, 10%, 5%, 1%, or 0.5% in either direction of (greater than or less than) the number unless otherwise stated or otherwise evident from the context (except where such number would exceed 100% of a possible value).

Anode: As used in the present disclosure, the term "anode" refers to the negative electrode of a battery. Oxidation reactions occur at the anode.

Carrier Mobility: As used in the present disclosure, the term "carrier mobility" refers to a metric of how quickly an electron or hole can be transported through a material in the presence of an electric field. For example, an electrode with an increased carrier mobility tends to have an increased conductivity and improved electrochemical properties compared to an electrode with a decreased carrier mobility.

Cathode: As used in the present disclosure, the term "cathode" refers to the positive electrode of a battery. Reduction reactions occur at the cathode.

Capacity, specific capacity, specific charge capacity: As used in the present disclosure, the term "capacity" means the product of the discharge current (for example, in amps (A) or milliamps/milliamperes (mA)) and the discharge time (for example, in hours (h)) for a battery at a given load. For example, in certain embodiments, a "capacity" is expressed in amp-hours (Ah) or milliamp-hours (mAh). As used in the present disclosure, the term "specific capacity" means the product of the discharge current and the discharge time of a battery at a given load for a given weight of electrode material (for example, for a given weight of nanocomposite used as an anode material in a battery). For example, in certain embodiment, a "specific capacity" is expressed in amp-hours per gram (Ah/g) or milliamp-hours per gram (mAh/g). In certain embodiments, "specific capacity" is referred to as "specific discharge capacity." As used in the present disclosure, the term "specific charge capacity" means the product of the charge current and the charge time for a battery at a given load for a given weight of electrode material (for example, for a given weight of nanocomposite used as an anode material). For example, in certain embodiments, a "specific charge capacity" is expressed in Ah/g or mAh/g.

Charge-discharge cycle, Cycle: As used in the present disclosure, the terms "charge-discharge cycle" and "cycle" refer to the process of charging, discharging, or both a battery. For example, a single "charge-discharge cycle" includes charging and discharging a battery. In certain embodiments, a battery is discharged either fully or partially during a discharge cycle. For example, in some embodiments, 100%, 90%, 80%, 70%, or less of a battery's capacity is discharged during a discharge cycle. In certain embodiments, a battery is charged either fully or partially during a charge cycle. For example, in some embodiments, a battery is charged to 100%, 90%, 80%, 70%, or less of its full capacity during a charge cycle.

Downhole equipment: As used in the present disclosure, the term "downhole equipment" refers to devices used to measure conditions inside an oil well. For example, in some embodiments, downhole equipment includes a pressure sensor for measuring pressure inside an oil well. In some embodiments, downhole equipment includes a temperature sensor for measuring temperature inside an oil well. In some embodiments, downhole equipment includes a pressure sensor and a temperature sensor. As used in the present disclosure, the term "oil well" means a boring (for example, a drilled hole or tunnel) in the earth that is designed to bring hydrocarbons (for example, oil) from an underground hydrocarbon reservoir to the surface.

Graphene oxide: As used in the present disclosure, the term "graphene oxide" refers to a material substantially composed of ultrathin sheets of a compound of /carbon, oxygen, and hydrogen, where each sheet has a thickness defined by a monolayer of carbon rings (for example, a layer of carbon rings approximately one atom thick, with attached oxygen-containing moieties on the edges of the carbon rings, above the plane of carbon rings, below the plane of carbon rings, or combinations of these). In certain embodiments, carbon, oxygen, and hydrogen are present in variable ratios. In some embodiments, carbon, oxygen, and hydrogen are present in the same or substantially similar ratios. In some embodiments, graphene oxide is obtained by treating graphite with strong oxidizers. In certain embodiments, graphene oxide includes a dopant. In certain embodiments, graphene oxide does not include a dopant. Examples of dopants include boron and nitrogen.

High Pressure: As used in the present disclosure, the term "high pressure" refers to a pressure of greater than atmospheric pressure (1 atmosphere). For example, an oil well is typically under conditions of high pressure during oil recovery because of the high temperature of the well, hydrostatic pressure from the column of water extending from the well bore to the oil-bearing formation, pressure induced by pumping fluid in and out of the reservoir, and internal sources of pressure such as from the gases and fluids in the reservoir. Examples of high pressure are, for example, at least 1 atmosphere, at least 10 pounds per square inch gauge (psig), at least 50 psig, at least 100 psig, at least 200 psig, at least 500 psig, at least 1000 psig, at least 2000 psig, at least 3000 psig, or at least 5000 psig.

High Temperature: As used in the present disclosure, the term "high temperature" refers to a temperature from about 80° C. to about 150° C. For example, in some embodiments, an oil reservoir, during drilling or oil recovery, has a temperature of 80° C. to 150° C. or greater (for example, greater than 80° C., greater than 100° C., greater than 120° C., greater than 150° C.).

Improve, Increase, Reduce, Decrease: As used in the present disclosure, the terms "improve", "increase", "reduce, "decrease", or their grammatical equivalents, indicate values that are relative to a baseline or other reference measurement. In certain embodiments, an appropriate reference measurement may be or include a measurement under particular reference conditions (for example, at a temperature near an average ambient temperature) absent the presence of (for example, prior to) a particular change in these conditions (for example, a change in temperature). For example, in some embodiments, when a material exhibits "improved thermal stability," it has a greater thermal stability than a reference material, such that thermal decomposition occurs at a temperature that is at least 5° C., or 10° C., or 25° C., or 50° C., or 100° C. greater than the temperature at which the reference material decomposes. Similarly, in some embodiments, an "increase" in temperature refers to the raising of a temperature from a baseline value to a greater temperature, for example, a temperature that is at least 5° C., or 10° C., or 20° C., or 30° C., or 50° C., or 100° C. greater than the baseline temperature. In certain embodiments, when, for example, the moisture content of a material is "reduced," the moisture content of that material is of a lesser value after subjected to certain conditions relative to the moisture content of the material prior to being subjected to those conditions, such that the moisture content of the material after being subjected to certain conditions is at least 1%, or 5%, or 10%, or 15%, or 20%, or 25%, or 30%, or 40% or 50%, or 60%, or 70%, or 80%, or 90%, or 100% less than prior to treatment. Similarly, in some embodiments, a "decrease" in particle size, for example, refers to a change in the size of particles after being subjected to certain conditions, such that the treated particles are at least 1%, or 5%, or 10%, or 15%, or 20%, or 25%, or 30%, or 40%, or 50%, or 60%, or 70%, or 80%, or 90%, or 95% smaller by volume than the size of the particles prior to treatment.

Nanocomposite: As used in the present disclosure, the term "nanocomposite" refers to a material that contains at least one nanoparticle and at least one additional agent or ingredient. In some embodiments, a nanocomposite contains a substantially uniform collection of nanoparticles.

Nanoparticle: As used in the present disclosure, the term "nanoparticle" refers a microscopic particle with at least one dimension less than 100 nanometers in size. In some embodiments, a nanoparticle is or includes a metal oxide nanoparticle, metal sulfide nanoparticle, metal nitride nanoparticle, nanoparticle of a metal or metal alloy, silicon nanoparticle, silicon oxide nanoparticle, and the like.

Stable: As used in the present disclosure, the term "stable" refers to physical properties that do not substantially change or deteriorate in performance over a usable lifetime. For example, in some embodiments, a stable nanocomposite does not undergo substantial physical changes during a predetermined useable lifetime of the product in which the nanocomposite is used. For example, in some embodiments, a stable electrode for a rechargeable battery substantially retains its charge capacity after repeated use.

Substantially: As used in the present disclosure, the term "substantially" refers to the qualitative condition of exhibiting total or near-total extent or degree of a characteristic or property, where "near-total" means within 20%, 10%, 5%, 1%, or 0.5% of the total (in either direction). For example, as used in the present disclosure, a material that is "substantially composed of", for example, an ultrathin sheet, refers to a material that is 100%, or 99.5%, or 99%, or 95%, or 90%, or 80% composed of the specified ultrathin sheet. Similarly, a "substantially uniform collection of nanoparticles" refers to, for example, a collection of nanoparticles that are composed of 100% uniform nanoparticles, or 99.5% or 99% or 95% or 90% or 80% of uniform nanoparticles. Similarly, properties that are "not substantially changed" refers to properties that are stable because they are 100%, or 99.5% or 99%, or 90%, or 80% the same after being subjected to certain conditions.

Two-dimensional (2D) material: As used in the present disclosure, the term "2D material" refers to a material substantially composed of ultrathin sheets having a thickness defined by a monolayer approximately one atom thick. For example, in some embodiments, graphene and hexagonal boron nitride are two-dimensional materials. In certain embodiments, a 2D material includes a dopant. In certain embodiments, a 2D material does not include a dopant. Examples of dopants include carbon, boron, and nitrogen.

Thermal Stability: As used in the present disclosure, the term "thermal stability" refers to a measure of the extent to which a material is stable at high temperature. For example, in some embodiments, an electrode material with a superior thermal stability will remain stable at high temperature, while an electrode material with an inferior thermal stability will likely undergo changes (for example, chemical or structural transformations) leading to decreased performance.

DETAILED DESCRIPTION

It is contemplated that systems, architectures, devices, methods, and processes described in the present disclosure encompass variations and adaptations developed using information from the embodiments described in the present disclosure. Adaptation, modification, or both of the systems, architectures, devices, methods, and processes described in the present disclosure may be performed, as contemplated by this description.

Throughout the description, where articles, devices, systems, and architectures are described as having, including, or including specific components, or where processes and methods are described as having, including, or including specific steps, it is contemplated that, additionally, there are articles, devices, systems, and architectures of the present disclosure that consist essentially of, or consist of, the recited components, and that there are processes and methods according to the present disclosure that consist essentially of, or consist of, the recited processing steps.

The mention in the present disclosure of any publication, for example, in the Background section, is not an admission that the publication serves as prior art with respect to any of the claims presented in the present disclosure. The Background section is presented for purposes of clarity and is not meant as a description of prior art with respect to any claim.

Headers are provided for the convenience of the reader—the presence, placement, or both of a header is not intended to limit the scope of the subject matter described in the present disclosure.

The present disclosure encompasses a recognition of synergistic effects of combining two different two-dimensional (2D) materials with nanoparticles (for example, a nanoparticle of a metal oxide nanoparticle, metal sulfide nanoparticle, metal nitride nanoparticle, nanoparticle of a metal or metal alloy, silicon nanoparticle, silicon oxide nanoparticle, and the like). For example, in some embodiments, a nanocomposite that includes hexagonal boron nitride sheets, graphene sheets, and nanoparticles provides improved thermal properties and improved electrochemical properties when used as an electrode material in a rechargeable battery. For example, in some embodiments, a nanocomposite in which the weight percent of graphene is in a range from 0.1% to 39.9% and the weight percent of hexagonal boron nitride is in a range from 0.1% to 39.9% exhibits an enhanced specific surface area, an improved specific charge/discharge capacity, or a stable cycling performance at both room temperature (for example, about 25° C.) and at high temperatures (for example, at about 150° C. or greater), or any combination of these properties. Nanoparticles described in the present disclosure are useful for incorporation into batteries that exhibit improved properties and stability.

For example, in certain embodiments, batteries (for example, lithium-ion batteries or lithium-sulfur batteries) described in the present disclosure can be used to power downhole equipment, which is used to measure conditions inside oil wells or during other oil operations, for example, during oil discovery and recovery. Oil operations, for example, oil discovery and recovery, rely on use of equipment subjected to particularly harsh conditions, for example, increased temperatures and increased pressures. Previous equipment suffered from more frequent breakdown and decompositions due to conditions encountered in an oil well during routine oil operations. Further, previous equipment required additional safety equipment to relieve high pressure in a battery (to prevent thermal runaway). Such devices, however, are not 100% effective or completely reliable. Applicant discovered that, certain nanocomposites and batteries, which use certain nanocomposites as electrode materials, exhibit improved properties that are not found in previous nanocomposites and batteries, thereby obviating the need for certain safety devices, increasing efficiency of certain oil operation equipment.

For example, in some embodiments, downhole equipment includes pressure and temperature sensors for measuring the pressure and temperature, respectively, in an oil well during drilling and oil recovery. For example, conditions in an oil well can be variable with temperatures in a range from 80° C. to 150° C. or greater. It is useful for equipment to reliably monitor these conditions to enable drilling and oil recovery to be performed more effectively and to detect potential safety concerns (for example, caused by sudden increases in temperature, pressure, or both). In particular, it is beneficial to identify at an early stage any risk of damage to equipment to thereby prevent or reduce the likelihood of human injury. Batteries described in the present disclosure have, in some embodiments, improved safety, electrochemical properties, and stability compared to those of conventional batteries used to power downhole equipment. For example, in some embodiments, lithium-ion batteries described in the present disclosure provide lightweight power sources with an improved energy density, cycle life, and structural stability relative to batteries employing conventional electrode materials. In some embodiments, lithium-sulfur batteries described in the present disclosure provide lightweight power sources with an improved energy density, cycle life, and structural stability relative to batteries employing conventional electrode materials.

In certain embodiments, batteries described in the present disclosure obviate (or decrease) the need for complex engineering techniques and safety devices that may otherwise be used in an attempt to limit the likelihood of thermal runaway. For example, while safety devices may relieve high pressure in a battery to help prevent thermal runaway, such devices are not 100% effective or completely reliable. Instead, rechargeable batteries described in the present disclosure provide a more cost-effective and safer option for preventing thermal runaway without relying on complex safety devices.

Nanocomposites

Preparation of Nanoparticle/Graphene/Boron Nitride Nanocomposites

Without wishing to be bound to any particular theory, it is thought that thermal, mechanical, and chemical properties of hexagonal boron nitride provide benefits to nanocomposites and batteries described in the present disclosure relative to an analogous material prepared with only nanoparticles and graphene. For example, in some embodiments, superior thermal stability of hexagonal boron nitride compared to that of common carbon materials helps to prevent thermal runaway events. For example, in some embodiments, mechanical properties of hexagonal boron nitride allow nanocomposites of the present disclosure to better accommodate changes in volume of nanoparticles, for example, nanoparticles of a metal or metal alloy, silicon nanoparticles, silicon oxide nanoparticles, and the like, during charging and discharging. For example, in some embodiments, when graphene and boron nitride are combined, chemical properties of boron nitride improve carrier mobility (for example, electron mobility) of graphene via a substrate effect. For example, in some embodiments, a nanocomposite that includes both graphene and boron nitride materials has an increased carrier mobility (and thus improved electrochemical properties) compared to that of a nanocomposite that includes graphene or boron nitride alone.

Additionally, without wishing to be bound to any particular theory, use of two different 2D materials (for example, graphene and hexagonal boron nitride) in a nanocomposite prevents restacking of 2D materials when a nanocomposite is used as an anode material. For example, in some embodiments, nanocomposites described in the present disclosure are less prone to restacking during charging and discharging, resulting in retention of desirable physical and electrochemical properties. For example, in some embodiments, a nanocomposite retains its large surface area and its superior specific capacity even after many (for example, 1,000 or more) charge-discharge cycles.

Figure 1:
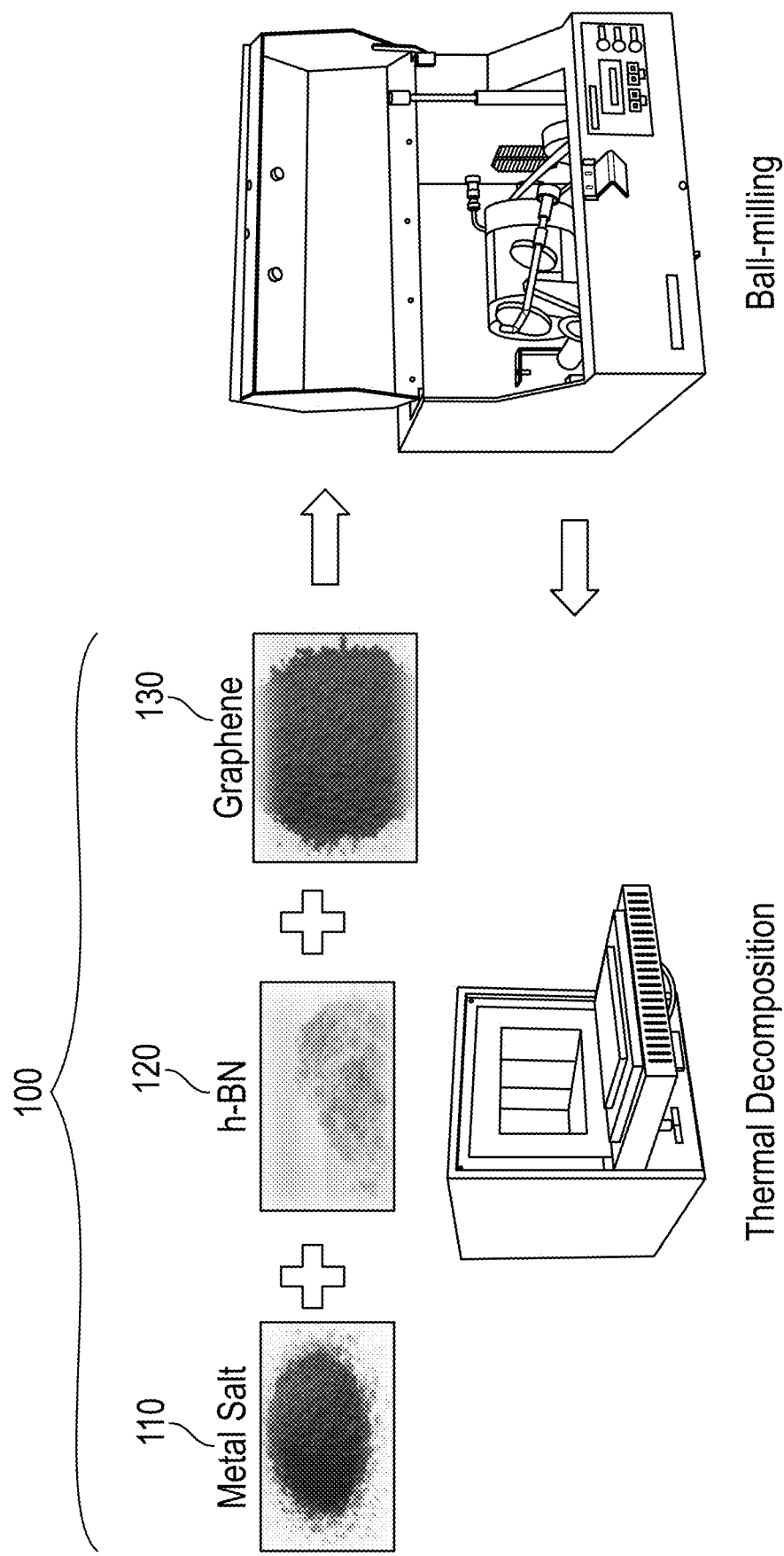
FIG. 1 is a schematic representation of synthesis of a nanoparticle/graphene/h-BN nanocomposites, according to an illustrative embodiment.

FIG. 1 shows an illustrative example of a method for preparing a nanocomposite, according to an illustrative embodiment.

As shown in FIG. 1, in an illustrative embodiment, a metal salt 110 is combined with hexagonal boron nitride 120 and graphene 130 to form a mixture 100. In certain embodiments, the metal salt 110 includes a metal selected from the group consisting of cobalt, iron, manganese, molybdenum, titanium, tin, tungsten, zinc, and combinations of the same. In certain embodiments, the metal salt 110 includes a metal selected from the group consisting of cobalt, iron, titanium, tin, zinc, and combinations of the same. In certain embodiments, the metal salt 110 is a cobalt salt. In certain embodiments a cobalt salt is selected from the group consisting of cobalt (II) halide, cobalt (II) acetate, cobalt (II) hydroxide, cobalt (II) sulfate, cobalt (II) nitrate, and hydrates of the same. In certain embodiments, the cobalt salt is cobalt (II) halide or a hydrate of the same. In certain embodiments, the cobalt salt is cobalt (II) acetate or a hydrate of the same.

In certain embodiments, the mixture 100 is ball-milled for less than 1 hour. In certain embodiments, the mixture 100 is ball-milled for at least 20 minutes. In certain embodiments, the mixture 100 is ball-milled for about 20 to 90 minutes. In certain embodiments, the mixture 100 is ball-milled for about 30 to 90 minutes. In certain embodiments, the mixture 100 is ball-milled for about 30 to 60 minutes. In certain embodiments, the mixture 100 is ball-milled for about 1 to 3 hours. In certain embodiments, the mixture is ball-milled for about 1 to 5 hours. In certain embodiments, the mixture 100 is ball-milled for about 1 to 7 hours. In certain embodiments, the mixture 100 is ball-milled for about 3 to 5 hours. In certain embodiments, the mixture 100 is ball-milled for about 3 to 7 hours. In certain embodiments, the mixture 100 is ball-milled for about 3 to 9 hours. In certain embodiments, the mixture 100 is ball-milled for about 5 to 10 hours. In certain embodiments, the mixture 100 is ball-milled for about 7 to 12 hours. In certain embodiments, the mixture 100 is ball-milled for about 10 to 24 hours.

In certain embodiments, the mixture 100 is ball-milled at a speed of greater than 500 rpm. In certain embodiments, the mixture 100 is ball-milled at a speed of about 500 to 2500 rpm. In certain embodiments, the mixture 100 is ball-milled at a speed of about 1000 to 2500 rpm. In certain embodiments, the mixture 100 is ball-milled at a speed of about 1000 to 2000 rpm. In certain embodiments, the mixture 100 is ball-milled at a speed of about 1200 to 1800 rpm. In certain embodiments, the mixture 100 is ball-milled at a speed of about 1275 to 1725 rpm.

As shown in FIG. 1, the ball-milling step is followed by a calcination step (thermal decomposition). In certain embodiments, calcination (for example, a calcination step) is performed at a temperature (for example, the calcination temperature) of about 200° C. to 500° C. In certain embodiments, calcination is performed at a temperature of about 300° C. to 750° C. In certain embodiments, calcination is performed at a temperature of about 325° C. to 500° C. In certain embodiments, calcination is performed at a temperature of about 325° C. to 375° C. In certain embodiments, calcination is performed at a temperature of about 325° C. to 350° C. In certain embodiments, calcination is performed at a temperature of about 340° C. to 360° C. In certain embodiments, calcination is performed at a temperature of about 345° C. to 355° C. In certain embodiments, calcination is performed at a temperature of about 350° C. to 375° C. In certain embodiments, calcination is performed at a temperature of about 350° C. to 550° C. In certain embodiments, calcination is performed at a temperature of about 500° C. to 1000° C. In certain embodiments, calcination is performed at a temperature of about 500° C. to 750° C.

In certain embodiments, an oven used for calcination is heated at a rate of about 1 to 15° C./min until the calcination temperature is reached. In certain embodiments, an oven used for calcination is heated at a rate of about 1 to 10° C./min until the calcination temperature is reached. In certain embodiments, an oven used for calcination is heated at a rate of about 1 to 7° C./min until the calcination temperature is reached. In certain embodiments, an oven used for calcination is heated at a rate of about 1 to 5° C./min until the calcination temperature is reached. In certain embodiments, an oven used for calcination is heated at a rate of about 1 to 3° C./min until the calcination temperature is reached. In certain embodiments, an oven used for calcination is heated at a rate of about 3 to 15° C./min until the calcination temperature is reached. In certain embodiments, an oven used for calcination is heated at a rate of about 3 to 10° C./min until the calcination temperature is reached. In certain embodiments, an oven used for calcination is heated at a rate of about 3 to 7° C./min until the calcination temperature is reached. In certain embodiments, an oven used for calcination is heated at a rate of about 5 to 20° C./min until the calcination temperature is reached. In certain embodiments, an oven used for calcination is heated at a rate of about 7 to 13° C./min until the calcination temperature is reached.

In certain embodiments, a calcination step is performed for about 1 to 10 hours. In certain embodiments, a calcination step is performed for about 1 to 7 hours. In certain embodiments, a calcination step is performed for about 1 to 5 hours. In certain embodiments, a calcination step is performed for about 3 to 7 hours. In certain embodiments, a calcination step is performed for about 2 to 5 hours.

Nanocomposites formed according to the illustrative embodiments of the present disclosure are nanoparticle/graphene/boron nitride nanocomposites. In certain embodiments, nanoparticles make up 0.1% to 99.9% of a nanocomposite by weight. In certain embodiments, nanoparticles make up 0.1% to 50% of a nanocomposite by weight. In certain embodiments, nanoparticles make up 0.1% to 30% of a nanocomposite by weight. In certain embodiments, nanoparticles make up 0.1% to 25% of a nanocomposite by weight. In certain embodiments, nanoparticles make up 0.1% to 10% of a nanocomposite by weight. In certain embodiments, nanoparticles make up 1% to 10% of a nanocomposite by weight. In certain embodiments, nanoparticles make up 50% to 99.8% of a nanocomposite. In certain embodiments, nanoparticles make up 50% to 70% of a nanocomposite. In certain embodiments, nanoparticles make up 55% to 65% of a nanocomposite.

In some embodiments, nanocomposites formed according to the illustrative embodiments of the present disclosure are nanoparticle/graphene/boron nitride nanocomposites. In certain embodiments, a nanoparticle is a metal oxide nanoparticle. In certain embodiments, a metal oxide is selected from the group consisting of $Co_3O_4$, $TiO_2$, $SnO_2$, $ZnO$, $Fe_3O_4$, $Fe_2O_3$, and combinations of the same. In certain embodiments, a metal oxide is $Co_3O_4$. In certain embodiments, $Co_3O_4$ is in a cubic spinel form. In certain embodiments, $Co_3O_4$ nanoparticles make up 0.1% to 99.9% of a nanocomposite by weight. In certain embodiments, $Co_3O_4$ nanoparticles make up 0.1% to 50% of a nanocomposite by weight. In certain embodiments, $Co_3O_4$ nanoparticles make up 0.1% to 30% of a nanocomposite by weight. In certain embodiments, $Co_3O_4$ nanoparticles make up 0.1% to 25% of a nanocomposite by weight. In certain embodiments, $Co_3O_4$ nanoparticles make up 0.1% to 10% of a nanocomposite by weight. In certain embodiments, $Co_3O_4$ nanoparticles make up 1% to 10% of a nanocomposite by weight. In certain embodiments, $Co_3O_4$ nanoparticles make up 50% to 99.8% of a nanocomposite. In certain embodiments, $Co_3O_4$ nanoparticles make up 50% to 70% of a nanocomposite. In certain embodiments, $Co_3O_4$ nanoparticles make up 55% to 65% of a nanocomposite.

It is further contemplated that the present disclosure can be adapted to prepare a metal sulfide/graphene/boron nitride nanocomposite, a metal nitride/graphene/boron nitride nanocomposite, a metal/graphene/boron nitride nanocomposite, a metal alloy/graphene/boron nitride nanocomposite, a silicon oxide/graphene/boron nitride nanocomposite, a silicon/graphene/boron nitride nanocomposite, or combinations thereof. Such metal sulfide/graphene/boron nitride, metal nitride/graphene/boron nitride, metal/graphene/boron nitride, metal alloy/graphene/boron nitride, silicon oxide/graphene/boron nitride, and silicon/graphene/boron nitride nanocomposites are encompassed within the scope of present disclosure. In certain embodiments, metal sulfide nanoparticles of a nanocomposite are selected from the group consisting of $MoS_2$, $MnS_2$, CoS, $CoS_2$, $Co_3S_4$, NiS, CuS, $SnS_2$, ZnS, and combinations of the same. In certain embodiments, metal nitride nanoparticles of a nanocomposite are selected from the group consisting of TiN, $Fe_3N$, CoN, CrN, $W_2N$, VN, ZrN, and combinations of the same. In certain embodiments, silicon oxide nanoparticles of a nanocomposite include $SiO_2$.

In certain embodiments, graphene makes up 0.1% to 99.9% of a nanocomposite by weight. In certain embodiments, graphene makes up 0.1% to 50% of a nanocomposite by weight. In certain embodiments, graphene makes up 0.1% to 30% of a nanocomposite by weight. In certain embodiments, graphene makes up 0.1% to 25% of a nanocomposite by weight. In certain embodiments, graphene makes up about 39.9% or less (for example, 0% to about 39.9%) of a nanocomposite by weight. In certain embodiments, graphene makes up about 0.1% to about 39.9% of a nanocomposite. In certain embodiments, graphene makes up about 5% to about 35% of a nanocomposite. In certain embodiments, graphene makes up about 5% to about 25% of a nanocomposite. In certain embodiments, graphene makes up about 5% to about 15% of a nanocomposite. In certain embodiments, graphene makes up about 10% to about 20% of a nanocomposite. In certain embodiments, graphene makes up about 5% to about 70% of a nanocomposite by weight. In certain embodiments, graphene makes up about 10% to about 65% of a nanocomposite by weight. In certain embodiments, graphene makes up about 10% to about 60% of a nanocomposite by weight.

In certain embodiments, boron nitride is in the form of hexagonal boron nitride (h-BN). In certain embodiments, hexagonal boron nitride makes up 0.1% to 99.9% of a nanocomposite by weight. In certain embodiments, hexagonal boron nitride makes up 0.1% to 50% of a nanocomposite by weight. In certain embodiments, hexagonal boron nitride makes up 0.1% to 30% of a nanocomposite by weight. In certain embodiments, hexagonal boron nitride makes up 0.1% to 25% of a nanocomposite by weight. In certain embodiments, hexagonal boron nitride makes up about 39.9% or less (for example, 0% to about 39.9%) of a nanocomposite by weight. In certain embodiments, h-BN makes up about 5% to 39.9% of a nanocomposite. In certain embodiments, h-BN makes up about 10% to 39.9% of a nanocomposite. In certain embodiments, h-BN makes up about 5% to 35% of a nanocomposite. In certain embodiments, h-BN makes up about 10% to 25% of a nanocomposite. In certain embodiments, h-BN makes up about 25% to 35% of a nanocomposite. In certain embodiments, h-BN makes up about 30% to 39.9% of a nanocomposite. In certain embodiments, hexagonal boron nitride makes up about 5% to 85% of a nanocomposite by weight. In certain embodiments, hexagonal boron nitride makes up about 10% to 75% of a nanocomposite by weight. In certain embodiments, hexagonal boron nitride makes up about 15% to 60% of a nanocomposite by weight.

Preparation of Nanoparticle/Graphene/Boron Nitride/S Nanocomposites

In certain embodiments, nanocomposites prepared by a method described in the present disclosure are mixed with sulfur to prepare nanoparticle/graphene/boron nitride/sulfur nanocomposites (in other words, a nanocomposite that includes nanoparticles, graphene, boron nitride, and sulfur). For example, in certain embodiments, nanocomposites prepared by a method described in the present disclosure are mixed with sulfur to prepare nanoparticle/graphene/boron nitride/sulfur nanocomposites. In certain embodiments, nanocomposites prepared by a method described in the present disclosure are mixed with sulfur and ball-milled for less than 1 hour. In certain embodiments, nanocomposites prepared by a method described in the present disclosure are mixed with sulfur and ball-milled for about 1 to 5 hours. In certain embodiments, nanocomposites prepared by a method described in the present disclosure are mixed with sulfur and ball-milled for about 30 to 90 minutes. In certain embodiments, nanocomposites prepared by a method described in the present disclosure are mixed with sulfur and ball-milled for about 30 to 60 minutes. In certain embodiments, nanocomposites prepared by a method described in the present disclosure are mixed with sulfur and ball-milled for about 60 to 90 minutes. In certain embodiments, nanocomposites prepared by a method described in the present disclosure are mixed with sulfur and ball-milled for about 1 to 3 hours. In certain embodiments, nanocomposites prepared by a method described in the present disclosure are mixed with sulfur and ball-milled for about 1 to 5 hours.

In certain embodiments, sulfur makes up about 40% to 90% of a nanocomposite by weight. In certain embodiments, sulfur makes up about 50% to 80% of a nanocomposite by weight. In certain embodiments, sulfur makes up about 55% to 85% of a nanocomposite by weight. In certain embodiments, sulfur makes up about 55% to 65% of a nanocomposite by weight. In certain embodiments, sulfur makes up about 65 to 75% of a nanocomposite by weight. In certain embodiments, sulfur makes up about 75% to 85% of a nanocomposite by weight. In certain embodiments, sulfur is in the form of elemental sulfur, a sulfur-containing salt, a sulfur- and lithium-containing salt, a sulfur/graphene composite, or combinations of the same. In certain embodiments, sulfur is elemental sulfur.

Lithium-Ion and Lithium-Sulfur Batteries

In some embodiments, nanocomposites described in the present disclosure are useful as electrode materials in rechargeable batteries (for example, lithium-ion, lithium-sulfur batteries, or both) designed to tolerate operation at high temperatures and high pressures. In certain embodiments, a nanocomposite is dried by heating under vacuum prior to use in fabrication of electrode materials. In certain embodiments, a nanocomposite is dried such that moisture content is reduced to less than 5% by weight. In certain embodiments, a nanocomposite is dried such that moisture content is reduced to less than 3% by weight. In certain embodiments, a nanocomposite is dried such that moisture content is reduced to less than 1% by weight.

In certain embodiments, electrode materials are prepared by mixing a nanocomposite with one or more additives in a solvent. In certain embodiments, additives include, among other things, conductive agents and binding agents. In certain embodiments, a conductive agent is selected from the group consisting of carbon black, C-NERGY™ Super C65®, C-NERGY™ SFG6L, Super P®, a carbon nanotube-based material and combinations of the same. In certain embodiments, a binding agent is polyvinylidene fluoride, a polyvinylidene fluoride resin (for example, Kynar® HSV900), or styrene butadiene. In certain embodiments, a binding agent is polyvinylidene fluoride. In certain embodiments, a binding agent is a polyvinylidene fluoride resin. In certain embodiments, one or more additives include an acid. In certain embodiments, an additive is oxalic acid. In certain embodiments, a solvent is a mixture of dimethyl sulfoxide (DMSO) and ethanol. In certain embodiments, a mixture of DMSO and ethanol is a 1:1 mixture by volume. In certain embodiments, a mixture of DMSO and ethanol is a 2:1 mixture by volume. In certain embodiments, a mixture of DMSO and ethanol is a 1:2 mixture by volume. In certain embodiments, a solvent is N-methyl-2-pyrrolidone (NMP).

In an illustrative embodiment, a solution is mixed to obtain a homogenous slurry, which is spread on a foil substrate and allowed to dry. In some embodiments, a foil substrate acts as a current collector. In certain embodiments, a foil substrate is a copper foil substrate. In certain embodiments, a foil substrate is an aluminum substrate. In an illustrative embodiment, a slurry is applied to a foil substrate to form a 50 to 200 µm film, and the film is dried under vacuum. In certain embodiments, a film is dried at a temperature of about 60 to 110° C. In certain embodiments, a film is dried at a temperature of about 60 to 90° C. In certain embodiments, a film is dried at a temperature of about 80 to 130° C.

In certain embodiments, a nanocomposite makes up about 50% to about 95% of an electrode coating (for example, an electrode coating for use in preparation of a battery). In certain embodiments, a nanocomposite makes up about 60% to about 80% of an electrode coating (for example, an electrode coating for use in preparation of a battery). In certain embodiments, a nanocomposite makes up about 75% to about 85% of the electrode coating (for example, an electrode coating for use in preparation of a battery).

A summed weight percent of additive(s) in the electrode formulation in a nanocomposite is in a range from 5% to 50%. For example, in certain embodiments, the amount of a binding agent in a nanocomposite is zero, or the amount of conductive additive in a nanocomposite is zero. Alternatively, in certain embodiments, a nanocomposite includes both a binding agent and a conductive additive. In certain embodiments, a conductive agent makes up about 1% to about 25% of an electrode coating. In certain embodiments, a conductive agent makes up about 5% to about 20% of an electrode coating. In certain embodiments, a conductive agent makes up about 5% to about 15% of an electrode coating. In certain embodiments, a binding agent makes up about 1% to about 25% of an electrode coating. In certain embodiments, a binding agent makes up about 5% to about 20% of an electrode coating. In certain, embodiments, a binding agent makes up about 5% to about 15% of an electrode coating.

Figure 2:
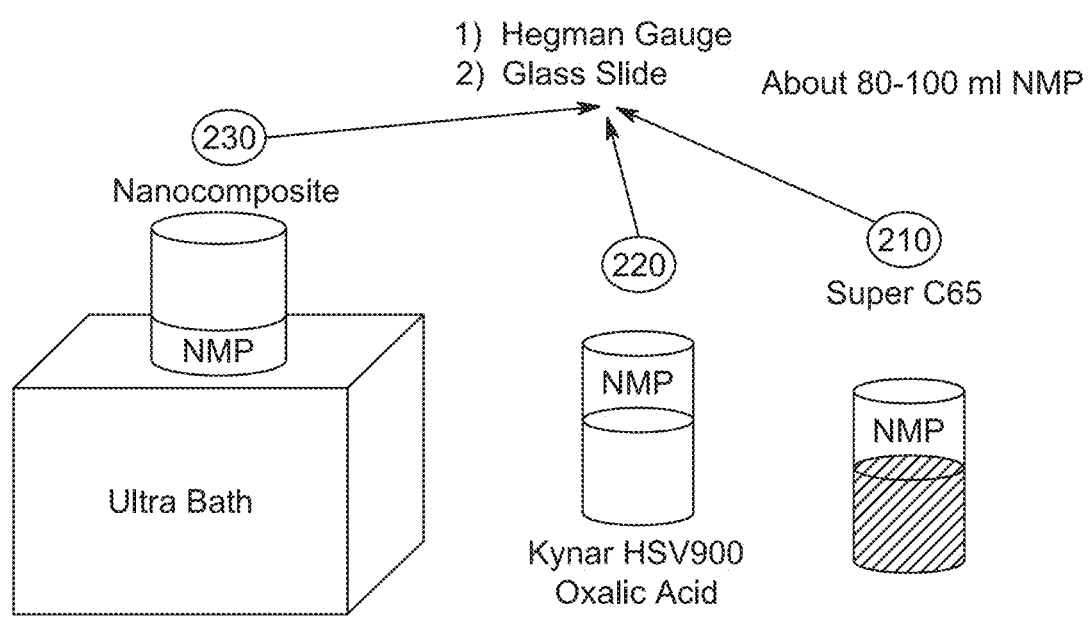
FIG. 2 is a schematic representation for fabrication of an electrode material including $Co_3O_4$/graphene/h-BN nanocomposites, according to an illustrative embodiment.

As shown in the illustrative embodiment in FIG. 2, an electrode material is fabricated by combining and mixing three solutions (for example, solution 210, 220, and 230). In an illustrative embodiment, a first solution 210 includes a conductive agent dispersed in a solvent, a second solution 220 includes a binding agent dispersed in a solvent, and a third solution 230 includes a nanocomposite dispersed in a solvent. In certain embodiments, combined solutions are mixed with a FlackTek SpeedMixer™. In certain embodiments, combined solutions are mixed with a FlackTek SpeedMixer™, followed by mixing with a Primix Model 40-L rotor-stator mixer.

Figure 3:
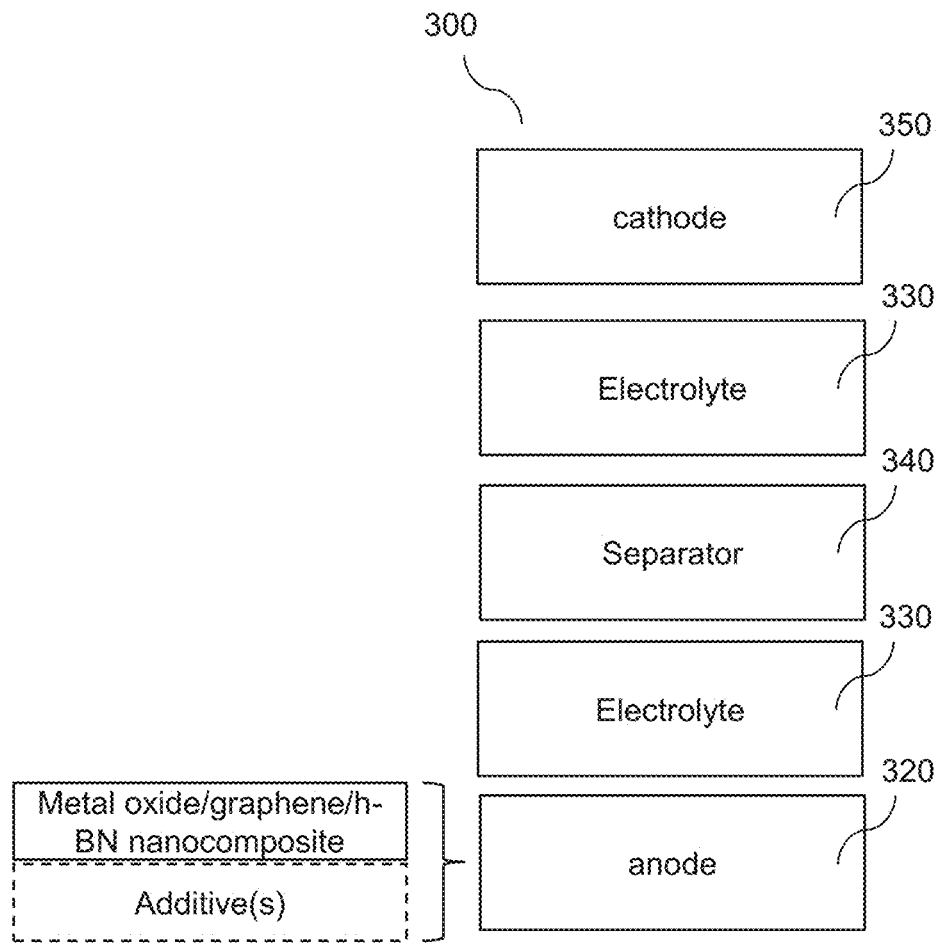
FIG. 3 is a block diagram of a lithium-ion battery, according to an illustrative embodiment.

FIG. 3 is a block diagram of an example lithium-ion battery 300 designed to tolerate operation at high temperatures and high pressures. Lithium-ion battery 300 includes an anode 320, an electrolyte 330, a separator 340, and a cathode 350. In some embodiments, an anode includes an electrode formulated with a nanoparticle/graphene/h-BN nanocomposite as described in the present disclosure.

In an example embodiment of lithium-ion battery 300, cathode 350 is, in some embodiments, a lithium metal or a lithium metal oxide. For example, in lithium-ion battery 300, electrolyte 330 is, in some embodiments, one or more lithium salts dissolved in one or more organic solvents. For example, in some embodiments, one or more lithium salts include lithium hexafluorophosphate. Organic solvents include, for example, in some embodiments, ethylene carbonate or dimethyl carbonate. In some embodiments, separator 340 is a polypropylene membrane that is placed between an anode and a cathode.

In certain embodiments, a lithium-ion battery exhibits an improved electrochemical performance at both room temperature (for example, at about of 25° C.) and at high temperatures (for example, of 150° C. or greater). For example, a lithium-ion battery has a specific capacity (for example, specific charge/discharge capacity) in a range from about 20 mAh/g to about 150 mAh/g or greater at about 25° C. For example, a lithium-ion battery has a specific capacity (for example, specific charge/discharge capacity) in a range from about 30 mAh/g to about 100 mAh/g or greater at about 25° C. For example, a lithium-ion battery has a specific capacity (for example, specific charge/discharge capacity) in a range from about 40 mAh/g to about 90 mAh/g or greater at about 25° C. For example, a lithium-ion battery has a specific capacity (for example, specific charge/discharge capacity) in a range from about 45 mAh/g to about 70 mAh/g or greater at about 25° C. For example, a lithium-ion battery has a specific capacity (for example, specific charge/discharge capacity) in a range from about 20 mAh/g to about 70 mAh/g or greater at about 150° C. For example, a lithium-ion battery has a specific capacity (for example, specific charge/discharge capacity) in a range from about 25 mAh/g to about 60 mAh/g or greater at about 25° C. For example, a lithium-ion battery has a specific capacity (for example, specific charge/discharge capacity) in a range from about 30 mAh/g to about 55 mAh/g or greater at about 25° C.

A lithium-ion battery that includes a nanocomposite described in the present disclosure, in some embodiments, retains beneficial electrochemical characteristics after multiple charge-discharge cycles at both room temperature (for example, at about of 25° C.) and high temperatures (for example, of 150° C. or greater). For example, in some embodiments, after 100 charge-discharge cycles at about 25° C. or 150° C., a lithium-ion battery retains at least 90% of its specific capacity compared to an initial specific capacity measured in a first charge cycle at the same temperature. For example, in some embodiments, after 100 charge-discharge cycles at about 25° C. or 150° C., a lithium-ion battery retains at least 80% of its specific capacity compared to an initial specific capacity measured in a first charge cycle at the same temperature. For example, in some embodiments, after 1,000 charge-discharge cycles at about 25° C. or 150° C., a lithium-ion battery retains at least 90% of its specific capacity compared to an initial specific charge capacity measured in a first charge cycle at the same temperature. For example, in some embodiments, after 1,000 charge-discharge cycles at about 25° C. or 150° C., a lithium-ion battery retains at least 80% of its specific capacity compared to an initial specific charge capacity measured in a first charge cycle at the same temperature. For example, in some embodiments, after 100 charge-discharge cycles at about 25° C. or 150° C., coulombic efficiency of a lithium-ion battery is about 90% or greater. For example, in some embodiments, after 100 charge-discharge cycles at about 25° C. or 150° C., coulombic efficiency of a lithium-ion battery is about 80% or greater. For example, in some embodiments, after 1,000 charge-discharge cycles at about 25° C. or 150° C., coulombic efficiency of a lithium-ion battery is about 90% or greater. For example, in some embodiments, after 1,000 charge-discharge cycles at about 25° C. or 150° C., coulombic efficiency of a lithium-ion battery is about 80% or greater.

Figure 4:
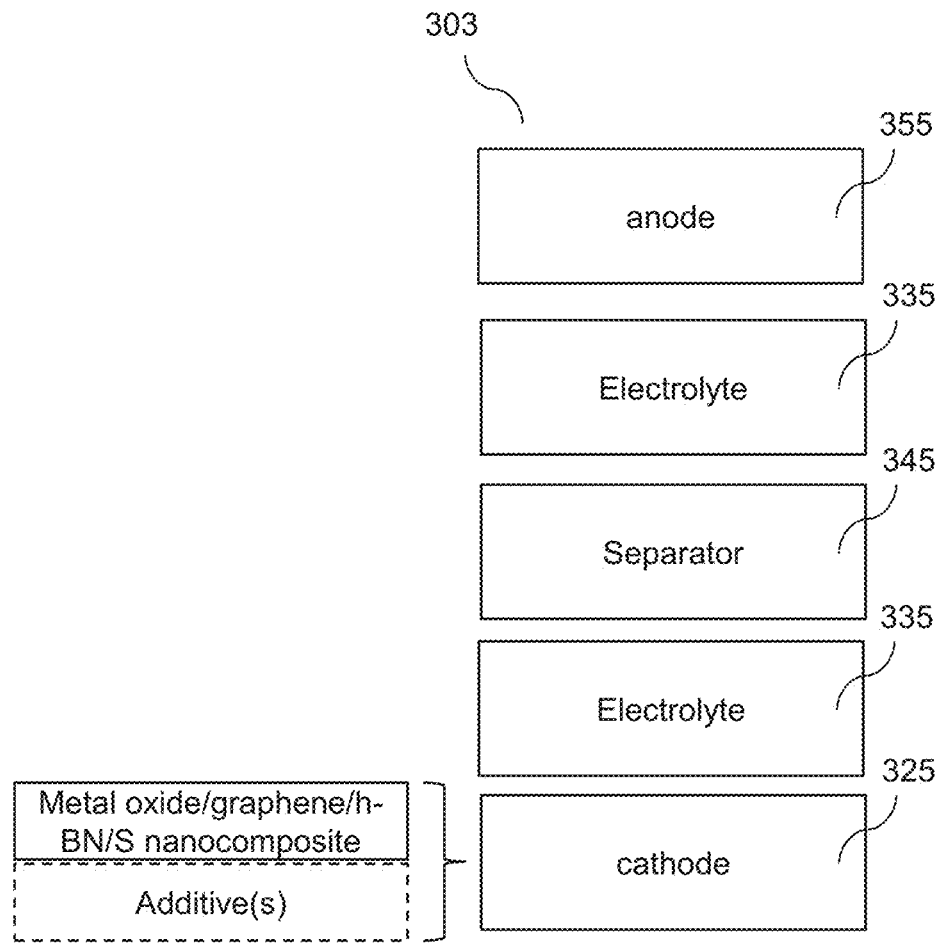
FIG. 4 is a block diagram of a lithium-sulfur battery, according to an illustrative embodiment.

In certain embodiments, nanocomposites described in the present disclosure are useful as cathode materials for lithium-sulfur batteries. FIG. 4 shows an illustrative example of a lithium-sulfur battery 303. Lithium-sulfur battery 303 includes cathode 325, electrolyte 335, separator 345, and anode 355. In some embodiments, cathode 325 is formulated with a metal oxide/graphene/h-BN/S nanocomposite as described in the present disclosure.

For lithium-sulfur battery 303, anode 355 is, in some embodiments, for example, a lithium metal. For lithium-sulfur battery 303, electrolyte 335 includes, in some embodiments, for example, one or more lithium salts dissolved in one or more organic solvents. For example, in certain embodiments, one or more lithium salts are present in concentrations of about 0.05 mol % to about 1 mol %. In certain embodiments, one or more lithium salts are present at a concentration of about 0.1 mol %. In certain embodiments, lithium salts include bis(trifluoromethane)sulfonimide lithium salt (LiTFSI) or lithium nitrate. For example, organic solvents include 1,2-dimethoxyethane (DME) or 1,3-dioxolane (DOL). Separator 345 is, in some embodiments, a polypropylene membrane that is placed between an anode and a cathode.

Example Embodiments

The embodiments presented below are examples of nanoparticle/graphene/boron nitride (BN) nanocomposites, and methods of making and using the same described in the present application. In certain embodiments, nanocomposites described herein are used as electrodes in lithium-ion and lithium sulfur batteries.

Embodiment 1. A method of preparing a nanoparticle/graphene/boron nitride (BN) nanocomposite, the method comprising steps of: ball-milling a mixture comprising a metal salt, graphene, and boron nitride; and calcinating the mixture.

Embodiment 2. The method according to embodiment 1, wherein the metal salt comprises a metal selected from the group consisting of cobalt, iron, manganese, molybdenum, titanium, tin, tungsten, and zinc.

Embodiment 3. The method according to embodiment 1 or 2, wherein the metal salt is a cobalt salt.

Embodiment 4. The method according to any one of embodiments 1 to 3, wherein the metal salt is selected from the group consisting of cobalt (II) halide, cobalt (II) acetate, cobalt (II) hydroxide, cobalt (II) sulfate, cobalt (II) nitrate, and hydrates thereof.

Embodiment 5. The method according to any one of embodiments 1 to 4, wherein the metal salt is cobalt (II) acetate or a hydrate thereof.

Embodiment 6. The method of any one of embodiments 1 to 5, comprising ball-milling the mixture for at least 20 minutes.

Embodiment 7. The method of any one of embodiments 1 to 6, comprising ball-milling the mixture for 30 to 90 minutes.

Embodiment 8. The method of any one of embodiments 1 to 7, comprising ball-milling the mixture at a speed of 1000 to 2500 rpm.

Embodiment 9. The method of any one of embodiments 1 to 8, wherein the step of calcinating the mixture comprises heating the mixture in an oven, wherein the temperature of the oven is increased to a temperature in the range of 325 to 375° C. and subsequently held at that temperature for at least 1 hour.

Embodiment 10. The method of embodiment 9, wherein the temperature of the oven is increased to a temperature in the range of 345 to 355° C. and subsequently held at that temperature for at least 1 hour.

Embodiment 11. The method of embodiment 9, wherein the temperature of the oven is increased to a temperature in the range of 345 to 355° C. at a rate of 3 to 15° C./min and subsequently held at that temperature for 1 to 10 hours.

Embodiment 12. The method of any one of the preceding embodiments, wherein the nanocomposite includes metal oxide nanoparticles.

Embodiment 13. A nanoparticle/graphene/boron nitride (BN) nanocomposite prepared by the method of any one of embodiments 1 to 12, wherein the nanoparticle/graphene/BN nanocomposite comprises nanoparticles, graphene, and boron nitride.

Embodiment 14. The nanocomposite of embodiment 13, wherein the nanocomposite includes nanoparticles selected from the group consisting of: metal oxide nanoparticles, metal sulfide nanoparticles, metal nitride nanoparticles, nanoparticles of a metal or metal alloy, silicon nanoparticles, silicon oxide nanoparticles, and combinations thereof.

Embodiment 15. The nanocomposite of embodiment 14, wherein the nanoparticles are metal oxide nanoparticles.

Embodiment 16. The nanocomposite of embodiment 15, wherein the metal oxide nanoparticles are selected from the group consisting of $Co_3O_4$, $TiO_2$, $SnO_2$, $ZnO$, $Fe_3O_4$, $Fe_2O_3$, and combinations thereof.

Embodiment 17. The nanocomposite of embodiment 15 or 16, wherein the metal oxide nanoparticles are $Co_3O_4$ nanoparticles.

Embodiment 18. The nanocomposite of embodiment 17, wherein the $Co_3O_4$ nanoparticles are in a cubic-spinel form.

Embodiment 19. The nanocomposite of embodiment 17, wherein the $Co_3O_4$ nanoparticles make up 0.1% to 99.8% of the nanocomposite by weight.

Embodiment 20. The nanocomposite of embodiment 17, wherein the $Co_3O_4$ nanoparticles make up 0.1% to 10% of the nanocomposite by weight.

Embodiment 21. The nanocomposite of embodiment 17, wherein the $Co_3O_4$ nanoparticles make up 50% to 99.8% of the nanocomposite by weight.

Embodiment 22. The nanocomposite of embodiment 17 or 21, wherein the $Co_3O_4$ nanoparticles make up 50% to 70% of the nanocomposite by weight.

Embodiment 23. The nanocomposite of any one of embodiments 17, 21, and 22, wherein the $Co_3O_4$ nanoparticles make up 55% to 65% of the nanocomposite by weight.

Embodiment 24. The nanocomposite of embodiment 13, wherein the graphene makes up 0.1% to 99.9% of the nanocomposite by weight.

Embodiment 25. The nanocomposite of embodiment 13, wherein the graphene makes up 39.9% or less of the nanocomposite by weight.

Embodiment 26. The nanocomposite of embodiment 13 or 25, wherein the graphene makes up 5% to 15% of the nanocomposite by weight.

Embodiment 27. The nanocomposite of embodiment 13, wherein the boron nitride is in the form of hexagonal boron nitride.

Embodiment 28. The nanocomposite of embodiment 13, wherein the hexagonal boron nitride makes up 0.1% to 99.9% of the nanocomposite by weight.

Embodiment 29. The nanocomposite of embodiment 27, wherein the hexagonal boron nitride makes up 39.9% or less of the nanocomposite by weight.

Embodiment 30. The nanocomposite of embodiment 27 or 29, wherein the hexagonal boron nitride makes up 25% to 35% of the nanocomposite by weight.

Embodiment 31. A method of preparing a nanoparticle/graphene/BN/sulfur (S) nanocomposite comprising ball-milling a mixture of the nanocomposite of any one of embodiments 13 to 30 and sulfur.

Embodiment 32. The method of embodiment 31, wherein nanocomposite includes nanoparticles selected from the group consisting of: metal oxide nanoparticles, metal sulfide nanoparticles, metal nitride nanoparticles, nanoparticles of a metal or metal alloy, silicon nanoparticles, silicon oxide nanoparticles, and combinations thereof.

Embodiment 33. The method of embodiment 32, wherein the nanoparticles are metal oxide nanoparticles.

Embodiment 34. The method of embodiment 31, wherein the step of ball-milling is performed for at least 20 minutes.

Embodiment 35. The method of embodiment 31 or 34, wherein the step of ball-milling is performed for 30 to 60 minutes.

Embodiment 36. A nanoparticle/graphene/BN/S nanocomposite prepared by the method of any one of embodiments 31-35.

Embodiment 37. The nanocomposite of embodiment 36, wherein the nanocomposite comprises between 40% and 90% sulfur by weight.

Embodiment 38. The nanocomposite of embodiment 36 or 37, wherein the nanocomposite comprises 55% to 65% sulfur by weight.

Embodiment 39. The nanocomposite of embodiment 36 or 37, wherein the nanocomposite comprises 65% to 75% sulfur by weight.

Embodiment 40. The nanocomposite of embodiment 36 or 37, wherein the nanocomposite comprises 75% to 85% sulfur by weight.

Embodiment 41. A method of preparing an electrode comprising: mixing the nanocomposite of any one of embodiments 12 to 23 with one or more conductive agents, a binding agent, and an optional additive in a solvent to obtain a slurry; coating a foil substrate with the slurry to form a film; and drying the film under vacuum.

Embodiment 42. The method of embodiment 41, wherein the one or more conductive agents comprise carbon black.

Embodiment 43. The method of embodiment 41 or 42, wherein the binding agent comprises a polyvinylidene resin.

Embodiment 44. The method of embodiment 41 or 42, wherein the binding agent comprises polyvinylidene fluoride.

Embodiment 45. The method of embodiment 41 or 42, wherein the binding agent comprises a polyvinylidene fluoride resin.

Embodiment 46. The method of any one of embodiment 41 to 45, wherein the solvent comprises a mixture of dimethyl sulfoxide and ethanol.

Embodiment 47. The method of embodiment 46, wherein the solvent comprises equal volumes of dimethyl sulfoxide and ethanol.

Embodiment 48. The method of any one of embodiments 41 to 45, wherein the solvent comprises N-methyl-2-pyrrolidone.

Embodiment 49. The method of any one of embodiments 41 to 48, wherein the step of mixing comprises mixing the nanocomposite with one or more conductive agent(s), a binding agent and an additive in the solvent to obtain a slurry, wherein the additive is oxalic acid.

Embodiment 50. The method of any one of embodiments 41 to 49, wherein the film is dried at 60 to 110° C.

Embodiment 51. An electrode prepared by the method of any one of embodiments 41 to 50.

Embodiment 52. The electrode of embodiment 51, wherein the nanocomposite makes up at least 70% of the dried film by weight.

Embodiment 53. The electrode of embodiment 51 or 52, wherein the nanocomposite makes up 75% to 85% of the dried film by weight.

Embodiment 54. The electrode of embodiment 51 or 52, wherein the nanocomposite makes up 90% to 95% of the dried film by weight.

Embodiment 55. A method of preparing an electrode comprising: dispersing one or more conductive agents in a solvent to prepare a first solution; preparing a second solution of a binding agent with an optional additive in a solvent; dispersing the nanocomposite of any one of embodiments 13 to 30 in a solvent to prepare a third solution; mixing the first, second, and third solutions to obtain a slurry; coating a foil substrate with the slurry to form a film; and drying the film under vacuum.

Embodiment 56. The method according to embodiment 55, wherein the nanocomposite is dried at 90 to 140° C. prior to being dispersed in the solvent.

Embodiment 57. The method of embodiment 55 or 56, wherein the one or more conductive agent(s) comprises carbon black.

Embodiment 58. The method of any one of embodiments 55 to 57, wherein the binding agent comprises a polyvinylidene resin.

Embodiment 59. The method of any one of embodiments 55 to 57, wherein the binding agent comprises polyvinylidene fluoride.

Embodiment 60. The method of any one of embodiments 55 to 57, wherein the binding agent comprises a polyvinylidene fluoride resin.

Embodiment 61. The method of any one of embodiments 55 to 60, wherein the solvent comprises N-methyl-2-pyrrolidone.

Embodiment 62. An electrode prepared by the method of any one of embodiments 55 to 61.

Embodiment 63. The electrode of embodiment 62, wherein the nanocomposite makes up at least 70% of the dried film by weight.

Embodiment 64. The electrode of embodiment 62 or 63, wherein the nanocomposite makes up at least 90% of the dried film by weight.

Embodiment 65. A method of preparing an electrode comprising: mixing the nanocomposite of any one of embodiments 36 to 40 with one or more conductive agents and a binding agent in a solvent to form a slurry; coating a foil substrate with the slurry to form a film; and drying the film under vacuum.

Embodiment 66. The method of embodiment 65, wherein the conductive agent comprises carbon black.

Embodiment 67. The method of embodiment 65 or 66, wherein the binding agent comprises a polyvinylidene resin.

Embodiment 68. The method of embodiment 65 or 66, wherein the binding agent comprises polyvinylidene fluoride.

Embodiment 69. The method of embodiment 65 or 66, wherein the binding agent comprises a polyvinylidene fluoride resin.

Embodiment 70. The method of any one of embodiment 65 to 69, wherein the film is dried at 65 to 95° C.

Embodiment 71. An electrode prepared by the method of any one of embodiments 65 to 70.

Embodiment 72. The electrode of embodiment 71, wherein the nanocomposite makes up at least 80% of the dried film by weight.

Embodiment 73. A lithium-ion battery comprising an anode, a cathode, an electrolyte and a separator between the anode and the cathode, wherein the anode comprises the nanocomposite of any one of embodiments 13 to 30.

Embodiment 74. The lithium-ion battery of embodiment 73, wherein (i) at 25° C., the lithium-ion battery has a specific capacity in the range of 30 mAh/g to 100 mAh/g; and (ii) at 150° C., the lithium-ion battery has a specific capacity in the range of 100 to 500 mAh/g.

Embodiment 75. The lithium-ion battery of embodiment 73 or 74, wherein, after 100 charge-discharge cycles at 150° C., the lithium-ion battery has a coulombic efficiency of at least 90% at 150° C.

Embodiment 76. A lithium-sulfur battery comprising an anode, a cathode, an electrolyte and a separator between the anode and the cathode, wherein the cathode comprises the nanocomposite of any one of embodiments 36 to 40.

Embodiment 77. The lithium-sulfur battery of embodiment 76, wherein after 10 charge-discharge cycles at 25° C., at least 60% capacity is retained.

Embodiment 78. The lithium-sulfur battery of embodiment 77, wherein after 10 charge-discharge cycles at 25° C., about 65% to about 75% capacity is retained.

Embodiment 79. The lithium-sulfur battery of embodiment 77 or 78, wherein after an additional 40 charge-discharge cycles, the capacity loss is less than 35% relative to the capacity at the end of the $10^{th}$ cycle.

EXAMPLES

A. Fabrication of Nanocomposites

Example 1: Preparation of $Co_3O_4$/graphene/h-BN Nanocomposites

Cobalt (II) acetate tetrahydrate (3.99 g, 16.0 mmol, SRL), boron nitride micropowder (0.7 g, 28.2 mmol, Graphene Supermarket), and graphene nanoplatelets (2.31 g, 192 mmol, XG Sciences) were combined in a SPEX SamplePrep 8000M Mixer/Mill ball milling apparatus equipped with four 0.25 inch steel balls and two 0.5 inch steel balls. The mixture was ball-milled for 1 hour at a speed of 1725 rpm. The resulting powder was calcinated in an oven at a temperature of 350° C. for 4 hours with a heating rate of 7° C./min. A schematic representation of this preparation is depicted in FIG. 1.

Example 2: Large-scale Preparation of $Co_3O_4$/Graphene/h-BN Nanocomposites

Cobalt (II) acetate tetrahydrate (700 g, 2.8 mmol, SRL), boron nitride micropowder (122 g, 4.9 mol, Graphene Supermarket), and graphene nanoplatelets (404 g, 33.6 mol, XG Sciences) were combined in a SPEX SamplePrep 8000M Mixer/Mill ball milling apparatus equipped with four 0.25 inch steel balls and two 0.5 inch steel balls. The mixture was ball-milled for 1 hour at a speed of 1725 rpm. The resulting powder was calcinated in an oven at a temperature of 350° C. for 4 hours with a heating rate of 7° C./min.

Example 3: Preparation of $Co_3O_4$/graphene/h-BN/S Nanocomposites $Co_3O_4$/graphene/h-BN/S nanocomposites were prepared with varying amounts of sulfur. The $Co_3O_4$/graphene/h-BN nanocomposite prepared in accordance with Example 1 or 2 (20 wt %, 30 wt %, and 40 wt %) was mixed with elemental sulfur (80 wt %, 70 wt %, and 60 wt %) and ball-milled for 45 minutes in a SPEX SamplePrep 8000M Mixer/Mill equipped with four 0.25 inch steel balls and two 0.5 inch steel balls with a speed of 1725 rpm to obtain a $Co_3O_4$/graphene/h-BN/S nanocomposite as a fine black powder.

B. Characterization of Nanocomposites

Example 4: X-ray Diffraction (XRD) of Nanocomposites

To study the crystallinity of the nanocomposites, X-ray diffraction (XRD) powder patterns of the nanocomposites were measured at 30 kV and 40 mA using a Rigaku MiniFlex 600 X-ray diffractometer (Japan) equipped with Cu Kα radiation (1.54430 Å).

XRD of $Co_3O_4$/Graphene/h-BN Nanocomposites

Figure 5:
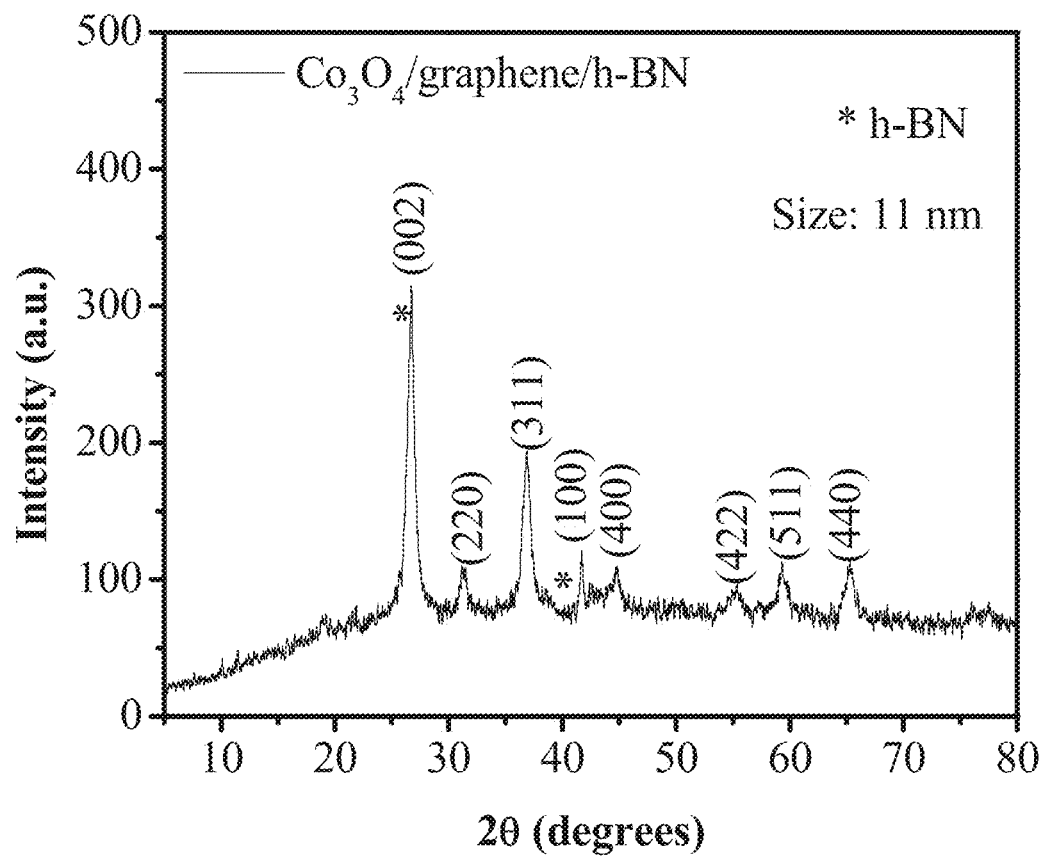
FIG. 5 is a representative spectrum of an X-ray diffraction (XRD) pattern of a $Co_3O_4$/graphene/h-BN nanocomposite, according to an illustrative embodiment.

Characteristic diffraction peaks were identified for $Co_3O_4$ and hexagonal boron nitride in the XRD patterns for $Co_3O_4$/graphene/h-BN nanocomposites. A representative spectrum is depicted in FIG. 5. The diffraction peaks of $Co_3O_4$ were indexed to those of pure $Co_3O_4$ with a cubic spinel structure (Joint Committee on Powder Diffraction Standards (JCPDS) card no. 76-1802). The width of the $Co_3O_4$ peaks is indicative of a small particle size in the range of 9 to 11 nm.

Peaks related to the presence of hexagonal boron nitride (h-BN) in the $Co_3O_4$/graphene/h-BN nanocomposite are marked with an asterisk (*) (as shown in the legend to FIG. 5). The h-BN sheets exhibit an intense peak near 2θ=26°, which was attributed to the (002) plane of h-BN and is believed to overlap with the peaks corresponding to graphene.

XRD of $Co_3O_4$/Graphene/h-BN/S Nanocomposites

Figure 6:
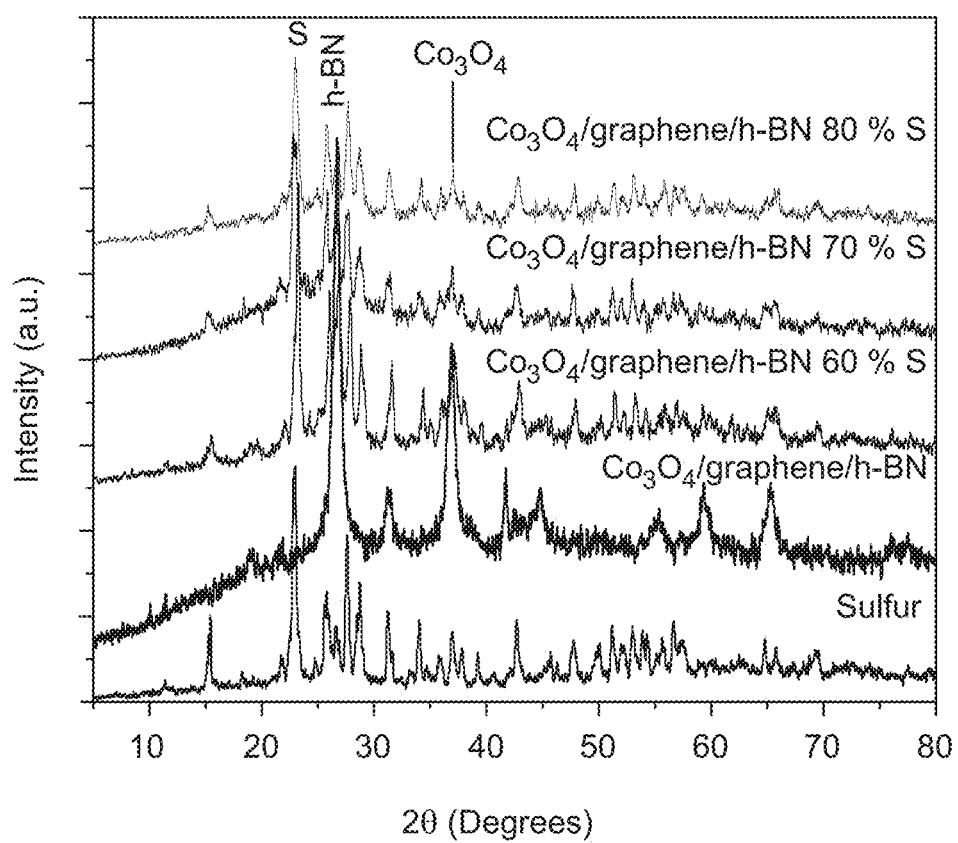
FIG. 6 is a plot of XRD patterns of pure sulfur, a $Co_3O_4$/graphene/h-BN nanocomposite, and $Co_3O_4$/graphene/h-BN/S nanocomposites with 60%, 70% and 80% sulfur content by weight, according to an illustrative embodiment.

The XRD patterns of $Co_3O_4$/graphene/h-BN/S nanocomposites, depicted in FIG. 6, maintain the characteristic peaks of cubic $Co_3O_4$ and h-BN, where the peak occurring at approximately 37° in each spectrum is indexed to the (311) plane of cubic $Co_3O_4$ and the peak at approximately 26° corresponds to the (002) plane in h-BN. Additional peaks are observed corresponding to crystalline sulfur; the narrow, prominent peaks at 23.1, 25.9 and 27.8° in the spectra shown in FIG. 6 are indexed to the (222), (026), and (040) planes of fddd orthorhombic sulfur.

Example 5: Thermal Properties of Nanocomposites

Thermogravimetric analysis (TGA) was performed using an STA 7200 thermogravimetric analysis system to determine thermal stability of nanocomposites at temperatures from 25° C. to 500° C. with a heating rate of 10° C./min. TGA was performed on nanocomposites both before and after calcination.

Thermal stability was further probed via differential scanning calorimetry (DSC). Nanocomposites were heated from a temperature of 25° C. to 200° C. at a rate of 2° C./min under a nitrogen atmosphere.

Thermal stability of $Co_3O_4$/Graphene/h-BN Nanocomposites

Figure 7:
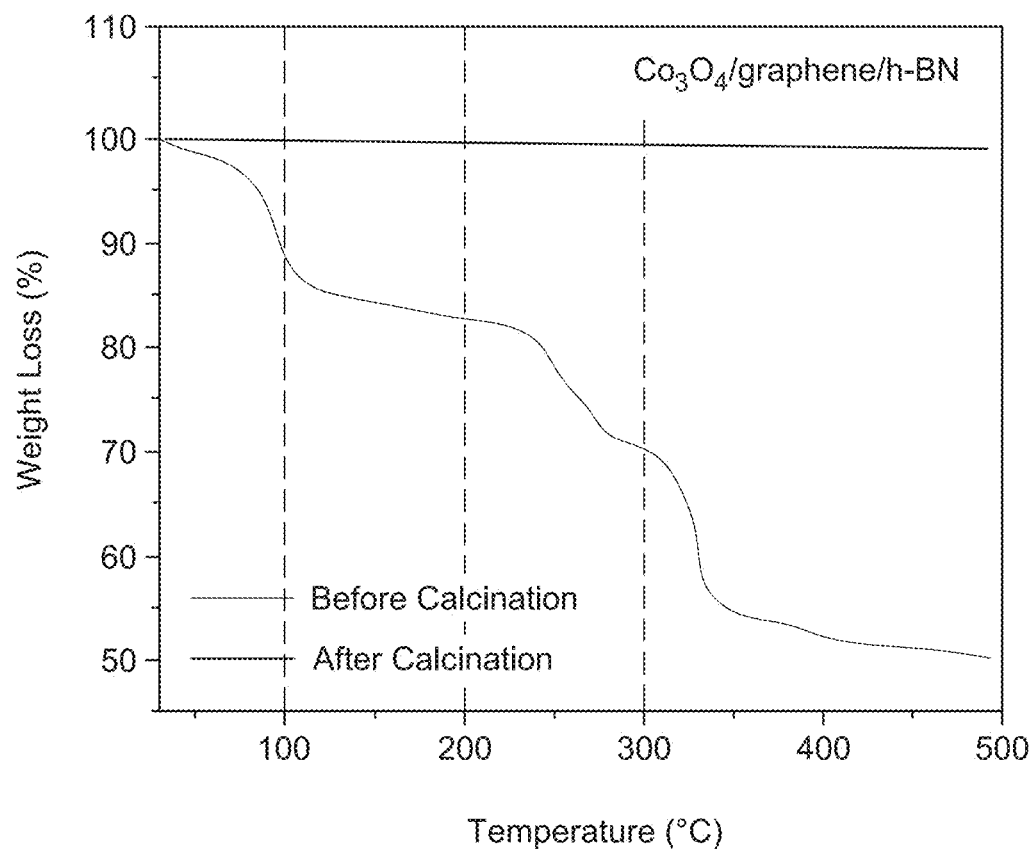
FIG. 7 is a plot of the thermogravimetric analysis (TGA) curves for $Co_3O_4$/graphene/h-BN nanocomposites prior to and after calcination, according to an illustrative embodiment.

Representative TGA curves—which are plots of weight loss (in percent of initial weight at the starting temperature) versus temperature—for a $Co_3O_4$/graphene/h-BN nanocomposite are shown in FIG. 7.

The overall weight loss for the sample subjected to TGA prior to calcination was 50%. In the first temperature region (less than 100° C.), about 12% decomposition was observed for the pre-calcination sample. This weight loss was attributed to removal of adsorbed water. In the second temperature region (from about 100° C. to 250° C.), the pre-calcination sample exhibited further weight loss of about 15% at about 250° C. This weight loss was attributed to decomposition of cobalt hydroxide. In the final temperature region (from about 250° C. to 500° C.), the pre-calcination sample exhibited a final weight loss step at about 320° C., attributed to decomposition of acetate derived from cobalt acetate starting material.

Conversely, the overall weight loss of the sample analyzed post-calcination was only 1-1.5%, evidencing importance of a calcination step in enhancing thermal stability of nanocomposites.

Thermal Stability of $Co_3O_4$/Graphene/h-BN/S Nanocomposites

Figure 8:
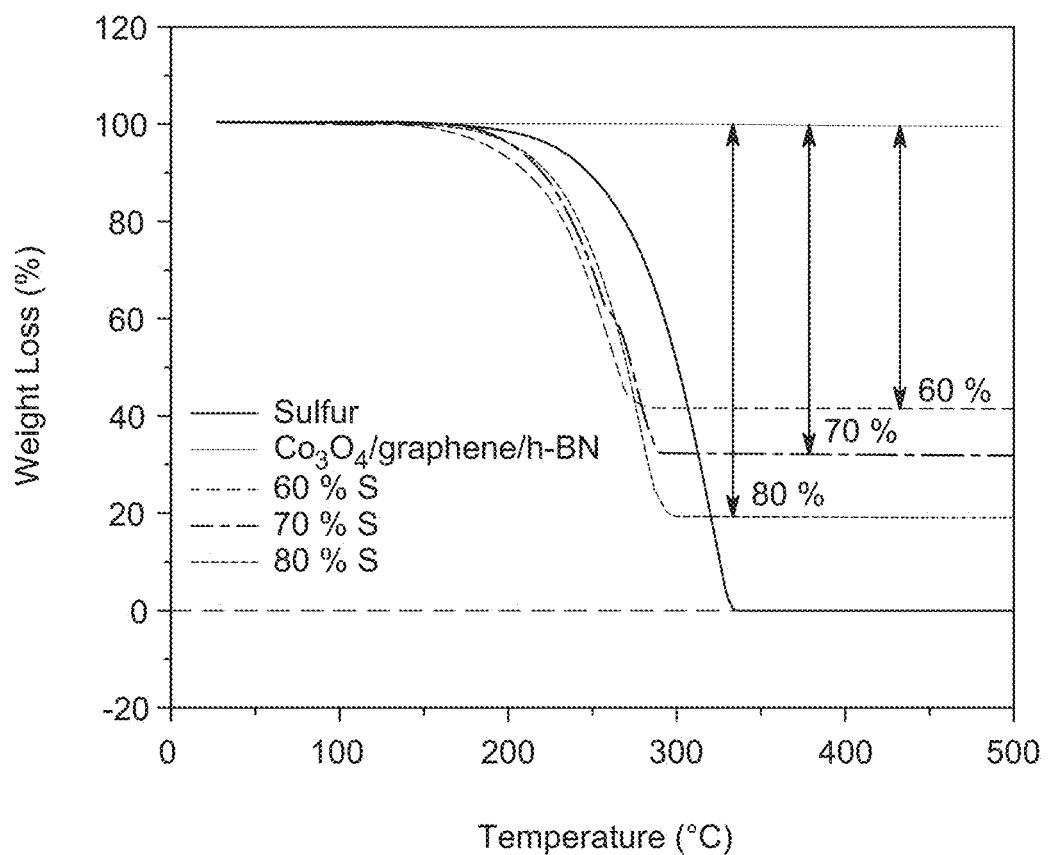
FIG. 8 is a plot of the TGA curves of pure sulfur, $Co_3O_4$/graphene/h-BN, and $Co_3O_4$/graphene/h-BN/S nanocomposite with 60%, 70% and 80% sulfur content by weight, according to an illustrative embodiment.

TGA of $Co_3O_4$/graphene/h-BN/S nanocomposites provides insight into sulfur content of these nanocomposites (FIG. 8). Total loss of pure elemental sulfur by sublimation is afforded by a temperature of 366° C. in $N_2$, while sulfur in the nanocomposites sublimes at a lesser temperature. The sample prepared with 20 wt % $Co_3O_4$/graphene/h-BN exhibited a weight loss of 80%, while the sample prepared with 30 wt % $Co_3O_4$/graphene/h-BN exhibited a weight loss of 70%, and the sample prepared with 40 wt % $Co_3O_4$/graphene/h-BN exhibited a weight loss of about 60%, consistent with loss of the total sulfur content in each of the samples.

Figure 9:
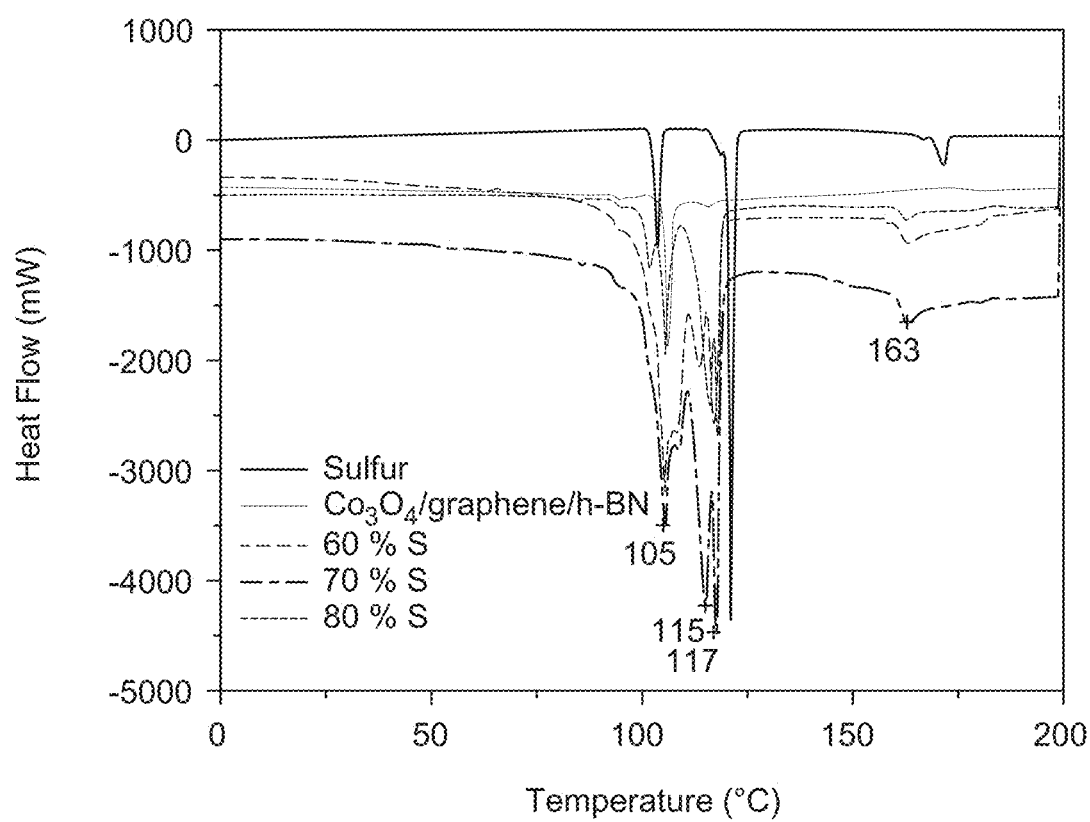
FIG. 9 is a differential scanning calorimetry (DSC) plot of pure sulfur, a $Co_3O_4$/graphene/h-BN nanocomposite, and $Co_3O_4$/graphene/h-BN/S nanocomposites with 60%, 70% and 80% sulfur content by weight, according to an illustrative embodiment.

The differential scanning calorimetry (DSC) plots of $Co_3O_4$/graphene/h-BN/S nanocomposites further define sulfur composition of the materials (FIG. 9). A DSC plot of pure sulfur exhibits exothermic peaks at 118.72° C. and 120.99° C., corresponding to solid phase transition from orthorhombic α-S to monoclinic β-S (the α-S phase melting) and phase transition of sulfur from solid to liquid form (the β-S phase melting), respectively. A third, small peak at 171.52° C. corresponds to liquid to liquid transformation (λ-phase transition) and polymerization. In comparison, DSC plots of $Co_3O_4$/graphene/h-BN/S nanocomposites exhibit a reduction in peak intensities attributed to the lesser percent composition of sulfur in the nanocomposites. Additionally, the peaks shift to lesser temperatures, which is attributed to a decrease in sulfur particle size in the nanocomposites relative to pure elemental sulfur.

Example 6: Microstructure of Nanocomposites

Figure 10:
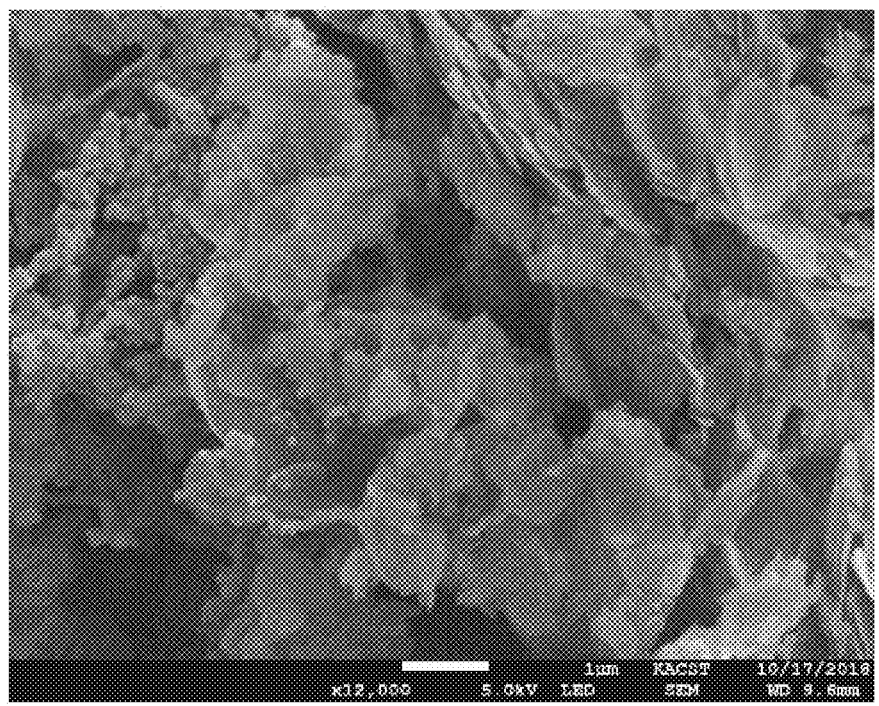
FIG. 10 is a scanning electron micrograph (SEM) of a $Co_3O_4$/graphene/h-BN nanocomposite at 1 μm, according to an illustrative embodiment.
Figure 11:
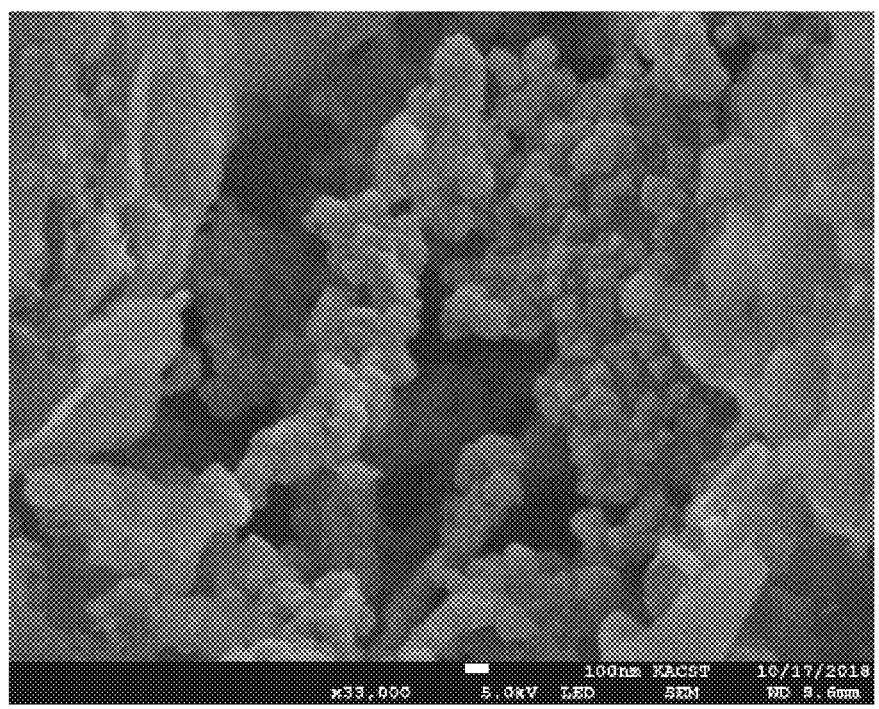
FIG. 11 is a scanning electron micrograph of a $Co_3O_4$/graphene/h-BN nanocomposite at 100 nm, according to an illustrative embodiment.
Figure 12:
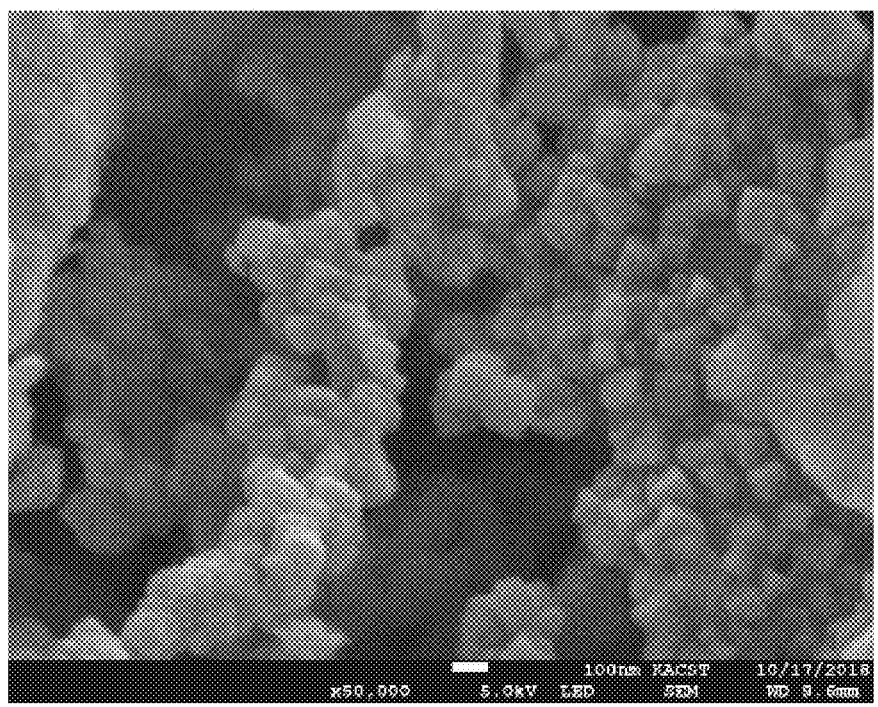
FIG. 12 is a scanning electron micrograph of a $Co_3O_4$/graphene/h-BN nanocomposite at 100 nm, according to an illustrative embodiment.

The microscale morphologies of nanocomposites were observed using scanning electron microscopy. Scanning electron micrographs were recorded on an FEI Quanta 200 scanning electron microscope (JEOL SEM (USA) and ZEISS FESEM (Germany)). SEM images were collected with a 5.0 kV electron beam at magnifications of 1 μm and 100 nm. FIG. 10 shows a scanning electron micrograph of a $Co_3O_4$/graphene/h-BN nanocomposite at 1 μm, featuring flakes of graphene and h-BN. FIGS. 11 and 12 depict scanning electron micrographs of the $Co_3O_4$/graphene/h-BN nanocomposite at a lesser magnification of 100 nm, which highlight the cubic structure of $Co_3O_4$ nanoparticles on the graphene and h-BN sheets.

C. Fabrication of Electrode Materials

Example 7: Fabrication of Electrodes for Lithium-Ion Batteries

Anode materials prepared for use in lithium-ion batteries were formulated with $Co_3O_4$/graphene/h-BN nanocomposites described in the present disclosure.

Procedure 1:

The working electrodes were fabricated by mixing a $Co_3O_4$/graphene/h-BN nanocomposite with a conductive agent, binding agent, and optional additives in a solvent (1:1 volume mixture of ethanol:DMSO). Homogenous slurries were obtained and spread as 50 μm films on copper foil substrates, which act as current collectors. The films were dried under vacuum at 80° C. Example formulations are presented in Tables 1 and 2.

TABLE 1

| Electrode 400 Formulation | |
|---|---|
| Components | Weight % |
| $Co_3O_4$/graphene/h-BN nanocomposite | 80 |
| Conductive agent (carbon black) | 10 |
| Binding agent (polyvinylidene fluoride (PVDF)) | 10 |

TABLE 2

| Electrode 410 Formulation | |
|---|---|
| Components | Weight % |
| $Co_3O_4$/graphene/h-BN nanocomposite | 92.5 |
| Conductive agent (C-NERGY™ Super C65®) | 1.5 |
| Conductive agent (C-NERGY™ SFG6L) | 2.5 |
| Binding agent (Kynar® HSV900) | 3 |
| Additive (Oxalic acid) | 0.5 |

Figure 13:
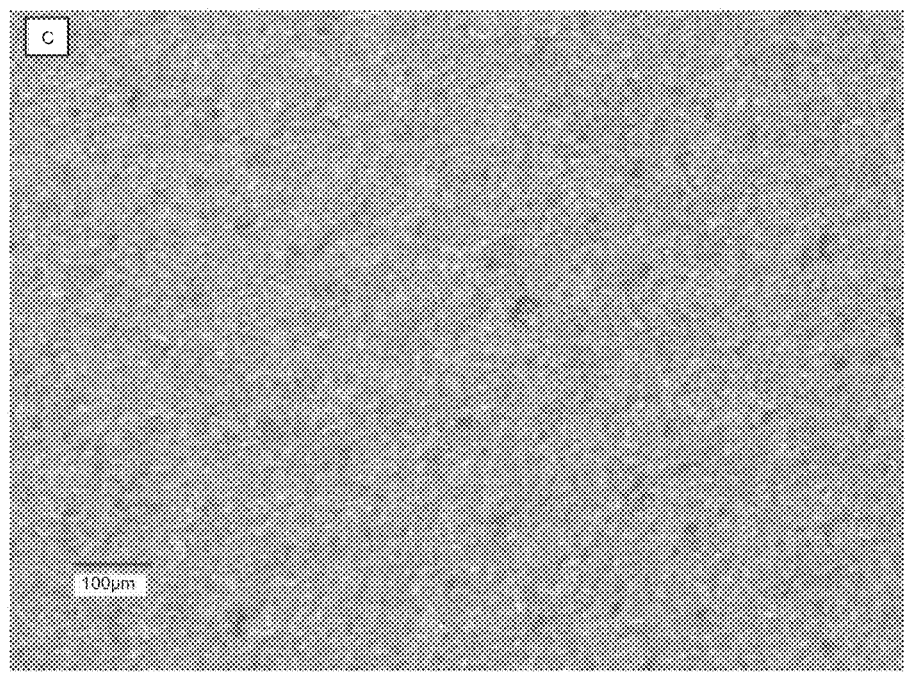
FIG. 13 is an optical image of an electrode surface including a $Co_3O_4$/graphene/h-BN nanocomposite at 100 nm, according to an illustrative embodiment.

Procedure 2:

A $Co_3O_4$/graphene/h-BN nanocomposite was dried overnight at 110° C. such that the moisture content was reduced to 0.92% by weight prior to use in the electrode fabrication. The working electrode was fabricated by first dispersing Super C65® in N-methyl-2-pyrrolidone (NMP) using a centrifugal FlackTek SpeedMixer™ to prepare a first solution. A second solution was prepared by combining Kynar® HSV900 (the PVDF binder) with oxalic acid in NMP using a FlackTek SpeedMixer™. The dried nanocomposite was then dispersed in NMP via sonication (10 min) to prepare a third solution. The three prepared solutions were combined and mixed using a FlackTek SpeedMixer™. The viscosity of the resulting slurry was 9000 cP at 3/sec. To further reduce agglomeration of the active material particles, the slurry was transferred to a Primix Model 40-L rotor-stator mixer for additional mixing. An example anode formulation is presented in Table 3. Reduction of agglomeration with a second ball-milling step is illustrated in FIG. 13, which displays the uniform surface obtained for an Electrode 420 formulation prepared by this process.

TABLE 3

Electrode 420 Formulation

| Components | Weight % |
|---|---|
| $Co_3O_4$/graphene/h-BN nanocomposite | 92.5 |
| Conductive agent (C-NERGY ™ Super C65 ®) | 1.75 |
| Binding agent (Kynar ® HSV900) | 5.25 |
| Additive (Oxalic acid) | 0.5 |

Example 8: Fabrication of Electrodes for Lithium-Sulfur Batteries

Working electrodes for a lithium-sulfur battery were fabricated by manually mixing 80 wt % of each $Co_3O_4$/graphene/h-BN/S nanocomposite (60, 70, and 80% S) prepared in accordance with Example 3 with 10 wt % of conductive agent (Super P) and 10 wt % of binding agent (PVDF) in N-methyl-2-pyrrolidone (NMP). The mixtures were processed using a homogenizer or a wet ball-milling method to obtain a homogenous slurries. The resultant slurries were then uniformly pasted onto aluminum foil substrates with a thickness of 50 μm and dried at 80° C. under vacuum.

TABLE 4

Electrode 430 Formulation

| Components | Weight % |
|---|---|
| $Co_3O_4$/graphene/h-BN/S nanocomposite | 80 |
| Conductive agent (Super P) | 10 |
| Binding agent (PVDF) | 10 |

D. Characterization of Electrode Materials

Example 9: Characterization of Electrode Materials

Hegman Gauge Measurement

The extent of agglomeration in the slurries was assessed by Hegman gauge measurement. Dispersion of a $Co_3O_4$/graphene/h-BN nanocomposite in solvent yielded a Hegman gauge measurement of 28-20 μm, with a viscosity of about 11,000 cP at 3/second, corresponding to 33% solid by weight. After addition of conductive agent and preparation of an anode material by Procedure 1, Hegman gauge measurement of the slurry increased to about 40-indicating some agglomeration.

Additional mixing using a Primix Model 40-L rotor-stator mixer according to Procedure 2 described in the present disclosure reduced the Hegman gauge measurement of the slurry to 34-36 producing an apparent reduction in agglomerate size.

Surface Imaging

Optical imaging of the surface of the films after coating with an electrode material indicates the extent of agglomeration. FIGS. 14A and 14B depict the coated surface of an electrode material produced via Procedure 1 after initial coating and following crushing of agglomerated particles, respectively. FIGS. 15A and 15B depict the coated surface of an electrode material produced via Procedure 2 before and after additional mixing with a Primix mixer.

Bend Radius Test

Flexibility of electrode material was probed via bend radius testing. FIGS. 16 and 17 show optical microscope images of electrode materials (loading of 2.77 mg/cm², Doctor Blade gap of 100 μm; loading of 6.84 mg/cm², Doctor Blade gap of 300 respectively) at diameters of ¼ inch, ³⁄₁₆ inch, and ⅛ inch (A, B, and C, respectively). No cracking or delamination was observed.

Adhesion (Tape) Testing

Adhesion of coating material to electrode films was assessed via adhesion (tape) testing. A square (1 inch diameter) was punched from coated foils and weighed to determine the mass of the coating. A strip of Scotch tape (¾ inch wide) was centered and placed on the electrode sample. The electrode and tape were clamped with 50 pounds of pressure for 30 seconds. The tape was removed and the sample re-weighed to determine the resulting mass loss. The results of adhesion (tape) testing are presented in Table 5 and FIG. 18.

TABLE 5

Adhesion Test Results

| Preparation | Procedure 1 | | Procedure 2 | | |
|---|---|---|---|---|---|
| Doctor Blade Gap, μm | 100 | 300 | 245 | 364 | 484 |
| Foil only mass, g | 0.0575 | 0.0575 | 0.0575 | 0.0575 | 0.0575 |
| Sample pre-test, g | 0.0719 | 0.0983 | 0.0938 | 0.1094 | 0.1276 |
| Sample pre-test, g | 0.0691 | 0.0906 | 0.0899 | 0.1022 | 0.1215 |
| Coating Mass Loss, g | 0.0028 | 0.0077 | 0.0039 | 0.0072 | 0.0061 |
| Coating Mass Loss, % | 19.4 | 18.9 | 10.7 | 13.9 | 8.7 |

E. Electrochemical Testing of Electrode Materials

Example 10: Electrochemical Testing of Electrodes for Lithium-Ion Batteries

Coin-cells were built to test the electrochemical performance of the electrodes. Testing conditions are presented in Table 6.

TABLE 6

Li-ion Battery Testing Conditions

| Active anode material | $Co_3O_4$/graphene/h-BN |
|---|---|
| Electroyte | 1M $LiPF_6$ |
| Voltage range (formation) | 0.5-2.7 V |
| Voltage range | 0-3 V |
| Current density | 39 mA/g and 234 mA/g |
| Separator | Celgrad 2325 |
| Electrode thickness | 50 μm |
| Weight of active material | 2.56 mg |
| Weight % of active material | 80% |

A film prepared with a $Co_3O_4$/graphene/h-BN nanocomposite material was subjected to 100 charge/discharge cycles at 39 mA/g over a voltage range of 0.5 to 2.7 V to afford formation of an anode. The resulting $Co_3O_4$/graphene/h-BN anode had initial charge and discharge specific capacities of 44.5 and 41.3 mAh/g, respectively.

Electrochemical Testing with a Current Density of 39 mA/g

Following the formation process, an anode was subjected to five galvanostatic charge-discharge cycles at a current density of 39 mA/g, as shown in FIG. 19. After five charge-discharge cycles, the anode exhibited reversible specific capacities of 43.48 and 42.25 mAh/g, corresponding to a capacity retention of 98.2%.

The electrochemical properties of a $Co_3O_4$/graphene/h-BN anode material were further evaluated by cyclic voltammetry (CV) over the range of 0 to 3 V at a scan rate of 10 mV/s (3 cycles). The resulting cyclic voltammogram is shown in FIG. 20. The broad cathodic peak that occurs at about 2.3 V in the first cycle is a result of several changes that occur at the anode: (i) reversible reduction of $Co_3O_4$ to Co metal, (ii) formation of clusters between newly formed Co metal and $Li_2O$, (iii) insertion of Li ions into layers of graphene, and (iv) formation of a solid electrolyte interphase (SEI) layer on the active materials. The two peaks in the first anodic scan (0.75 V and 2.1 V) are attributed to extraction of Li ions from the graphene layers and oxidation of Co metal back to $Co_3O_4$. The decrease in peak intensity between the first and second cycles is consistent with formation of a SEI layer in the first cycle. No further drop in peak intensity was observed after the second cycle, which is indicative of reversibility of lithium storage and stability of anode materials.

Cycling stability of $Co_3O_4$/graphene/h-BN in anode materials was tested over 100 charge-discharge cycles at a current density of 39 mA/g after undergoing a formation process of five galvanostatic charge-discharge cycles at a current density of 39 mA/g, the results of which are shown in FIG. 21. After 100 cycles, the anode displayed charge and discharge specific capacities of 36.4 and 34.12 mAh/g, respectively, corresponding to 97.45% coulombic efficiency and 79.64% capacity retention.

Electrochemical Testing with a Current Density of 234 mA/g

Following the formation process, another anode was subjected to five galvanostatic charge-discharge cycles at a current density of 234 mA/g (FIG. 22), where initial charge and discharge specific capacities of the anode were 83.9 and 79.03 mAh/g, respectively. Subsequent CV exhibited an increased current response relative to an anode subjected to lesser current density (FIG. 23 as compared to FIG. 20).

Electrochemical performance of an anode at high temperature was evaluated by subjecting materials to five charge-discharge cycles with a current density of 234 mA/g at a temperature of 150° C., the results of which can be seen in FIG. 24. Further charge-discharge cycles were scanned to reach a total of 100 cycles, as shown in FIG. 25. Stability of an anode material at high temperature is evidenced by observation of 100% coulombic efficiency and capacity retention even after 100 cycles.

Electrochemical Impedance Spectroscopy (EIS)

Electrochemical impedance spectroscopy (EIS) was performed for anodes prepared with $Co_3O_4$/graphene/h-BN following five charge-discharge cycles with current densities of 39 mA/g and 234 mA/g. The Nyquist plots depicted in FIG. 26 display similar impedance spectral features: a depressed semicircle in the high-frequency region which is attributed to resistance caused by a SEI layer ($R_{SEI}$), a broad arc in the medium frequency region attributed to $Li^+$ charge-transfer resistance ($R_{ct}$) at the electrode-electrolyte interface, and an inclined line in the low frequency region attributed to Warburg resistance (W). EIS was also performed following 100 charge-discharge cycles at a current density of 39 mA/g and 100 cycles at a current density of 234 mA/g and a temperature of 150° C.

EIS data exhibit a decrease in resistance of the materials at 150° C. relative to room temperature, demonstrating an enhanced electrochemical behavior of anode materials at high temperatures.

Lithiation and Delithiation of Anode Materials

Additional coin cells were built to test lithiation and delithiation characteristics of anodes. These coin cells were prepared using anode formulations of Tables 2 and 3 and tested according to parameters presented in Table 7.

TABLE 7

Li-ion Battery Testing Conditions

| Sample Name | Electrode 410 Formulation | Electrode 420 Formulation |
|---|---|---|
| Electrolyte | LiP-57 (1M $LiPF_6$ in EC: 3 wt./EMC: 7 wt.) | LiP-57 (1M $LiPF_6$ in EC: 3 wt./EMC: 7 wt.) |
| Voltage range | 2.65 V-0.01 V | 2.7 V-0.01 V |
| Current density | 40 mA/g | 40 mA/g |
| Temperature | 21 ± 0.5 C. | 21 ± 0.5 C. |
| Separator | Celgrad 2325 | Celgrad 2325 |
| Active anode material | $Co_3O_4$/graphene/h-BN | $Co_3O_4$/graphene/h-BN |
| Weight of active material | 2.77 mg/cm$^2$ | 3.72 mg/cm$^2$ |
| Weight % of active material | 92.5% | 92.5% |

Lithiation and delithiation of anodes were measured over galvanostatic charge-discharge cycles at a current density of 40 mA/g. An anode of Electrode 410 formulation, which was fabricated only by mixing, yielded a lithiation capacity of about 400 mAh/g and a delithiation capacity of 180 mAh/g, representing a coulombic efficiency of 45% at 25° C. Low coulombic efficiency is attributed to delamination of agglomerated particles resulting from insufficient adhesion to the copper foil during electrochemical reactions. An anode of Electrode 420 formulation, which was fabricated by mixing followed by wet ball-milling, yielded similar results with a lithiation capacity of about 450 mAh/g and a delithiation capacity of 110 mAh/g, representing a coulombic efficiency of 24%.

Half-Cell Formation Rest at 125° C.

Lithiation and delithiation of an anode of Electrode 420 formulation was also tested at an elevated temperature of 125° C. Testing conditions for lithiation and delithiation are presented in Table 8.

TABLE 8

Lithiation and delithiation testing conditions

| Electroyte | Solvionics IL: 1-methyl-1-propylpiperidinium bis(trifluoromethylsulfonyl) (PP13) |
|---|---|
| Voltage range | 2.7 V-0.01 V |
| Current density | 40 mA/g |
| Temp | 125 ± 0.5 C. |
| Separator | Whatman GF/F separator |
| The anode material | $Co_3O_4$/graphene/h-BN |
| $Co_3O_4$/graphene/h-BN fraction | 92.5% |

The performance results of the first cycle are summarized in Table 9, and corresponding voltage and capacity curves depicted in FIGS. 27 through 30. Initial lithiation capacity of each sample was approximately 650 mAh/g. More variation was observed in delithiation capacities, which ranged from 283 to 107 mAh/g. However, overall the lithiation and delithiation values demonstrate a relatively high cycling capacity.

TABLE 9

Lithiation and delithiation testing performance results

|  | Active Material Lithiation Capacity mAh/g AM | Active Material Delithiation Capacity mAh/g AM | ICL % | Coat Loading mg/cm$^2$ | Calendared Electrode Thickness um | Calendared Coat Density g/cm$^3$ |
|---|---|---|---|---|---|---|
| Cell 1 | 640.3 | 267.7 | −58% | 3.7 | 26 | 2.33 |
| Cell 2 | 679.8 | 107.1 | −84% | 3.7 | 27 | 2.17 |
| Cell 3 | 630.4 | 283.4 | −55% | 3.8 | 28 | 2.09 |

Power Tests at 125° C.

FIGS. 31 through 34 depict the delithiation/lithiation plots of electrodes after initial lithiation. Delithiation graphs exhibit three distinct regions, where transitions correspond to graphite delithiation and nanocomposite delithiation. Subsequent lithiation features exhibit a rapid decrease in voltage to 0.0 V at a discharge (DCH) rate of 0.5 mA. Due to high resistance of the cell, DCH rate decreased to 0.086 mA for subsequent cycles after the first voltage low was reached. Samples were tested over three cycles. The C-rate for each cell was determined by the initial discharge capacity measured. The results of these tests are summarized in Table 10.

TABLE 10

Power test results

| | | Cell 1 | | | Cell 2 | | | Cell 3 | | | Cell 4 | | |
|---|---|---|---|---|---|---|---|---|---|---|---|---|---|
| Cycle | C-rate | Li mAh/g | De-Li mAh/g | ASI ohm-cm$^2$ | Li mAh/g | De-Li mAh/g | ASI ohm-cm$^2$ | Li mAh/g | De-Li mAh/g | ASI ohm-cm$^2$ | Li mAh/g | De-Li mAh/g | ASI ohm-cm$^2$ |
| 1 | 0.05 | 640.3 | 267.7 | 0.0 | 367.0 | 67.0 | 0.0 | 679.8 | 107.1 | 0.0 | 630.4 | 283.4 | 0.0 |
| 2 | 0.1 | 66.6 | 324.8 | 518.5 | 591.6 | 331.6 | 110.6 | 583.4 | 327.0 | 110.6 | 936.4 | 197.6 | 534.5 |
| 3 | 0.1 | 537.6 | 409.4 | 129.6 | 507.0 | | | 500.0 | | | 847.0 | 162.5 | 1356 |
| 4 | 0.1 | 559.0 | 420.4 | 164.5 | | | | | | | | | |
| 5 | 0.1 | 1015 | 147.9 | 181.0 | | | | | | | | | |

Example 11 Electrochemical Testing of Electrodes for Lithium-Sulfur Batteries with Varying Sulfur Content Electrochemical performance of $Co_3O_4$/graphene/h-BN/S nanocomposites as cathode materials was evaluated in coin-cells with a lithium counter anode. Lithium-sulfur coin-cells were tested across voltage windows of 1.5 to 3 V and 1.7 to 3 V. Solutions of 0.1% lithium nitrate in 1,2-dimethoxyethane (DME) and 1,3-dioxolane (DOL) were prepared as electrolyte solutions. Charge current applied to coin-cells varied across the cathode materials tested and is summarized in Table 11.

TABLE 11

Coin-cell Test Conditions

| Cathode Sulfur | Current Applied | |
|---|---|---|
| Content | Voltage window: 1.5-3 V | Voltage window: 1.7-3 V |
| 60% | 893 mA/g | 790 mA/g |
| 70% | 335 mA/g | 466 mA/g |
| 80% | 586 mA/g | 408 mA/g |

Charge-discharge cycles for $Co_3O_4$/graphene/h-BN/S nanocomposites across the first 10 cycles are shown in FIGS. 35, 36, and 37 for materials made up of 60, 70, and 80% sulfur, respectively. FIGS. 35 and 36 clearly show two voltage plateaus typical of electrochemical sulfur oxidation and reduction. The corresponding charge-discharge performance of the cathode materials over 100 cycles are plotted in FIGS. 38, 39, and 40, with a comparison of capacity loss across samples depicted in FIG. 41. Comparison of capacity loss across the two voltage windows indicates a stabilizing effect of the narrowed voltage window.

Specific charge and discharge capacities of cathode materials across the different voltage windows and the corresponding capacity retention are summarized in Table 9. Capacity retention between the $10^{th}$ to $50^{th}$ cycles of $Co_3O_4$/graphene/h-BN/60% S exhibits a capacity retention of 68.29-74.24%, even under a high applied current in the range of 0.8-0.9 A/g. Capacity retention of $Co_3O_4$/graphene/h-BN/70% S cathode similarly resulted in a 70% capacity retention between the $10^{th}$ to $50^{th}$ cycles when a low current density in the range of 0.3-0.4 A/g was applied. Moreover, a 69% capacity retention was achieved with $Co_3O_4$/graphene/h-BN/80% S material by applying a current density in the range of 0.4-0.6 A/g.

TABLE 12

Summarized electrochemical performance of $Co_3O_4$/graphene/h-BN/S cathodes

| | Voltage window 1 (1.5-3 V) | | | Voltage window 2 (1.7-3 V) | | |
|---|---|---|---|---|---|---|
| | Charge capacity (mAh/g) | Discharge capacity (mAh/g) | Capacity retention (%) $10^{th}$ to $50^{th}$ cycles | Charge capacity (mAh/g) | Discharge capacity (mAh/g) | Capacity retention (%) $10^{th}$ to $50^{th}$ cycles |
| 60% | | | | | | |
| 1 | 720.05 | 497.4 | 68.29 | 660.71 (1) | 430.06 | 74.24 |
| 10 | 467.45 | 320.31 | | 498.51 (10) | 340.77 | |
| 50 | 322.92 | 218.75 | | 358.63 (50) | 252.98 | |
| 100 | 257.81 | 173.18 | | | | |
| | Current 0.9 A/g$_{sulfur}$ | | | Current 0.8 A/g$_{sulfur}$ | | |
| | Weight 0.0007 g$_{sulfur}$ | | | Weight 0.0008 g$_{sulfur}$ | | |
| 70% | | | | | | |
| 1 | 591.52 | 383.93 | 70.69 | 635.87 (1) | 396.74 | 70.41 |
| 10 | 376.12 | 258.93 | | 423.14 (10) | 283.39 | |
| 50 | 260.04 | 183.03 | | 302.02 (50) | 199.53 | |
| 100 | 228.79 | 159.6 | | | | |
| | Current 0.3 A/g | | | Current 0.5 A/g | | |
| | Weight 0.0018 g$_{sulfur}$ | | | Weight 0.0013 g$_{sulfur}$ | | |
| 80% | | | | | | |
| 1 | 804.69 | 393.55 | 69.02 | 216.71 (1) | 129.76 | 69.37 |
| 10 | 370.12 | 249.02 | | 150.14 (10) | 108.7 | |
| 50 | 251.95 | 171.88 | | 116.17 (50) | 75.41 | |
| 100 | 220.7 | 144.53 | | | | |
| | Current 0.6 A/g$_{sulfur}$ | | | Current 0.4 A/g$_{sulfur}$ | | |
| | Weight 0.0010 g$_{sulfur}$ | | | Weight 0.0016 g$_{sulfur}$ | | |

Example 12 Electrochemical Testing of Electrodes for Lithium-Sulfur Batteries with Varying $Co_3O_4$ Content $Co_3O_4$/graphene/h-BN/70% S nanocomposites were prepared with 5%, 60%, and 90% $Co_3O_4$. Cycling performance of the nanocomposites was measured over 80 cycles (FIG. 42). Charge/discharge capacities of the nanocomposites measured at a current density of 1.266 A/g were 457.67/378.30 mAh/g, 365.08/295.53 mAh/g, and 543.65/447.09 mAh/g, respectively (FIG. 43).

What is claimed is:

1. A method of preparing a thermally stable nanoparticle/graphene/boron nitride (BN) nanocomposite, the method comprising steps of:
   ball-milling a mixture comprising a metal salt, graphene, and boron nitride; and
   calcinating the mixture, wherein calcinating the mixture comprises heating the mixture in an oven, wherein the temperature of the oven is increased to a temperature in the range of 325 to 375° C. and subsequently held at that temperature for at least 1 hour.

2. The method according to claim 1, wherein the metal salt is a cobalt salt.

3. The method according to claim 1, wherein the metal salt is selected from the group consisting of cobalt (II) halide, cobalt (II) acetate, cobalt (II) hydroxide, cobalt (II) sulfate, cobalt (II) nitrate, and hydrates thereof.

4. The method of claim 1, wherein the temperature of the oven is increased to a temperature in the range of 345 to 355° C. at a rate of 3 to 15° C./min and subsequently held at that temperature for 1 to 10 hours.

5. A thermally stable nanoparticle/graphene/boron nitride (BN) nanocomposite prepared by the method of claim 1, wherein the nanoparticle/graphene/BN nanocomposite comprises nanoparticles, graphene, and boron nitride and has stable electrochemical properties at a temperature of at least 150° C.

6. The nanocomposite of claim 5, wherein the nanoparticles are metal oxide nanoparticles.

7. The nanocomposite of claim 6, wherein the metal oxide nanoparticles are $Co_3O_4$ nanoparticles.

8. The nanocomposite of claim 7, wherein the $Co_3O_4$ nanoparticles make up 0.1% to 10% of the nanocomposite by weight.

9. The nanocomposite of claim 7, wherein the Co3O4 nanoparticles make up 50% to 99.8% of the nanocomposite by weight.

10. The nanocomposite of claim 5, wherein the boron nitride is in the form of hexagonal boron nitride.

11. A method of preparing a nanoparticle/graphene/BN/sulfur (S) nanocomposite comprising ball-milling a mixture of the nanocomposite of claim 5 and sulfur.

12. A nanoparticle/graphene/BN/S nanocomposite prepared by the method of claim 11.

13. A method of preparing an electrode comprising:
   mixing a nanocomposite with one or more conductive agents, a binding agent, and an optional additive in a solvent to obtain a slurry, wherein the nanocomposite comprises nanoparticles, graphene, and boron nitride; and calcinating the mixture;

coating a foil substrate with the slurry to form a film; and drying the film under vacuum.

14. An electrode prepared by the method of claim 13.

15. A method of preparing an electrode comprising:

dispersing one or more conductive agents in a solvent to prepare a first solution;

preparing a second solution of a binding agent with an optional additive in a solvent;

dispersing a nanocomposite in a solvent to prepare a third solution, wherein the nanocomposite comprises nanoparticles, graphene, and boron nitride;

mixing the first, second, and third solutions to obtain a slurry;

coating a foil substrate with the slurry to form a film; and drying the film under vacuum.

16. An electrode prepared by the method of claim 15.

17. A method of preparing an electrode comprising:

mixing the nanocomposite of claim 12 with one or more conductive agents and a binding agent in a solvent to form a slurry;

coating a foil substrate with the slurry to form a film; and drying the film under vacuum.

18. An electrode prepared by the method of claim 17.

19. A lithium-ion battery comprising an anode, a cathode, an electrolyte and a separator between the anode and the cathode, wherein the anode comprises a nanocomposite, wherein the nanocomposite comprises nanoparticles, graphene, and boron nitride.

20. The lithium-ion battery of claim 19, wherein
   (i) at 25° C., the lithium-ion battery has a specific capacity in the range of 30 mAh/g to 100 mAh/g; and
   (ii) at 150° C., the lithium-ion battery has a specific capacity in the range of 100 to 500 mAh/g.

21. The lithium-ion battery of claim 19, wherein, after 100 charge-discharge cycles at 150° C., the lithium-ion battery has a coulombic efficiency of at least 90% at 150° C.

22. A lithium-sulfur battery comprising an anode, a cathode, an electrolyte and a separator between the anode and the cathode, wherein the cathode comprises the nanocomposite of claim 12.

23. The lithium-sulfur battery of claim 22, wherein after 10 charge-discharge cycles at 25° C., at least 60% capacity is retained.

24. The lithium-sulfur battery of claim 23, wherein after an additional 40 charge-discharge cycles, the capacity loss is less than 35% relative to the capacity at the end of the 10th cycle.

\* \* \* \* \*